United States Patent [19]
Pittet et al.

[11] Patent Number: 5,823,141
[45] Date of Patent: *Oct. 20, 1998

[54] PROCESS AND FOR EXCITING, ATTRACTING, STIMULATING, AND/OR INCITING MEMBERS OF THE CLASS CRUSTACEA

[75] Inventors: Alan Owen Pittet, Keyport, N.J.; Phillip G. Lee, Galveston, Tex.; Jennifer C. Ellis, Tacoma, Wash.; Elizabeth A. McCliment, Galveston, Tex.

[73] Assignees: International Flavors & Fragrances Inc., New York, N.Y.; Board of Regents, The University of Texas System, Austin, Tex.

[*] Notice: The term of this patent shall not extend beyond the expiration date of Pat. No. 5,579,723.

[21] Appl. No.: 623,939

[22] Filed: Mar. 28, 1996

Related U.S. Application Data

[63] Continuation-in-part of Ser. No. 413,440, Mar. 30, 1995, Pat. No. 5,579,723, which is a continuation-in-part of Ser. No. 279,181, Jul. 22, 1994, Pat. No. 5,474,030.

[51] Int. Cl.⁶ ............................ A01K 61/00; A01K 63/00
[52] U.S. Cl. .......................... 119/207; 119/212; 119/247; 119/210
[58] Field of Search .................................. 119/204, 205, 119/207, 210, 212, 245, 267, 477; 424/84; 434/295, 296, 297

[56] References Cited

U.S. PATENT DOCUMENTS

| | | | |
|---|---|---|---|
| 4,098,910 | 7/1978 | Evers et al. | 426/535 |
| 4,107,184 | 8/1978 | Evers et al. | 260/347.2 |
| 4,249,480 | 2/1981 | Dugan et al. | . |
| 4,250,835 | 2/1981 | Dugan et al. | . |
| 4,320,150 | 3/1982 | Austin et al. | 426/2 |
| 4,593,647 | 6/1986 | Sorgeloos et al. | . |
| 4,828,829 | 5/1989 | Bethshears | 424/84 |
| 5,073,115 | 12/1991 | Howell | 434/297 |
| 5,222,458 | 6/1993 | Pippy | . |
| 5,277,918 | 1/1994 | Rawlins | 426/1 |

FOREIGN PATENT DOCUMENTS

| | | |
|---|---|---|
| 100454 | 3/1991 | Israel . |
| 9127231 | 2/1991 | Japan . |
| 06-311842 | 4/1993 | Japan . |
| 07-048266 | 8/1993 | Japan . |
| 07-051000 | 8/1993 | Japan . |

OTHER PUBLICATIONS

Castilla and Crisp, *J.mar.Biol.Ass.U.K.* (1970) 50, pp. 829–847, Title: "Responses of Asterias Rubens to Olfactory Stimuli" .

Shelton and Mackie, *J.exp.mar.Biol.Ecol.*, 1971, vol. 7, pp. 41–49, Title: "Studies on The Chemical Preferences of the Shore Crab Carcinus Maenas (L.)" .

McLeese, *Journal Fisheries Research Board of Canada*, vol. 27, No. 8, 1970, pp. 1371–1378, Title: "Detection of Dissolved Substances by the American Lobster (*Homarus americanus*) and Olfactory Attraction between Lobsters" .

Holland and Borski, *Aquaculture*, 109 (1993), pp. 153–164, Title: "A palatability bioassay for determining ingestive stimuli in the marine shrimp *Penaeus vannamei*" .

Lee, *J.Exp.Mar.Biol.Ecol.*, 153 (1992), pp. 53–67, Title: "Chemotaxis by *Octopus maya*Voss et Solis in a Y–maze" .

Lombardo, et al, *Comp.Biochem.Physiol.*, vol. 101C, No. 2, 1992, pp. 389–398, Title: "Amino Acids and Derivatives as Food–Finding Signals in the Freshwater Snail Planorbarius Corneus (L.)" .

(List continued on next page.)

*Primary Examiner*—Todd E. Manahan
*Attorney, Agent, or Firm*—Arthur L. Liberman

[57] ABSTRACT

Described is a process for determining excitants, attractants, incitants and stimulants for members of the lass Crustacea including but not limited to *Penaeus setiferus, Penaeus aztecus, Penaeus vannamei* and *Procambrus clarkii*. The apparatus for carrying out the process includes static tank means, flow-through tank means and Y-maze means each equipped with variable-focus camera means. Also described is a method for exciting and/or attracting and/or stimulating and/or inciting members of the Class Crustacea including but not limited to *Penaeus setiferus, Penaeus aztecus* and *Penaeus vannamei* (referred to collectively as *Penaeus spp.*), as well as *Procambrus clarkii*, using various dilute aqueous solutions of molecules including but not limited to N-acetyl-D-Glucosamine which is an epimeric mixture of isomers having the structures:

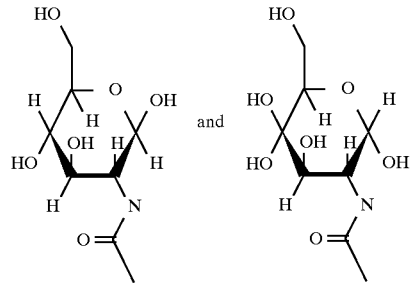

as well as feeding compositions for feeding members of the Class Crustacea including (i) prior art feeding compositions and admixed therewith (ii) Crustacea Class-exciting and/or attracting and/or stimulating and/or inciting amounts and concentrations of excitants, attractants, stimulants and/or incitants which include molecules including but not limited to the compounds having the structures:

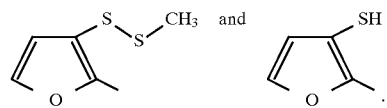

14 Claims, 59 Drawing Sheets

OTHER PUBLICATIONS

Steele, et al, *J.Fish Biol.* (1990) 36, pp. 341–352, Title: "Attraction of zebrafish, *Brachydanio rerio,* to alanine and its suppression by copper".

Lisowski, et al, *The Progressive Fish–Culturist,* 48, 1986, pp. 64–67, Title: "A Two–Choice Water Recirculation Tank for Assessing Chemosensory Preferences of Landlocked Sea Lampreys".

Chase and Wells, *Journal of Comparative Physiology A,* (1986) 158, pp. 375–381, Title: "Chemotactic behaviour in *Octopus*".

Benfield and Aldrich, *Contributions in Marine Science*(1991), vol. 32, pp. 73–88, Title: "A Laminar–Flow Choice Chamber for Testing the Responses of Postlarval Penaeids to Olfactants".

Jones and Hara, *J.Fish Biol.* (1985), 27, pp. 495–504, Title: "Behavioural responses of fishes to chemical cues: results from a new bioassay".

Brown and Rittschof, *Mar.Behav.Physiol.,* 1984, vol. 11, pp. 75–93, Title: "Effects of Flow and Concentration of Attractant on Newly hatched Oyster Drills, *Urosalpinx cinerea*(Say)".

Sloan and Northway, *Journal of Experimental Marine Biology and Ecology*(1982), 61, pp. 85–98, Title: "Chemoreception by the Asteriod Crossaster Papposus (L.)".

Mackie and Shelton, *Marine Biology,* vol. 14, No. 3, 1972, pp. 217–221, Title: "A whole–animal bioassay for the determination of the food attractants of the lobster *Homarus gammarus*".

Adams and Johnsen, *The Progressive Fish–Culturist,* 48, 1986, pp. 147–149, Title: "A Solid Matrix Bioassay for Determining Chemical Feeding Stimulants".

Døving and Schieldrop, *Chemical Senses and Flavor,* 1 (1975), pp. 371–374, Title: "An Apparatus Based on Turbulent Mixing for Delivery of Odorous Stimuli".

Bonsdorff and Vahl, *Mar.Behav.Physiol.,* 1982, vol. 8, pp. 243–248, Title: Food preference of the sea urchins *Echinus acutus* and *E. esculentus* .

Whitfield, et al, *Australian Journal of Chemistry,* vol. 35, pp. 373–383, Title: "Oct–1–en–3–ol and (5Z)–Octa–1, 5–dien–3–ol, Compounds Important in the Flavour of Prawns and Sand–Lobsters".

Flick et al, *Chemistry & Biochemistry of Marine Food Products*published by Avi Publishing Company, 1982, Title pages: "Table of Contents" and pp. 149–172 and pp. 272–304.

Staresinic, et al, entitled "Effects of Free Glycine in Shrimp Feed on Growth and Feeding Behavior"; paper delivered at Texas Agricultural and Mining University, Galveston, Texas in, approximately the beginning of 1991.

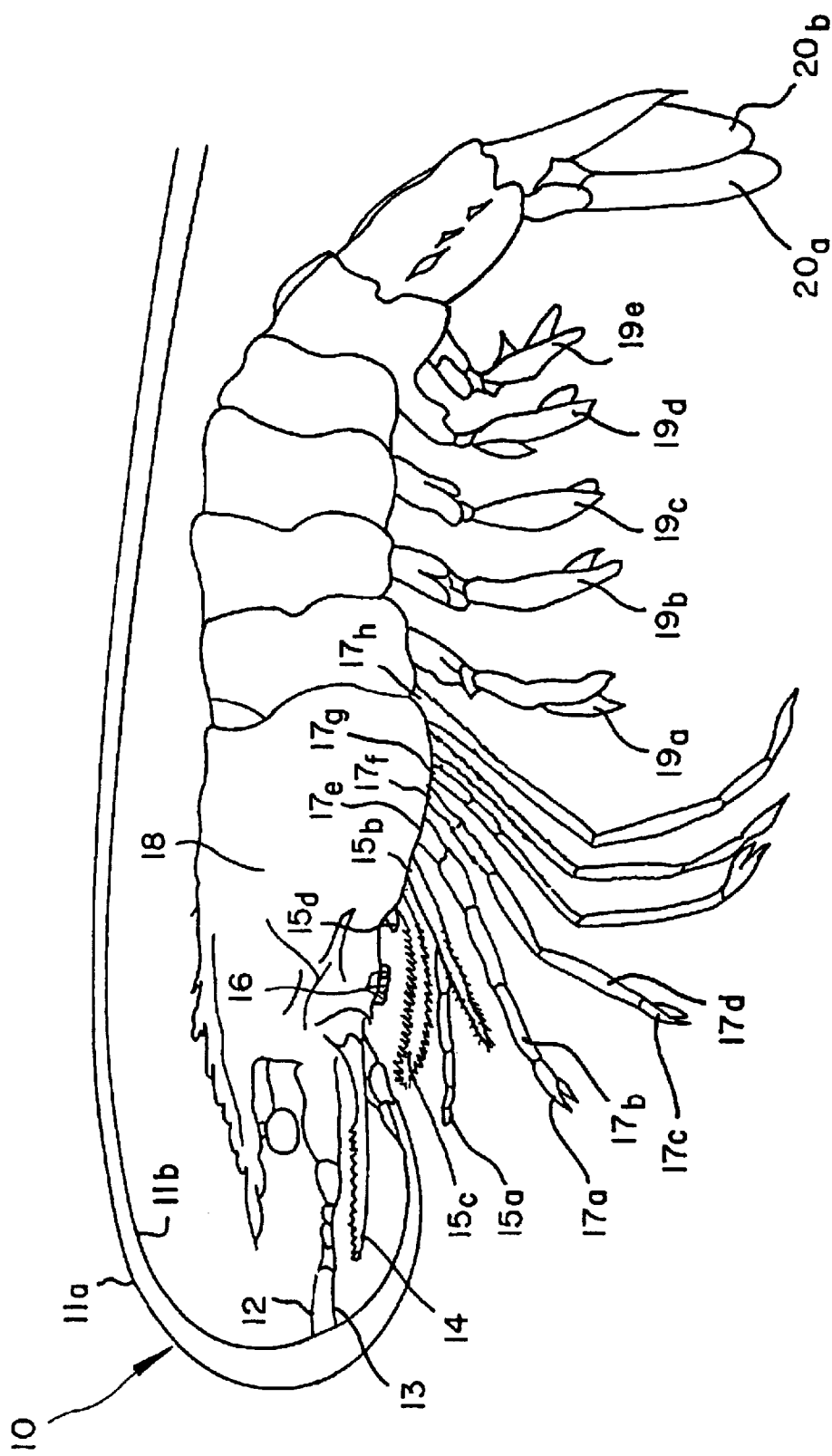

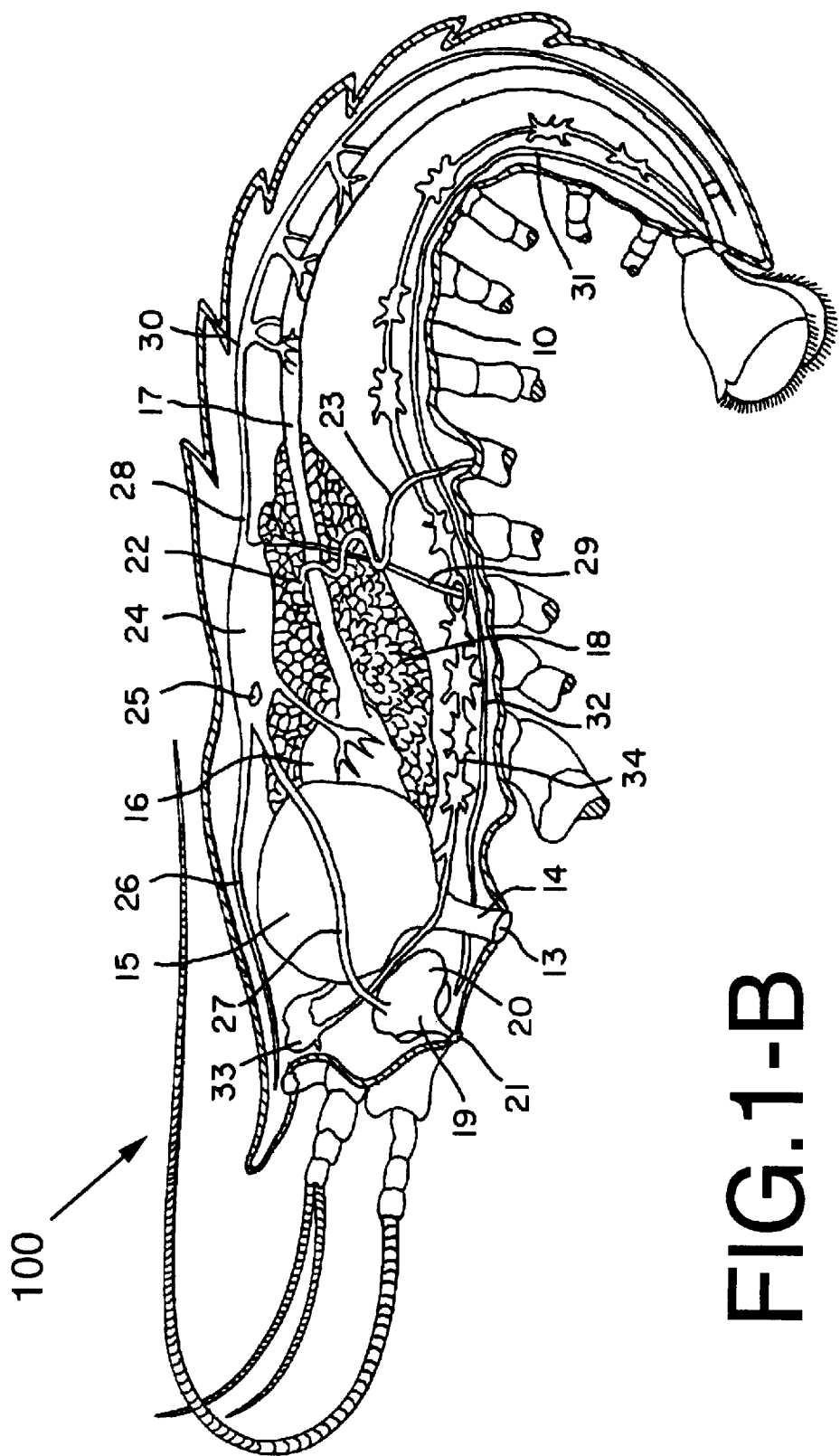

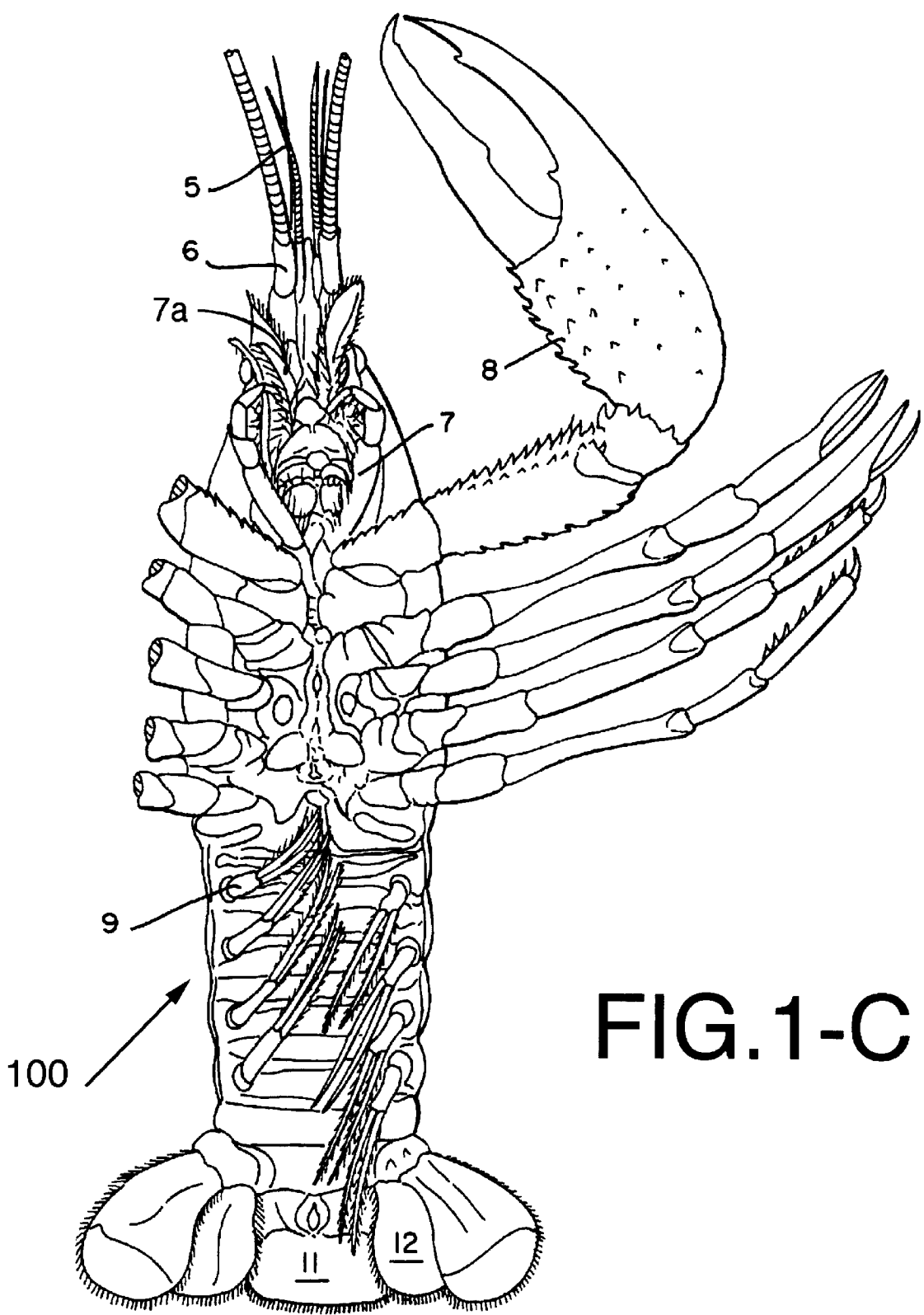
FIG.1-C

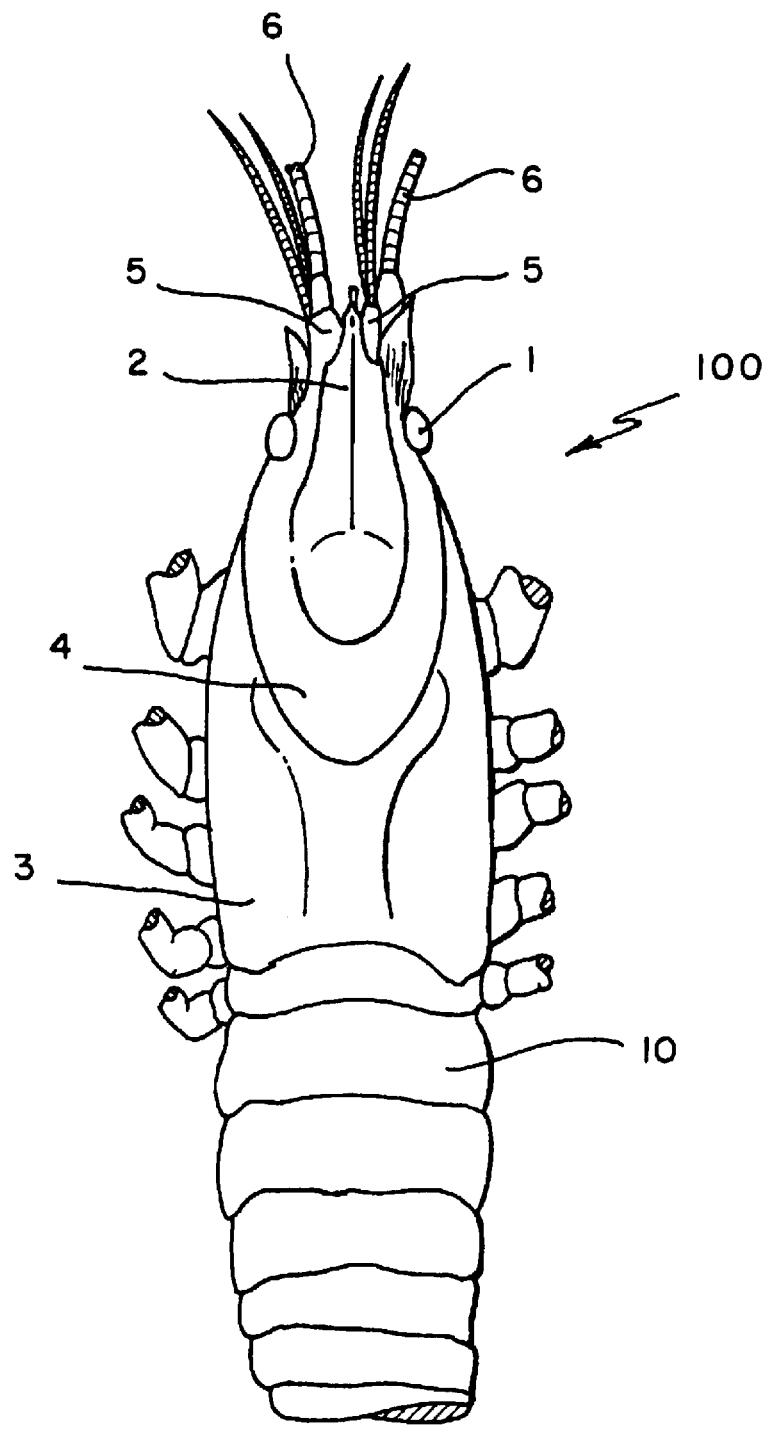
FIG.1-D

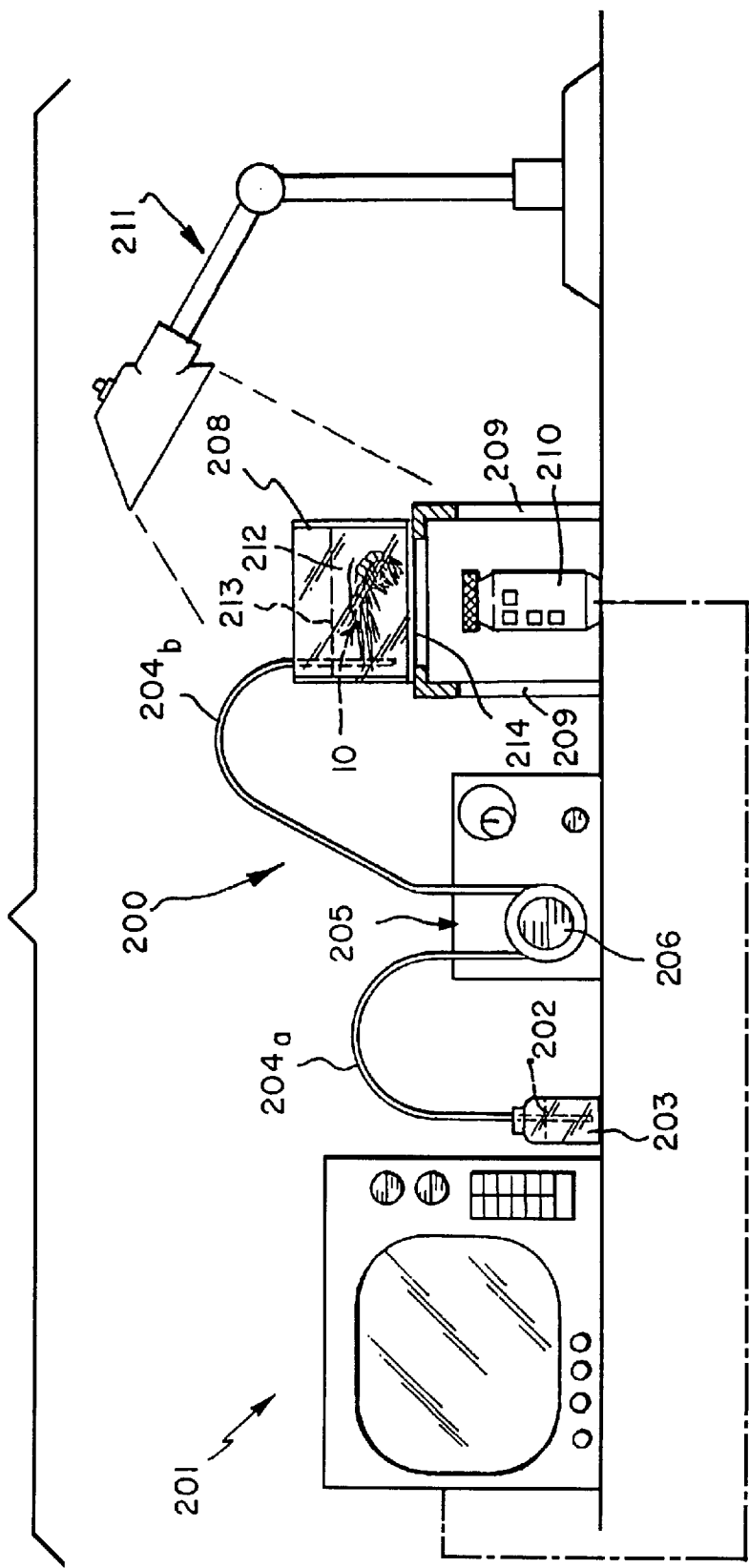
FIG.2-A

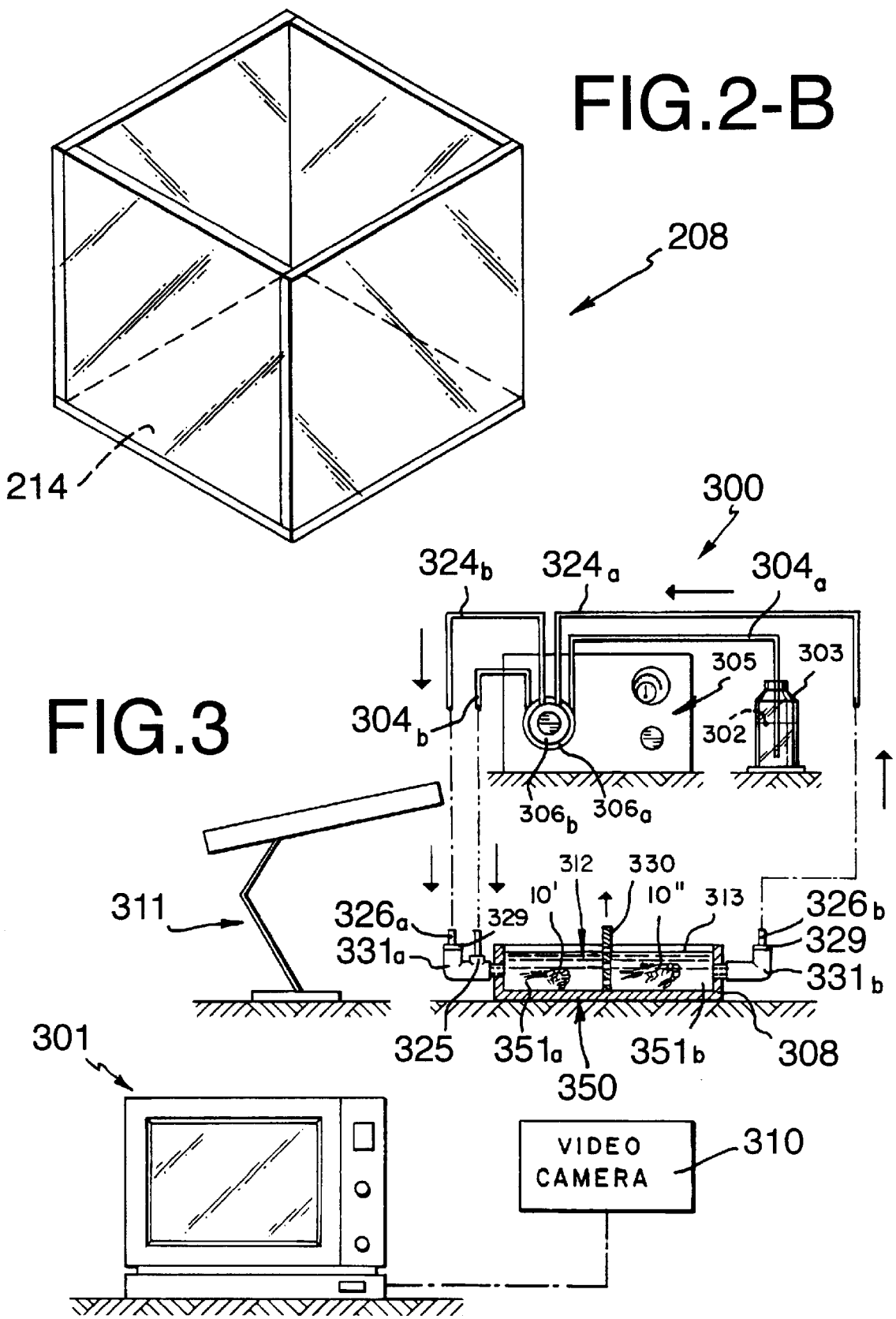

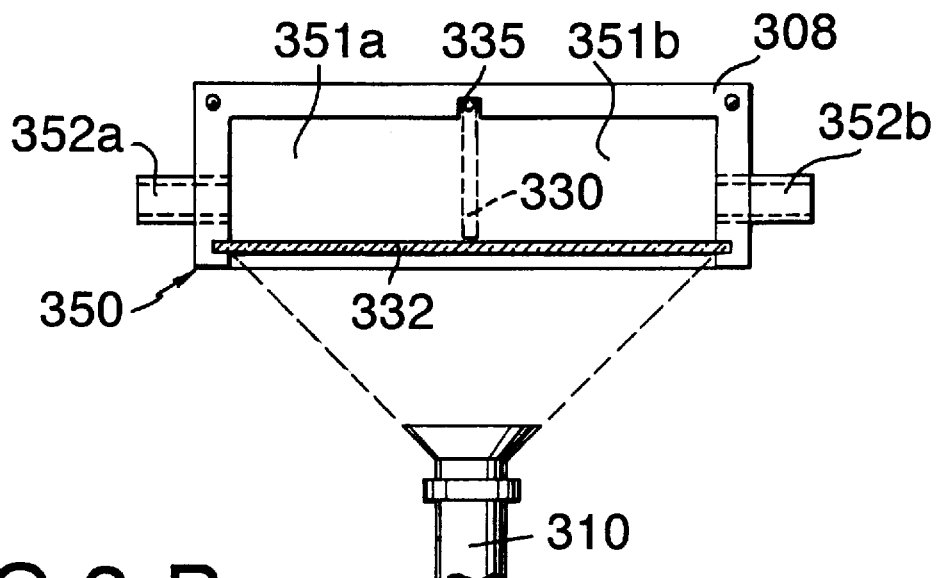
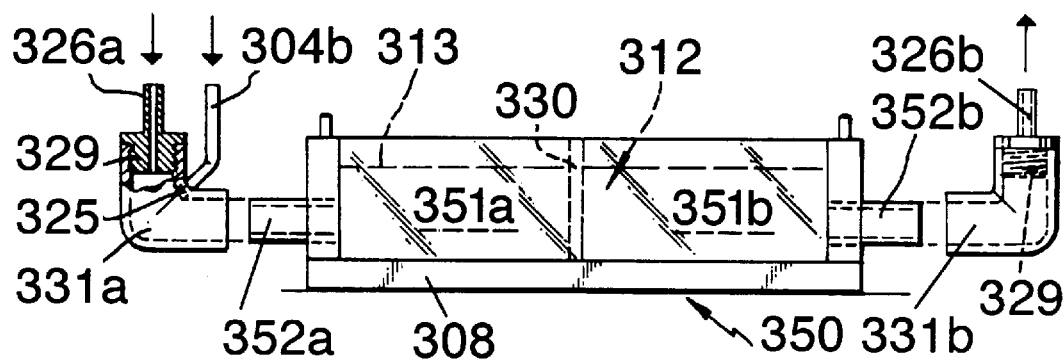
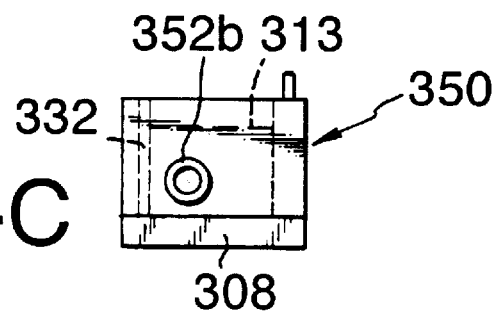

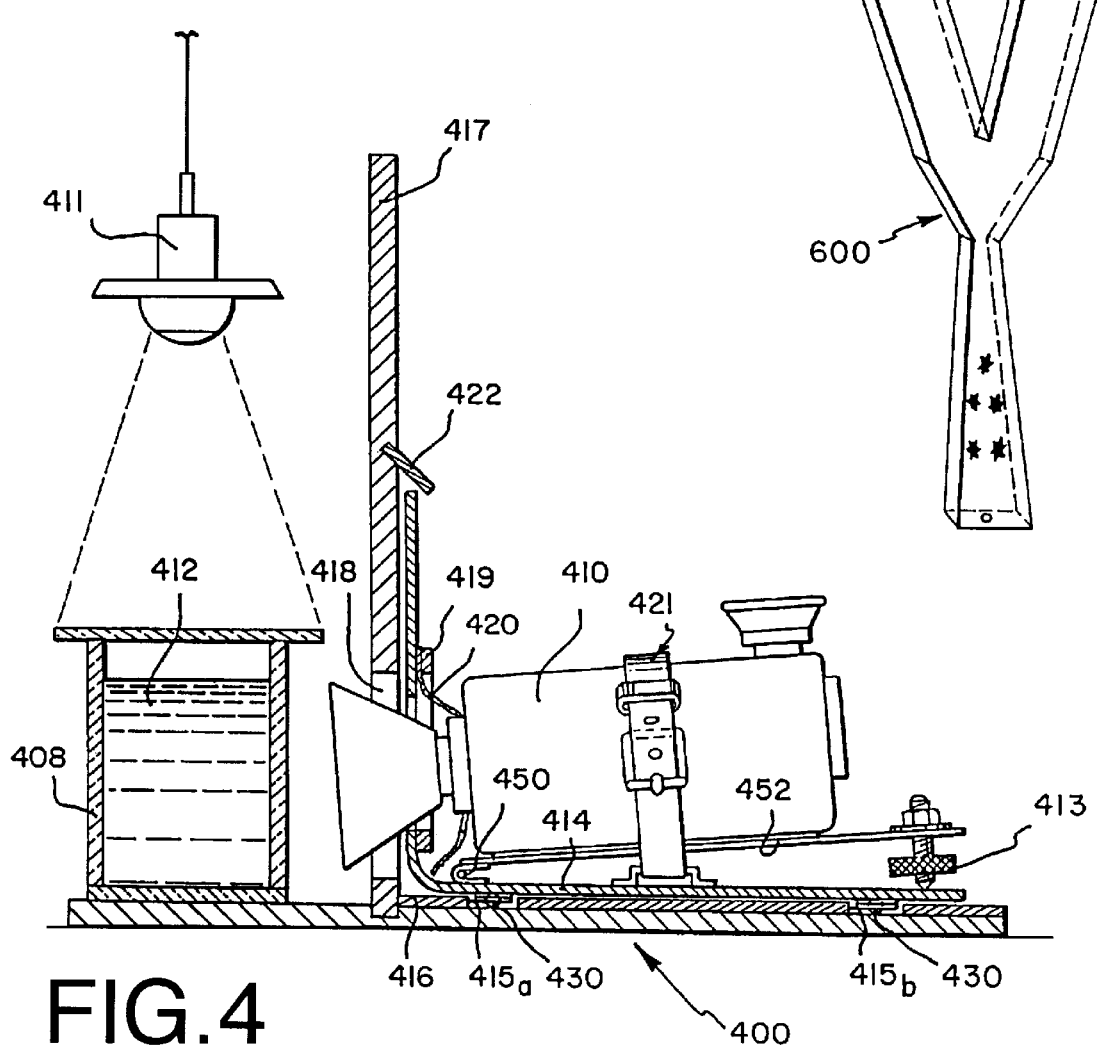

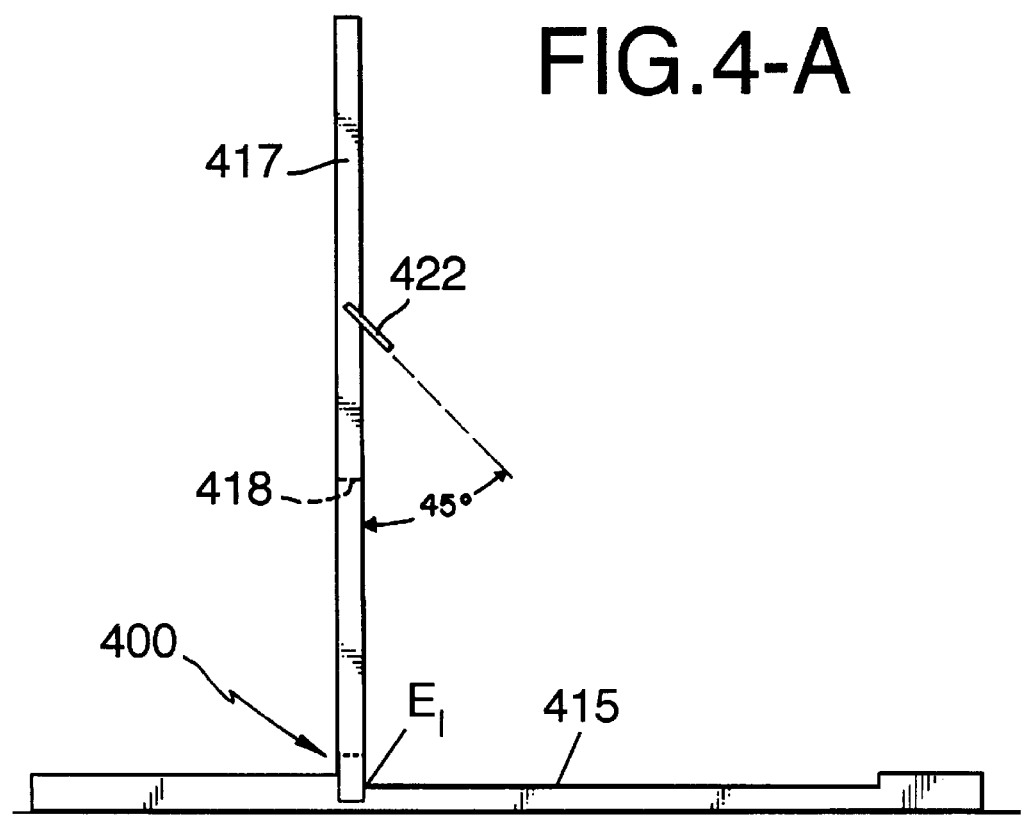
FIG.4-A
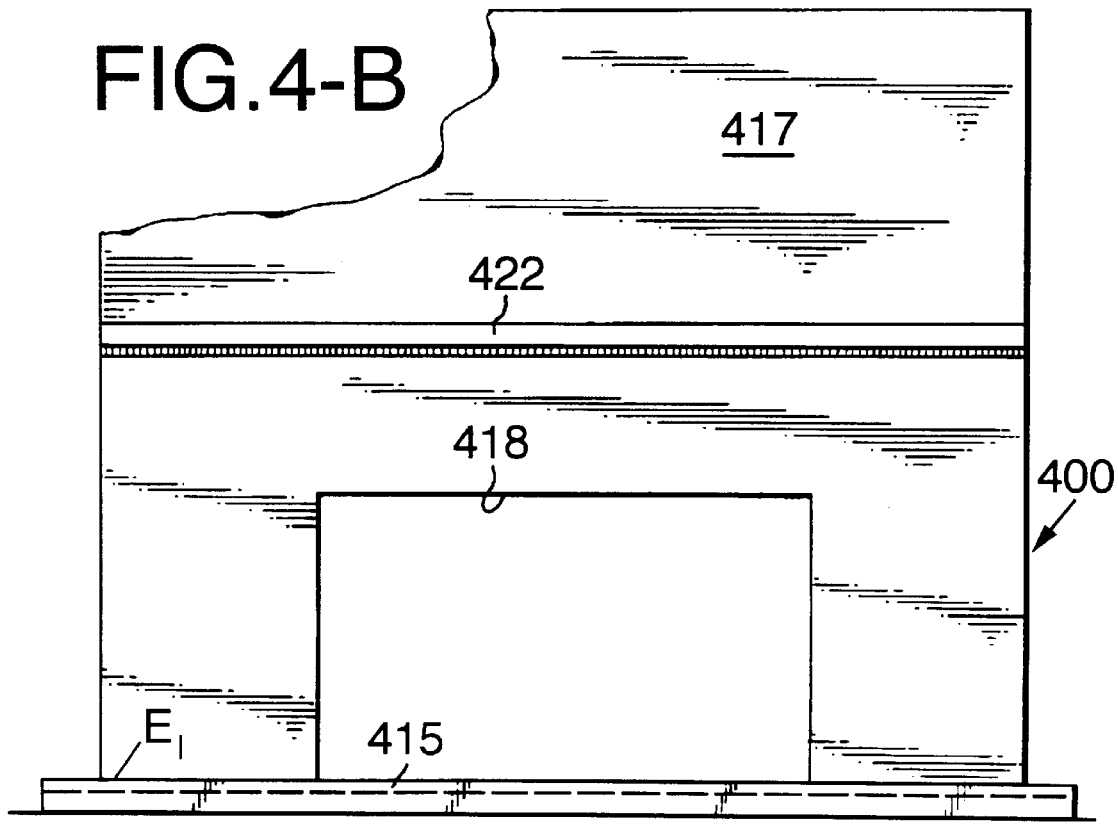
FIG.4-B

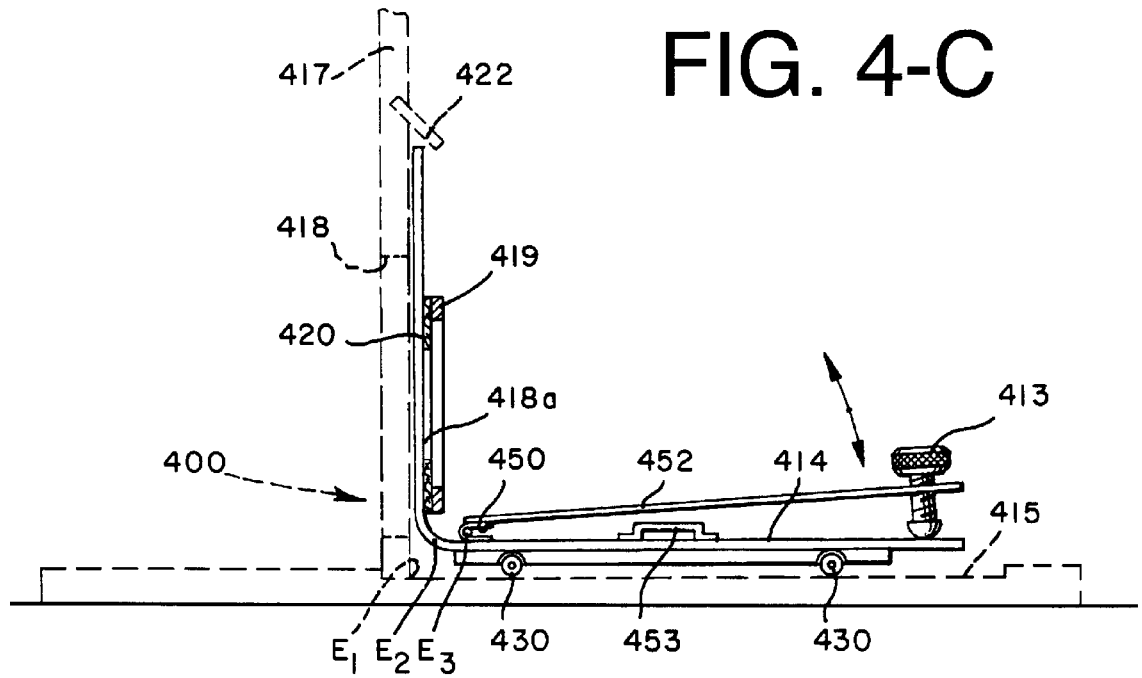
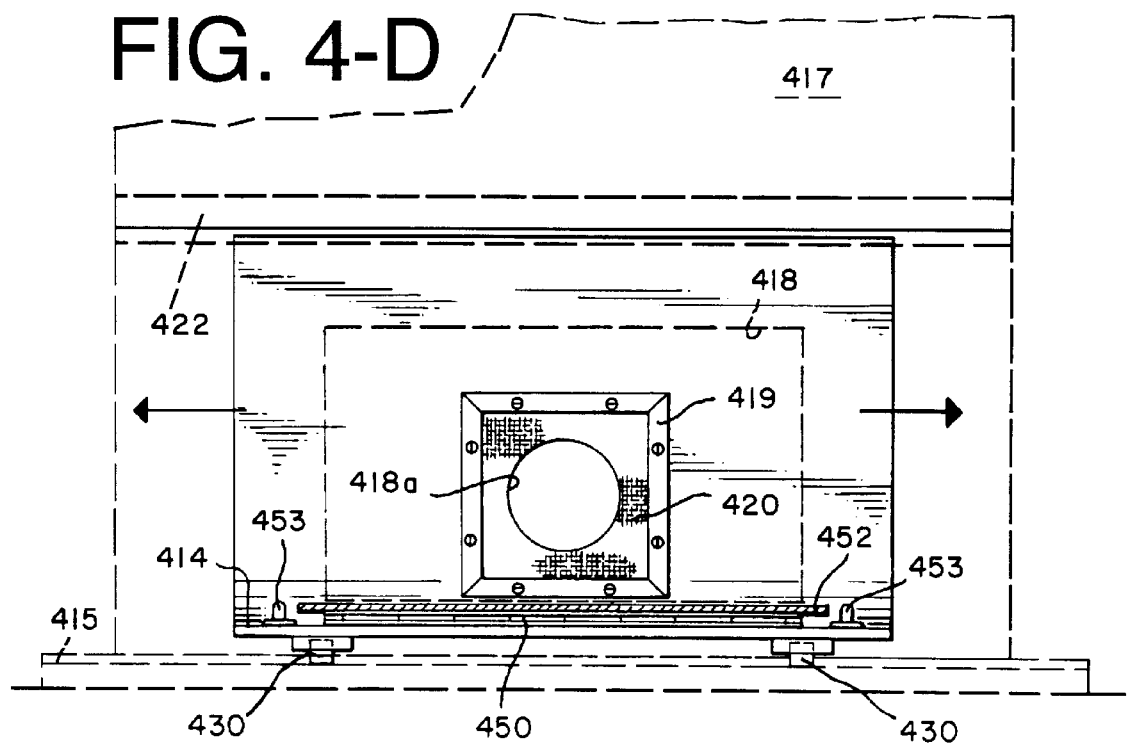

FIG. 4-E
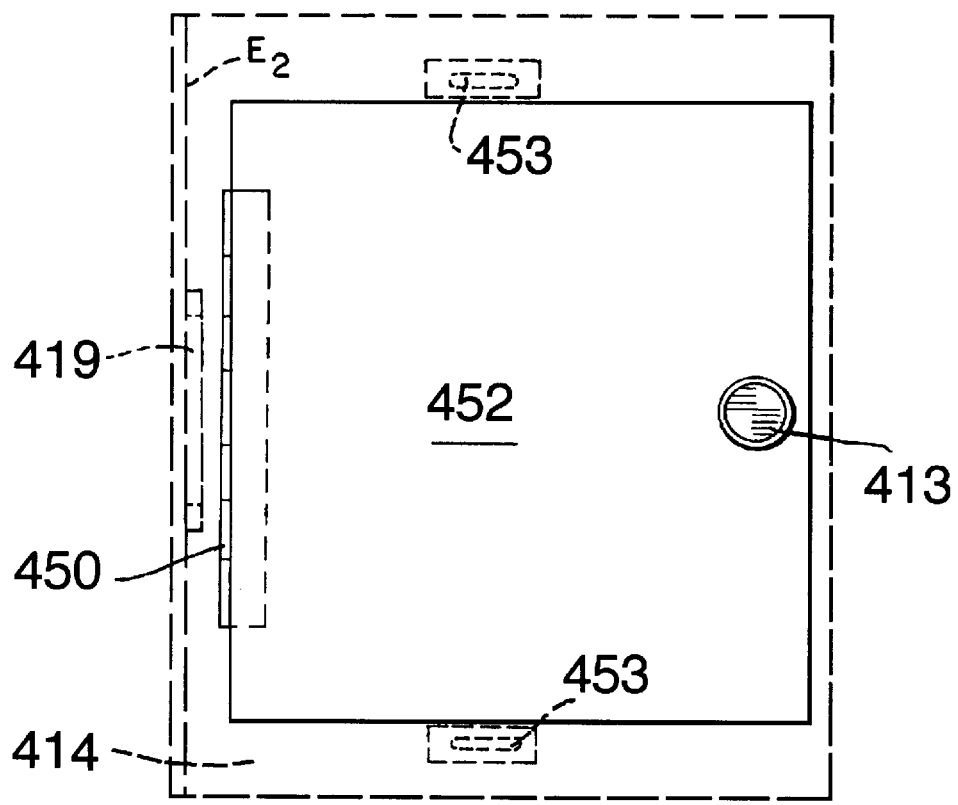
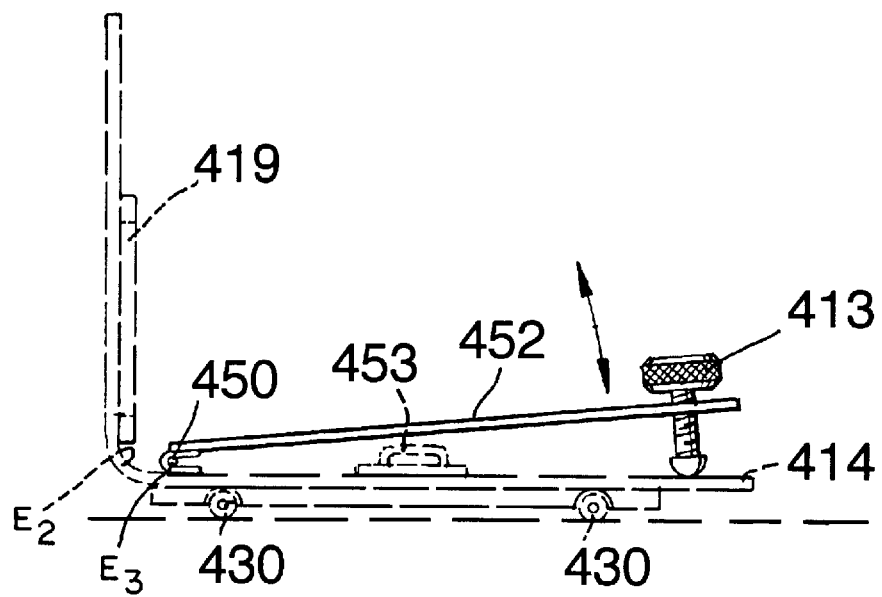
FIG. 4-F

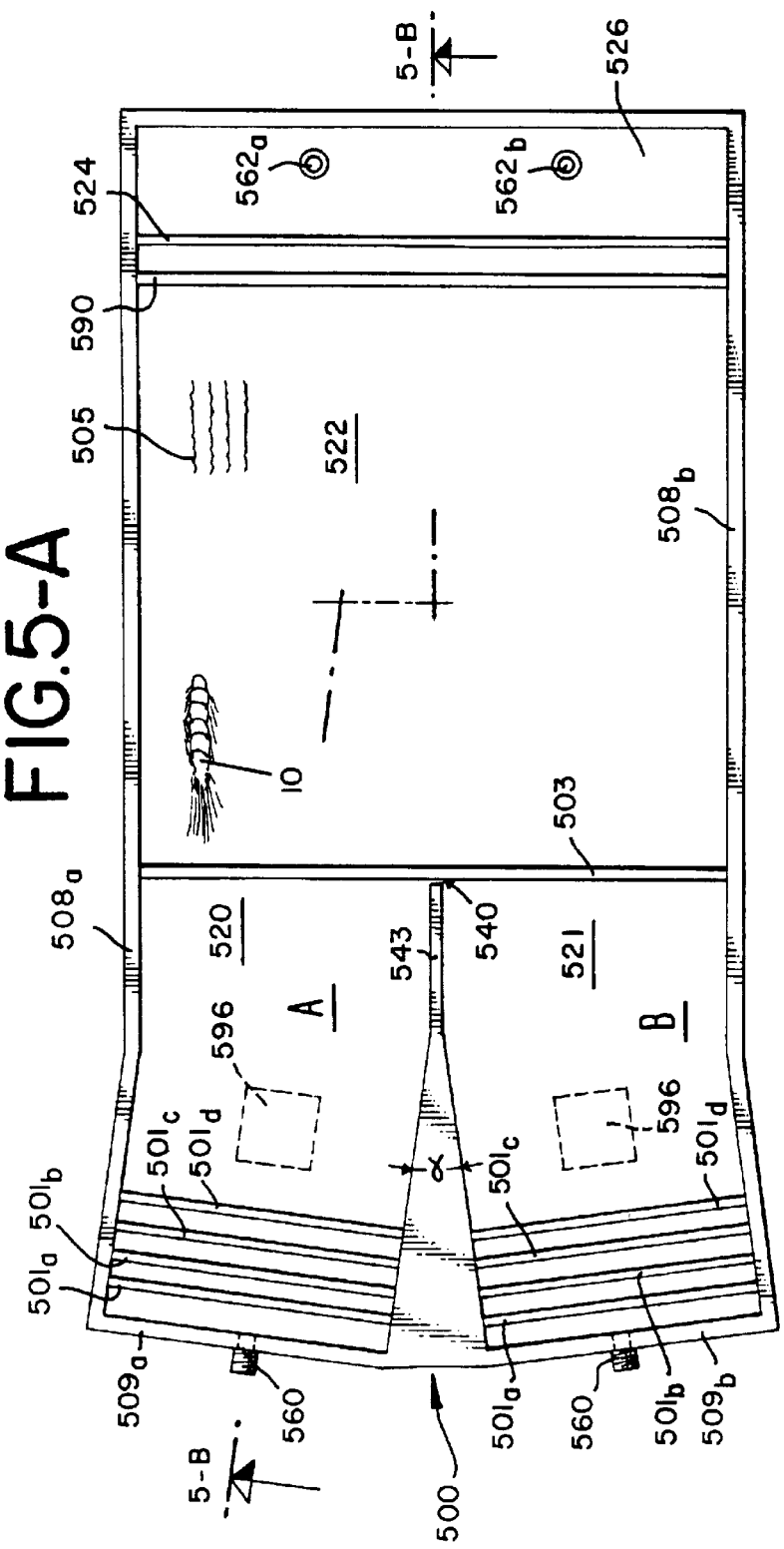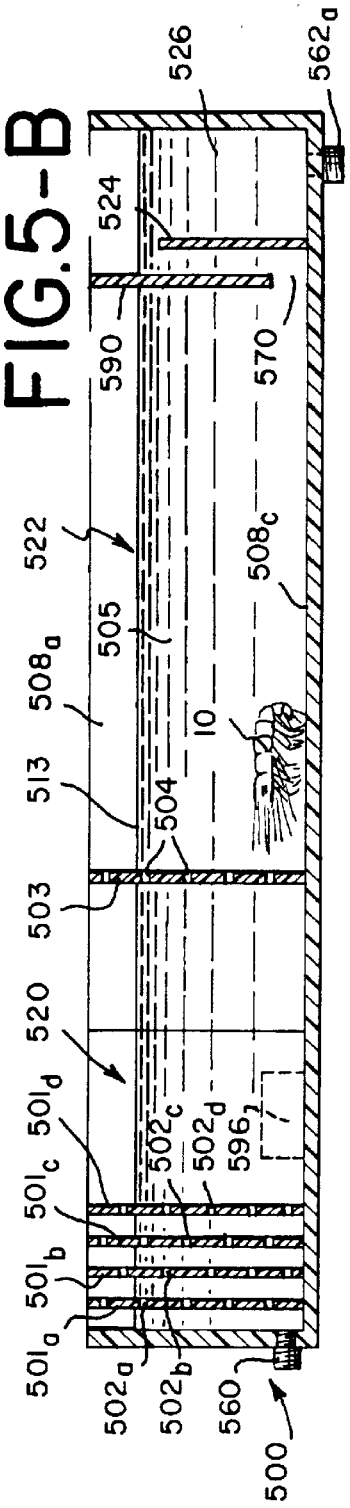

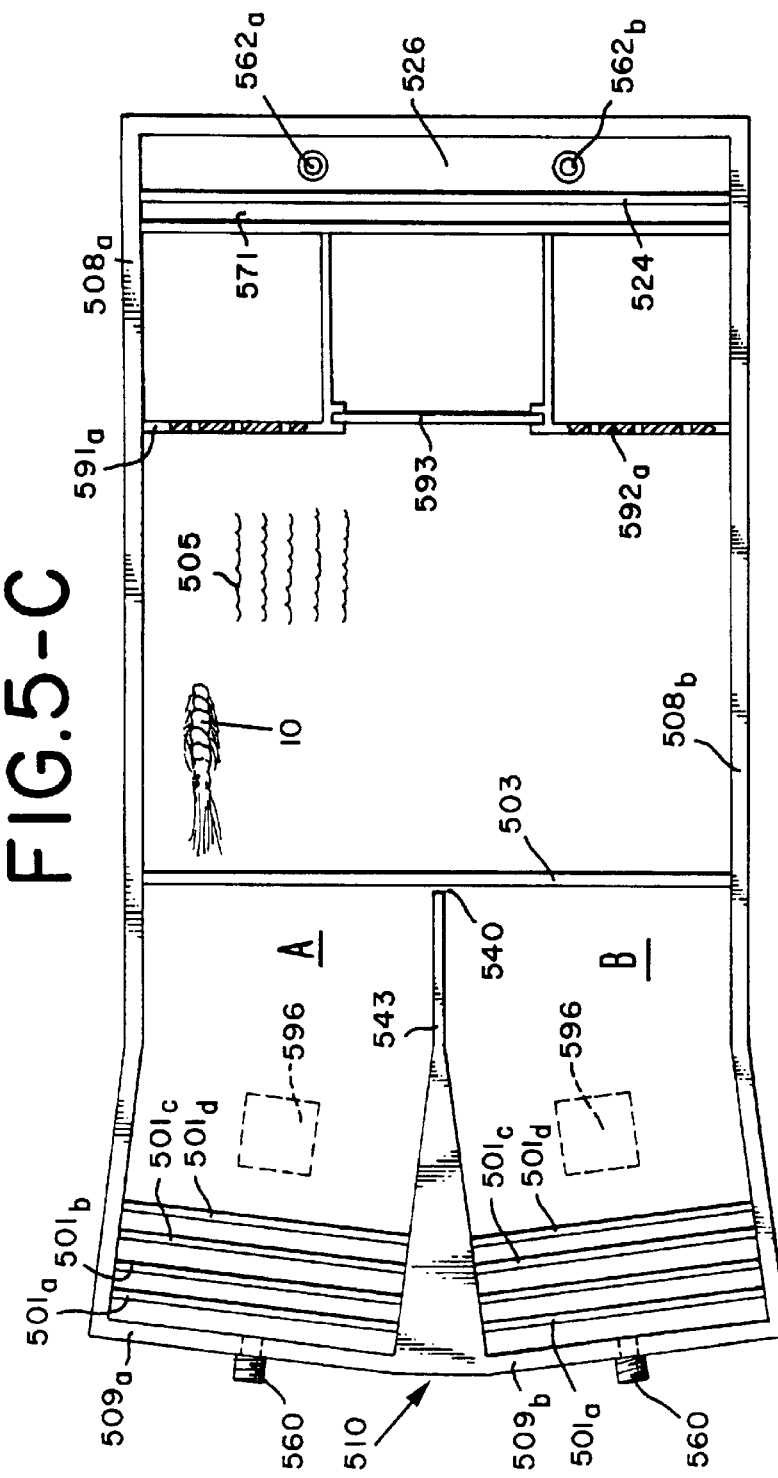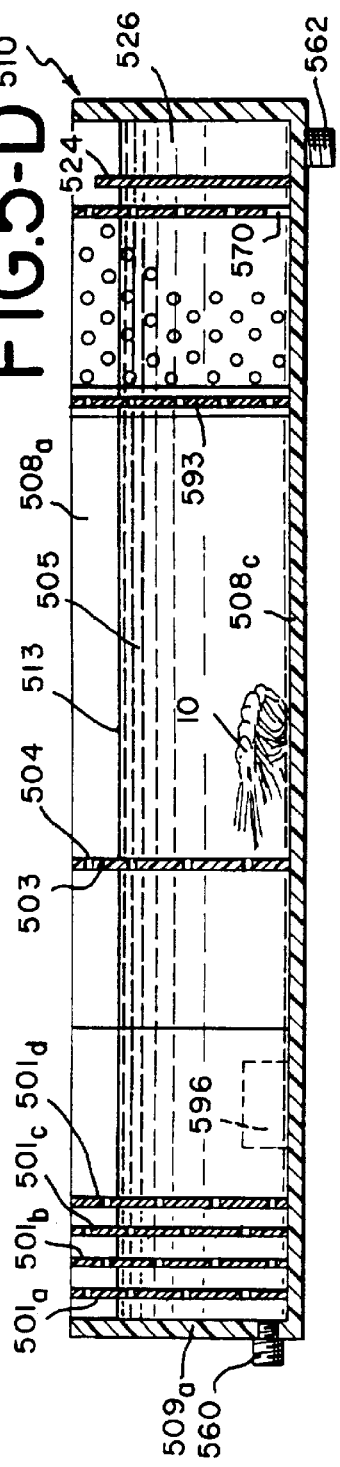

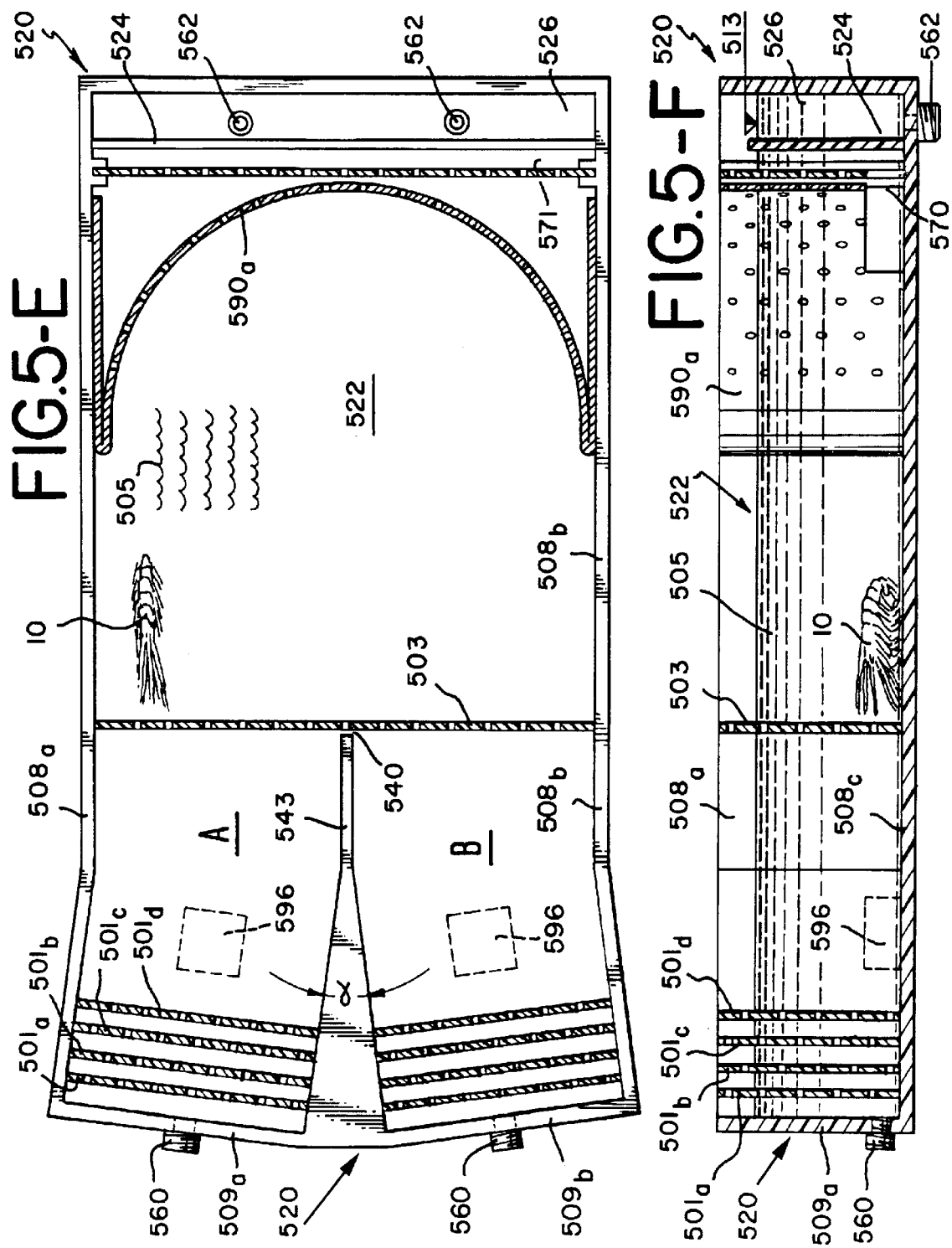

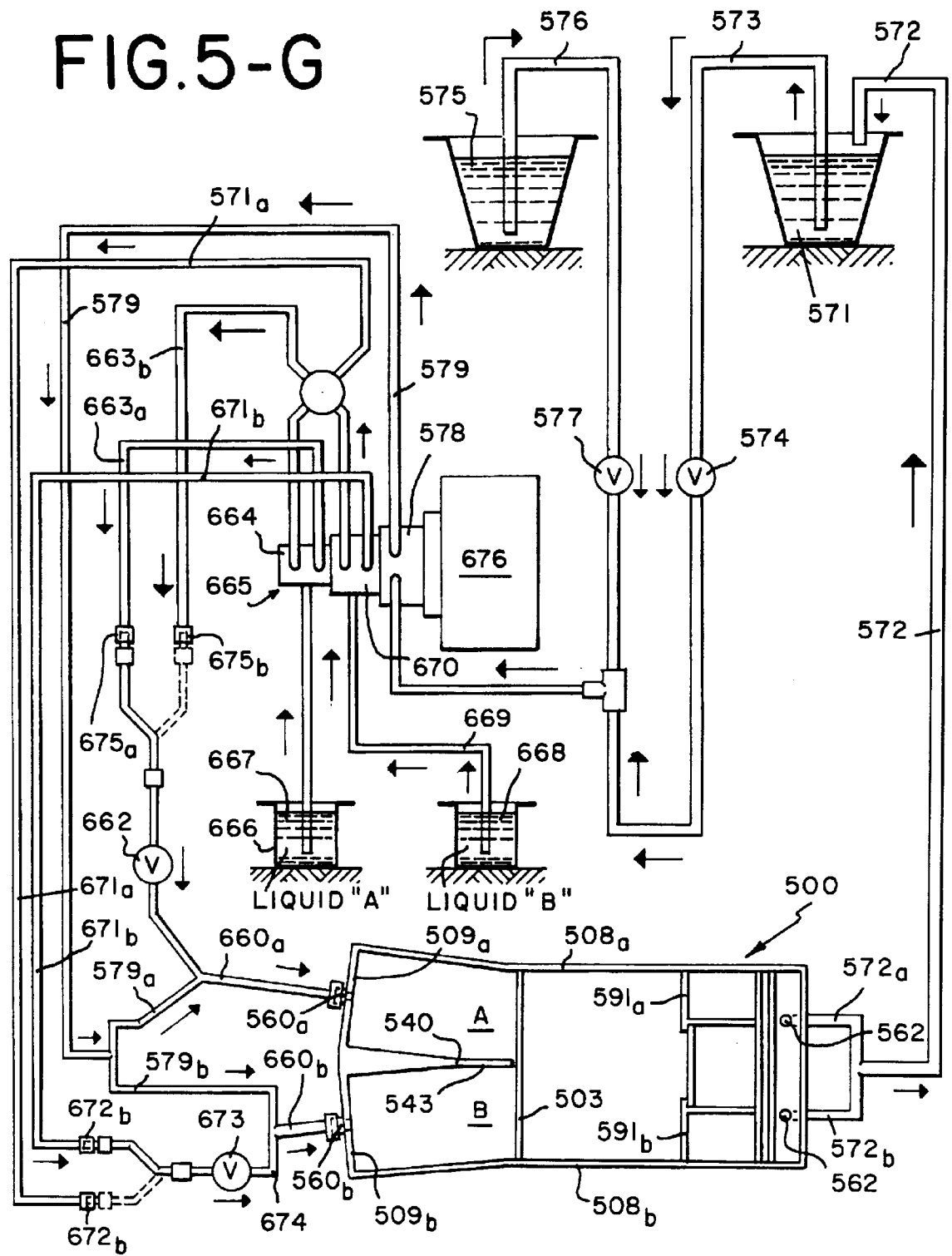
FIG.5-G

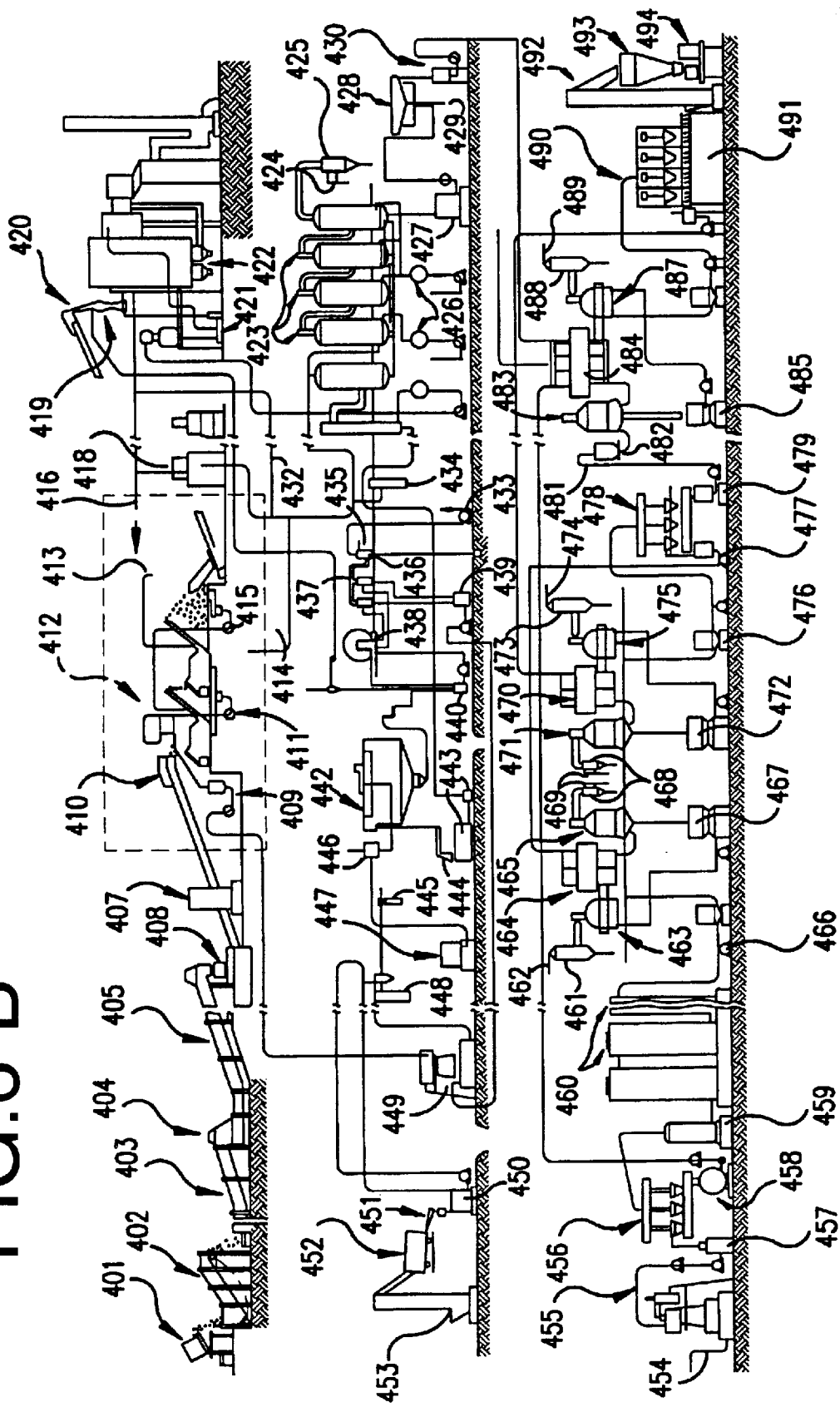
FIG.6-B

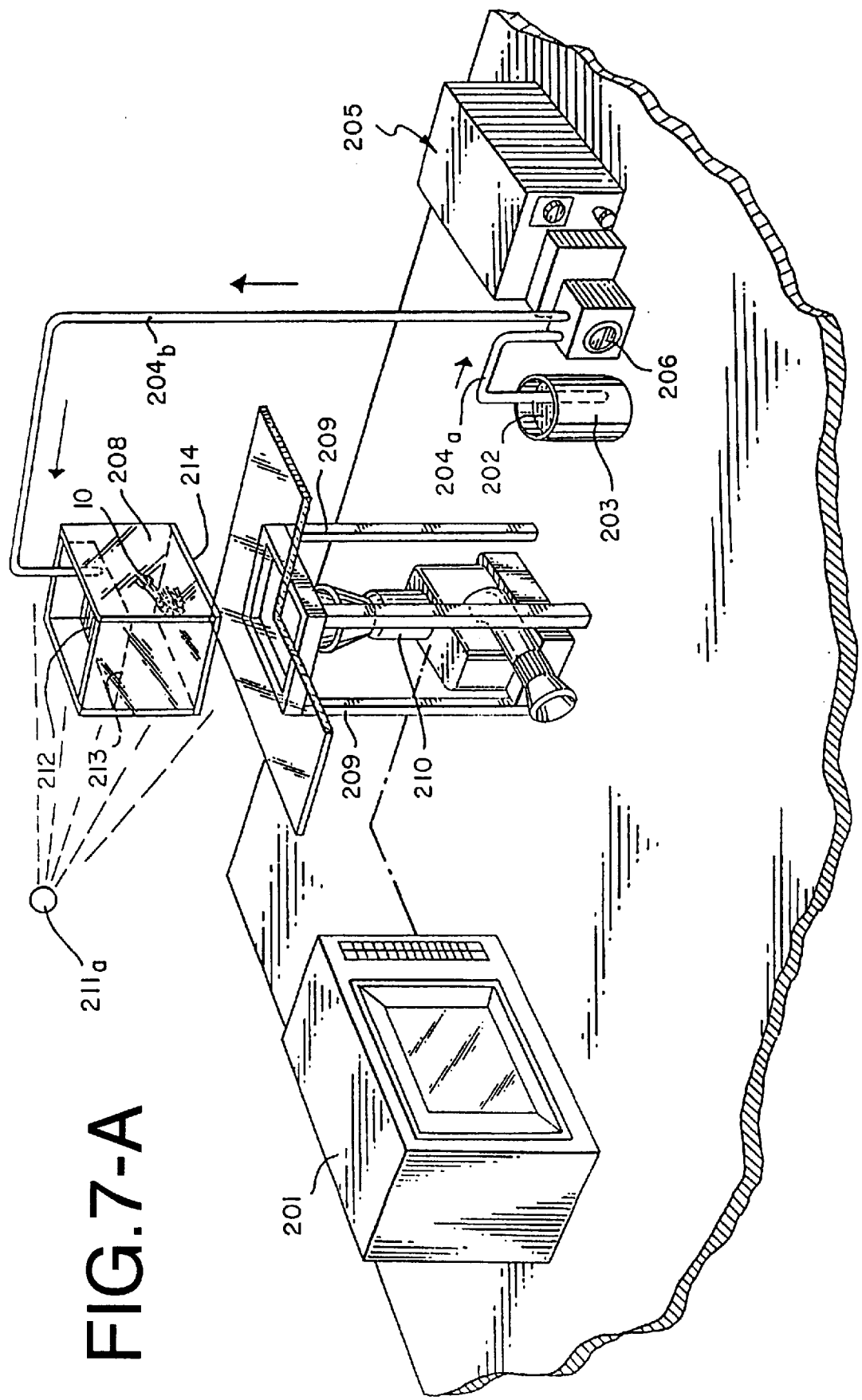
FIG.7-A

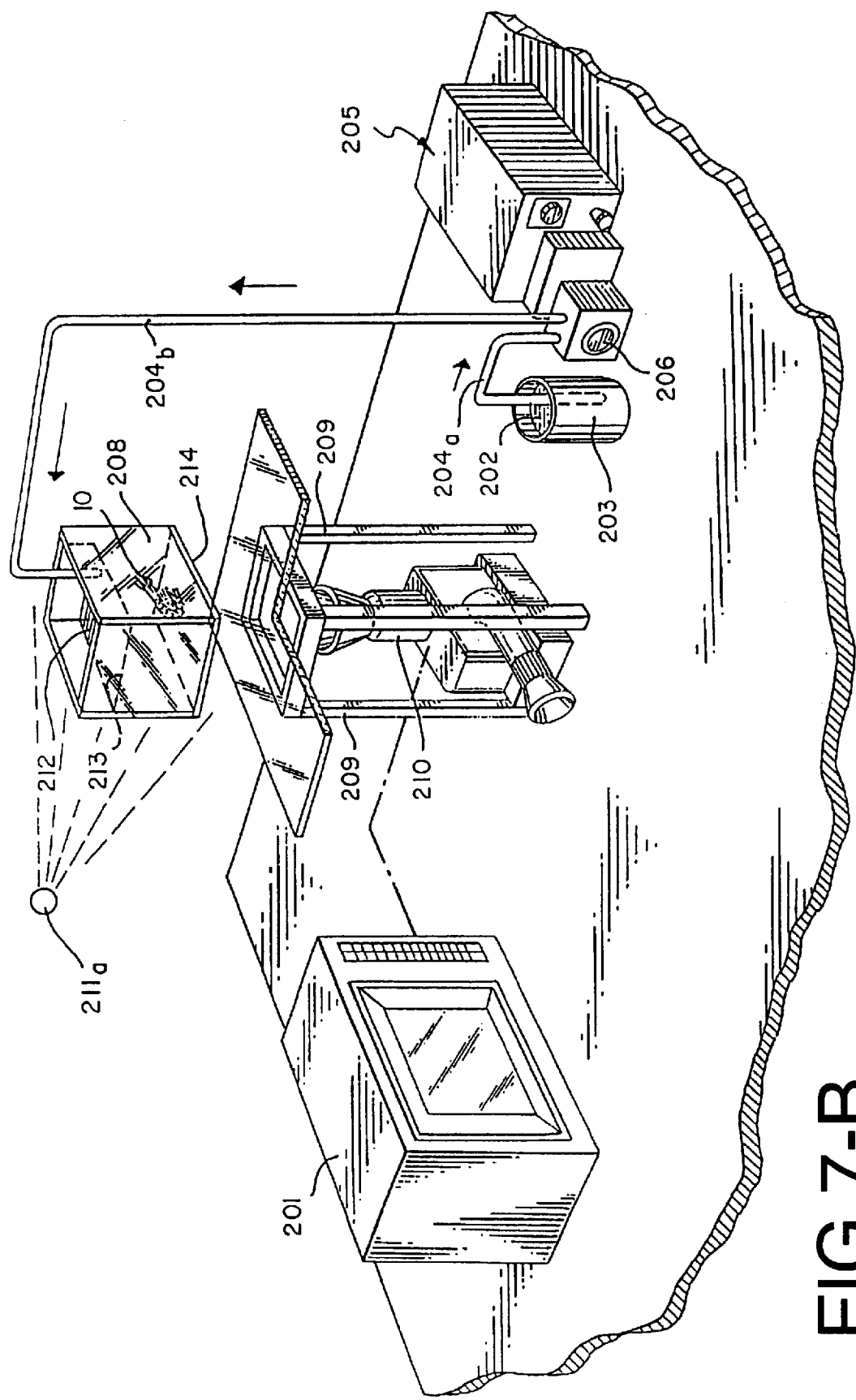
FIG.7-B

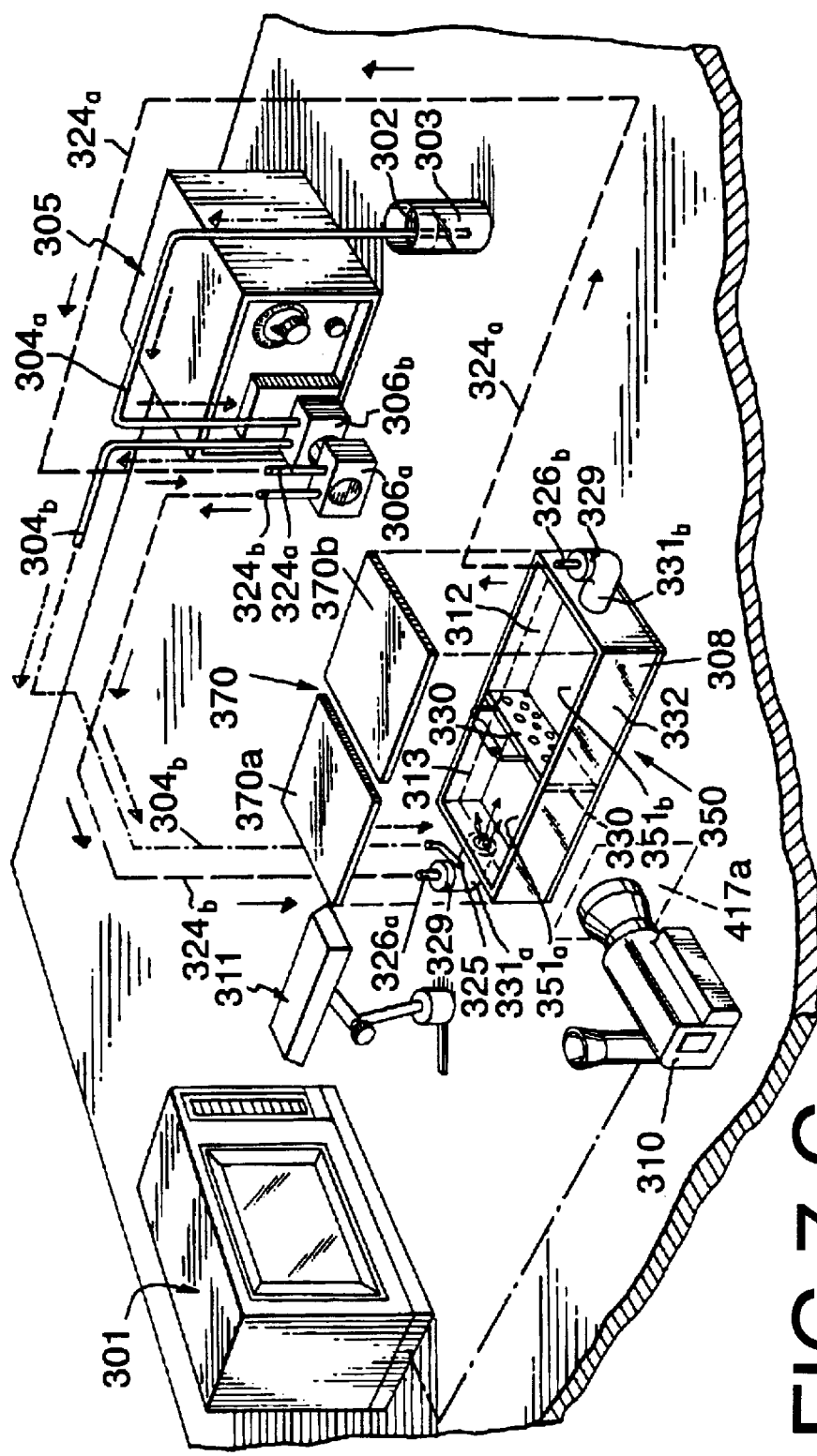
FIG.7-C

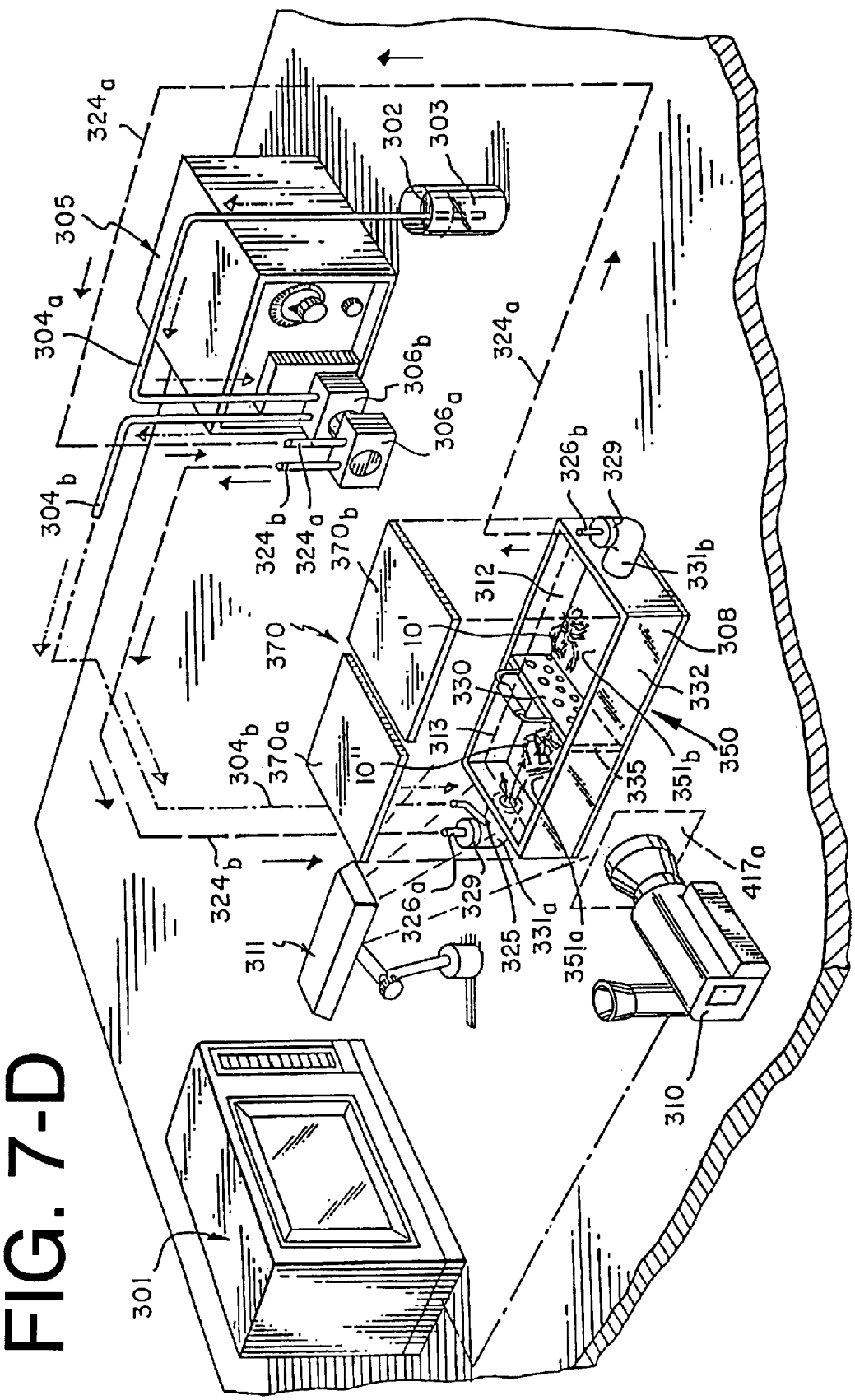
FIG. 7-D

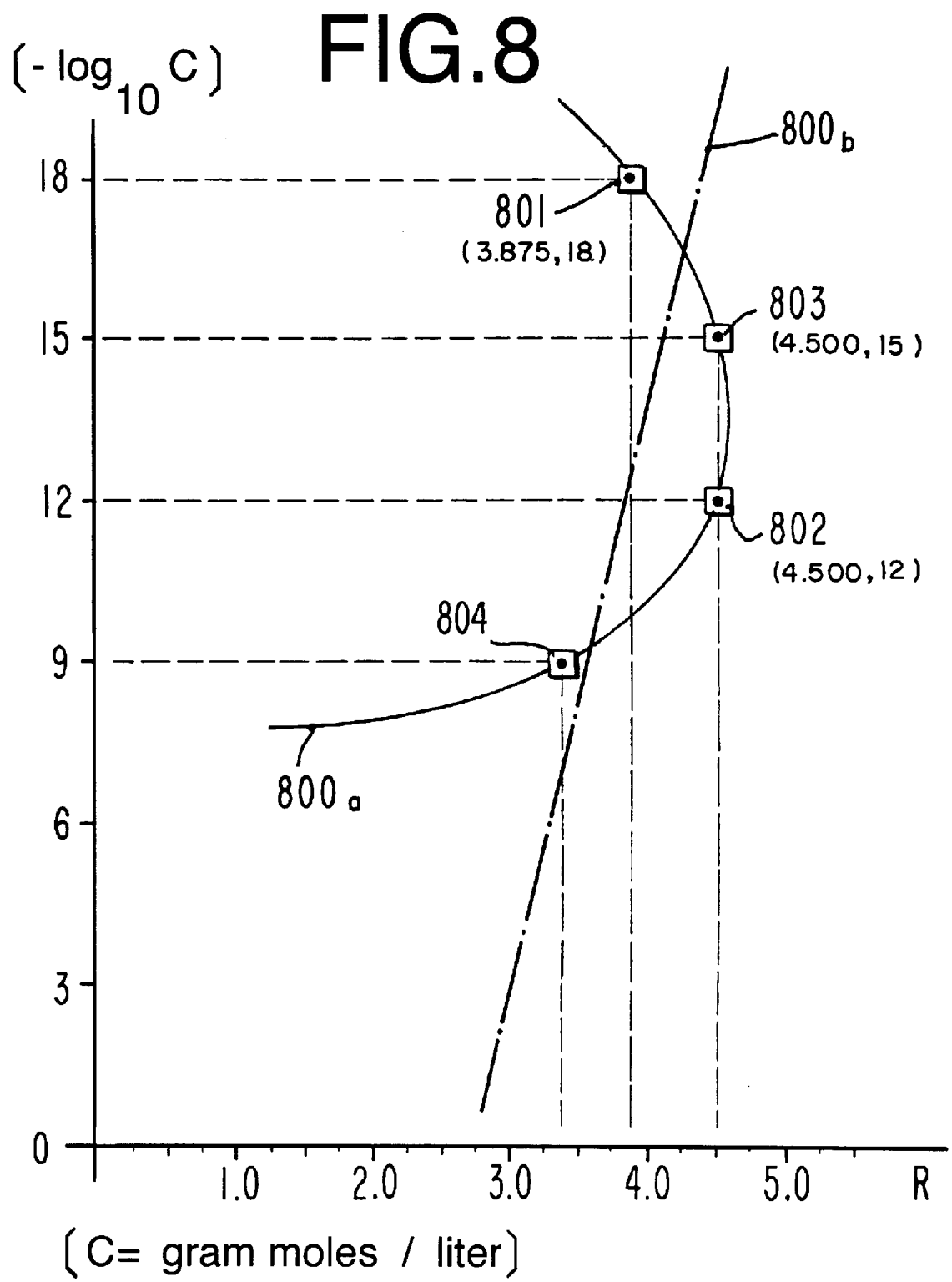

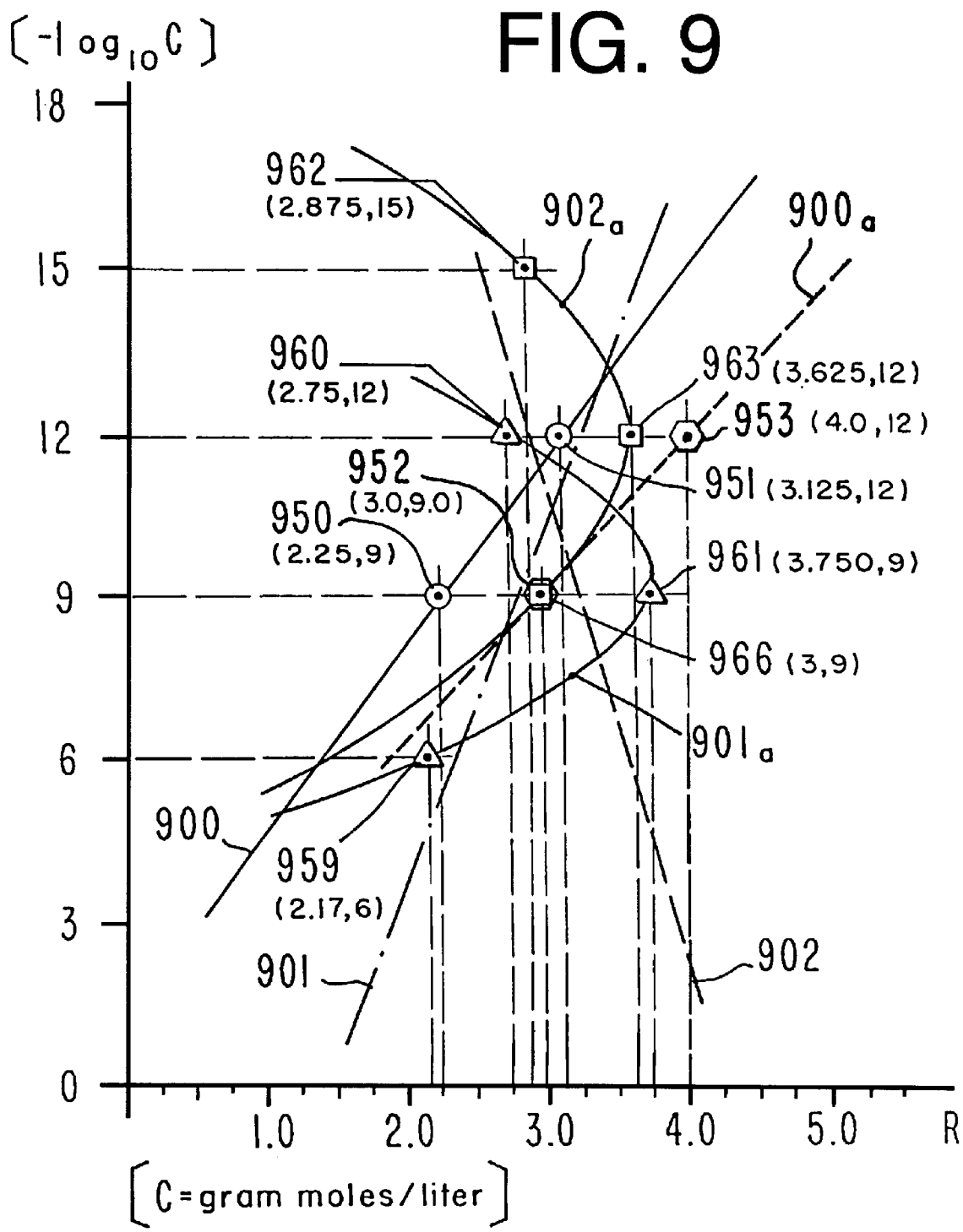

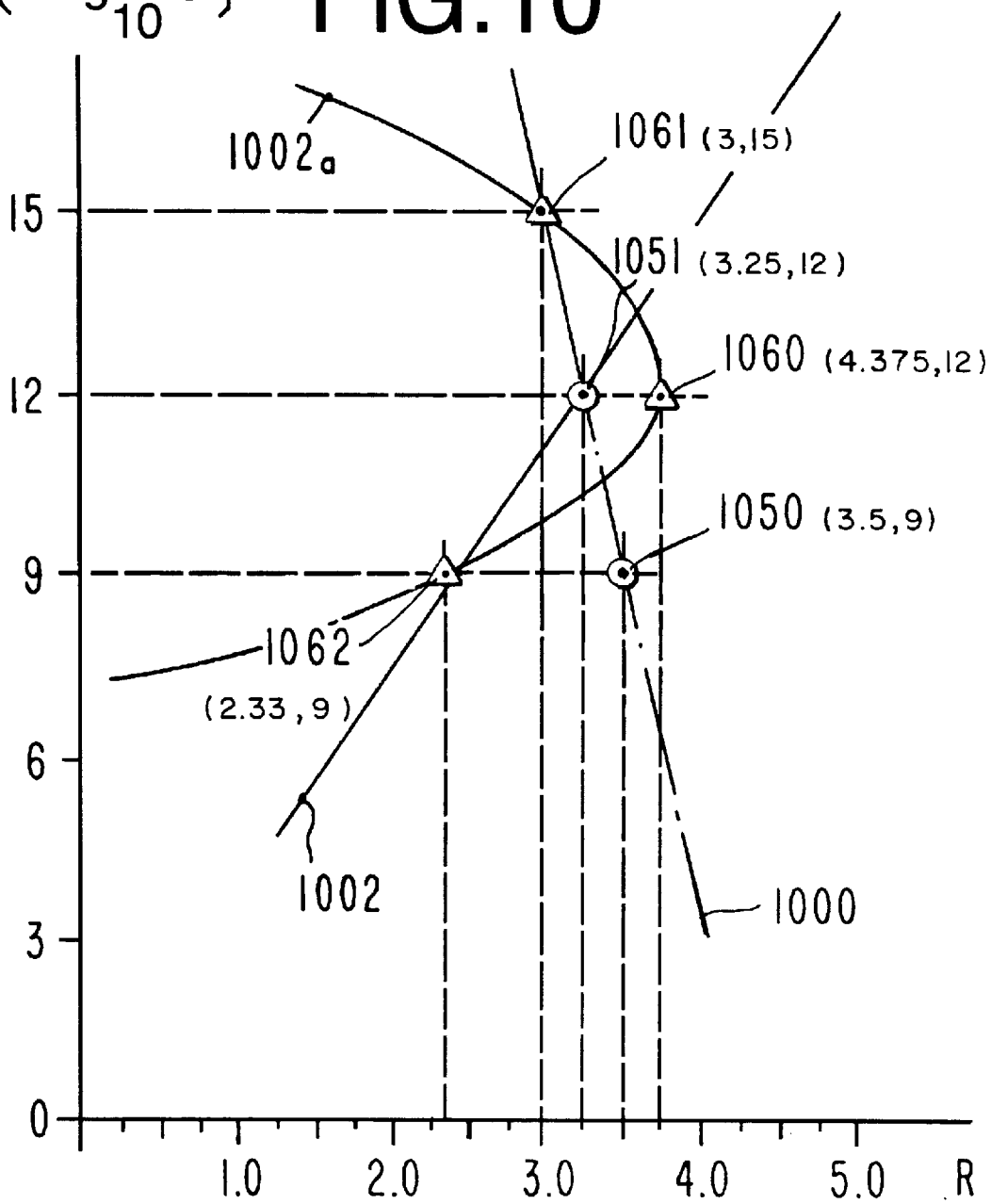

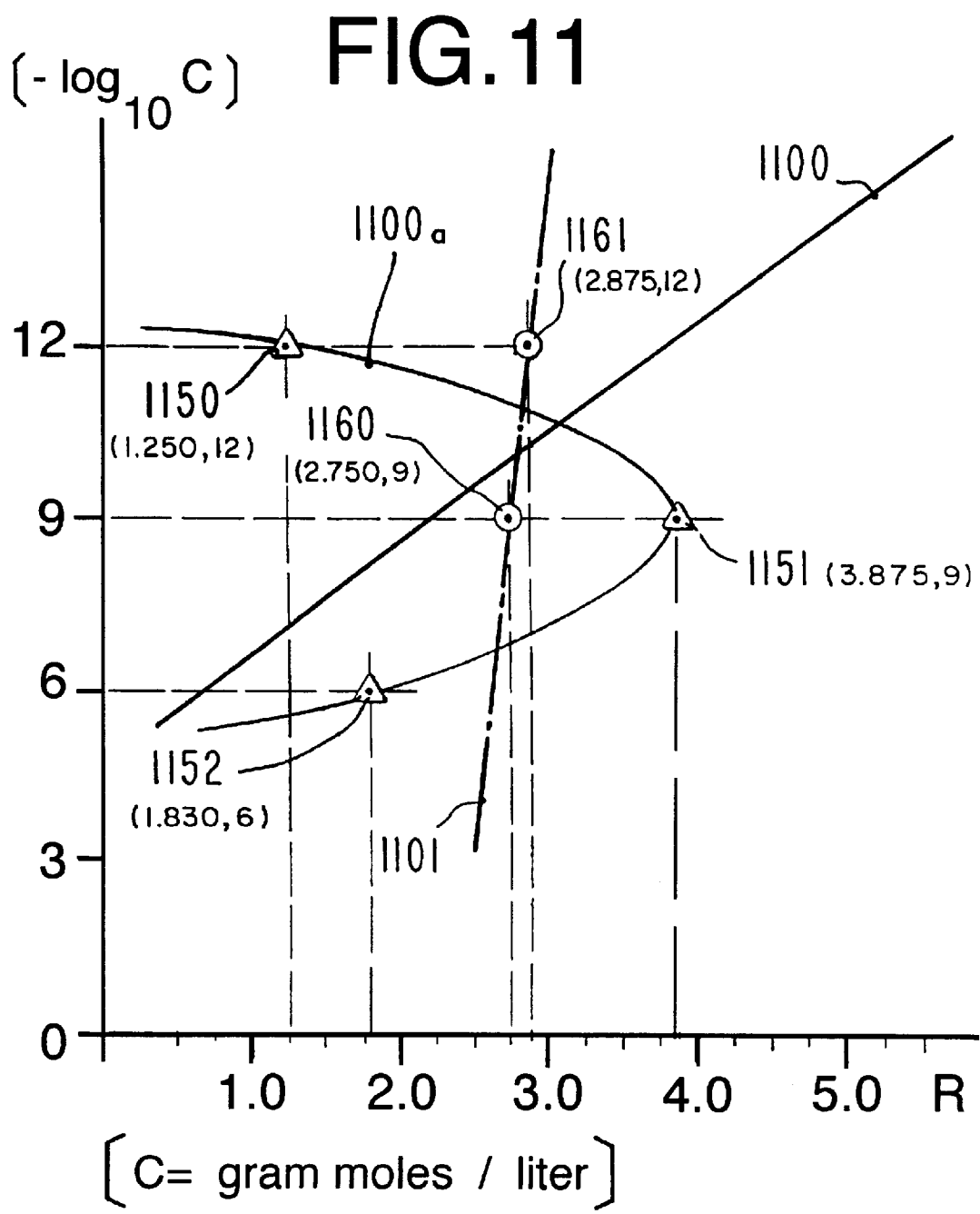

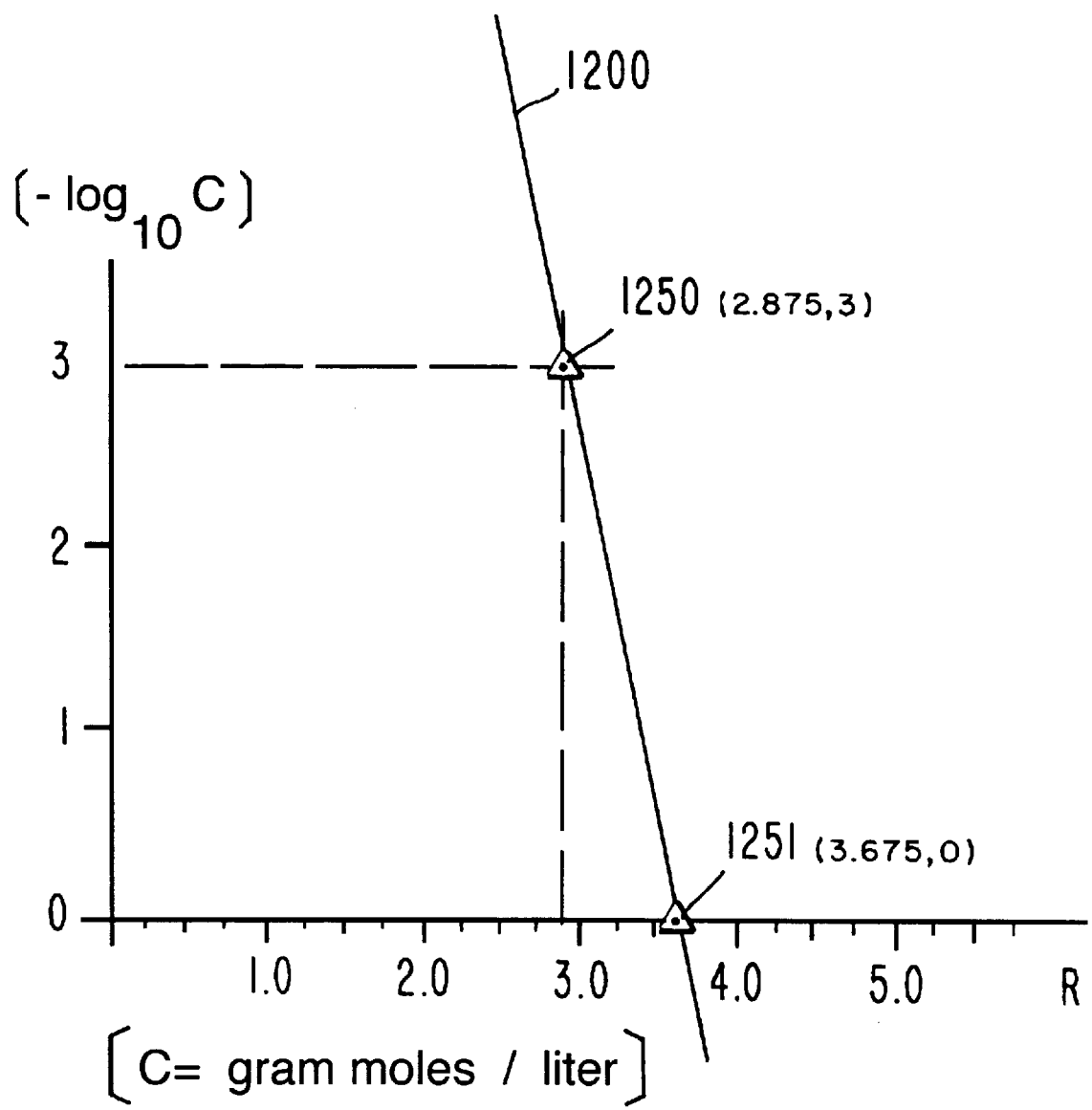

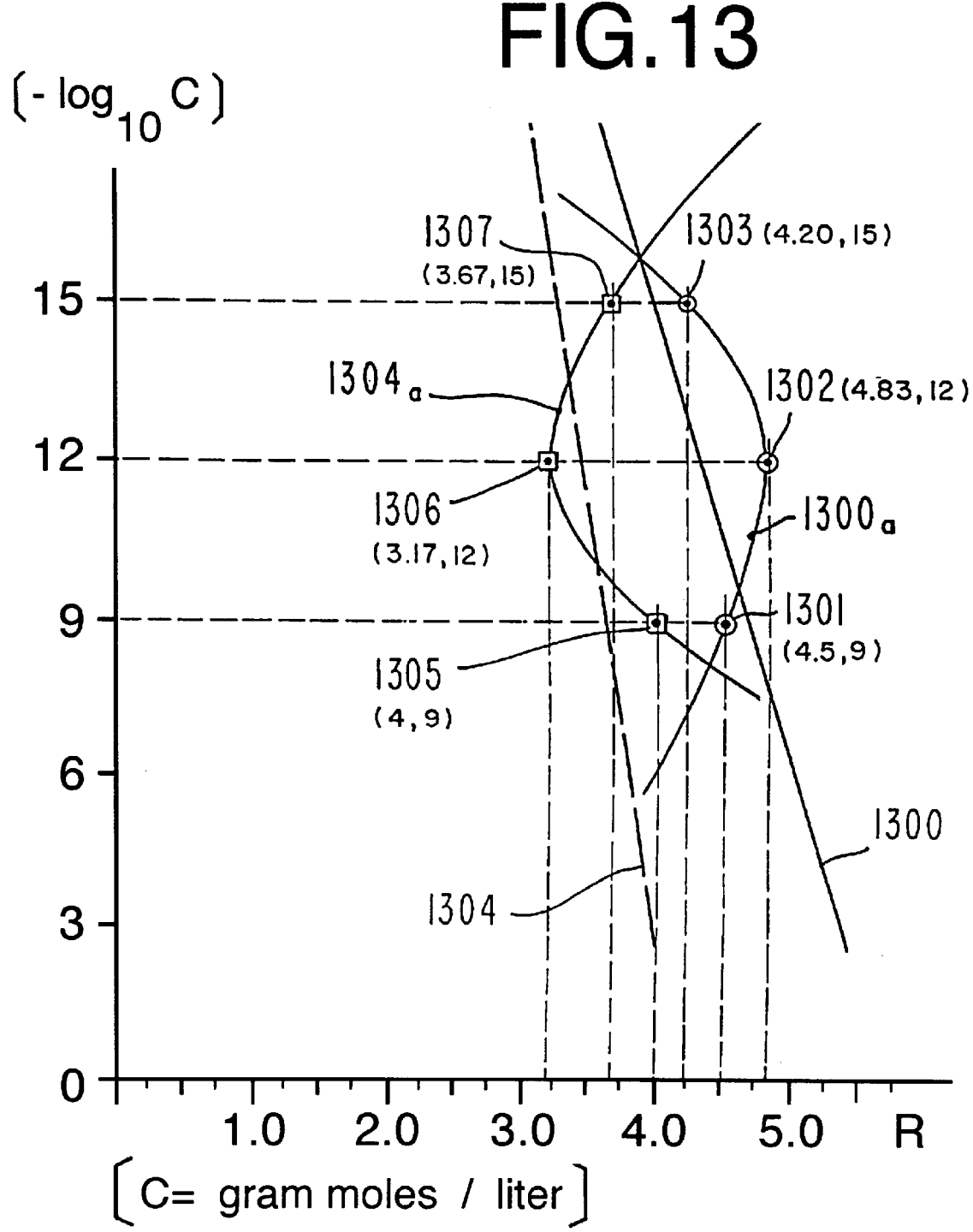

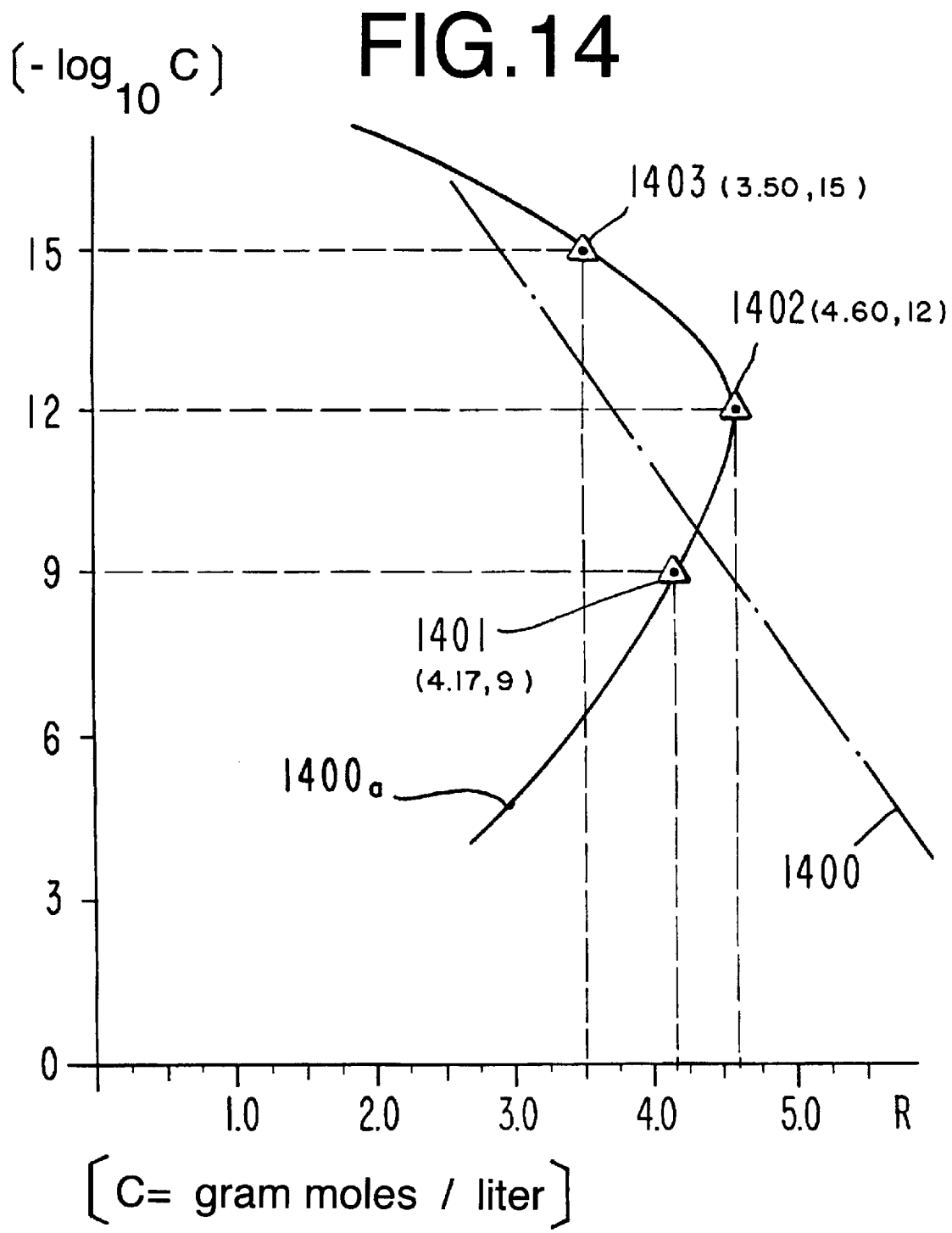

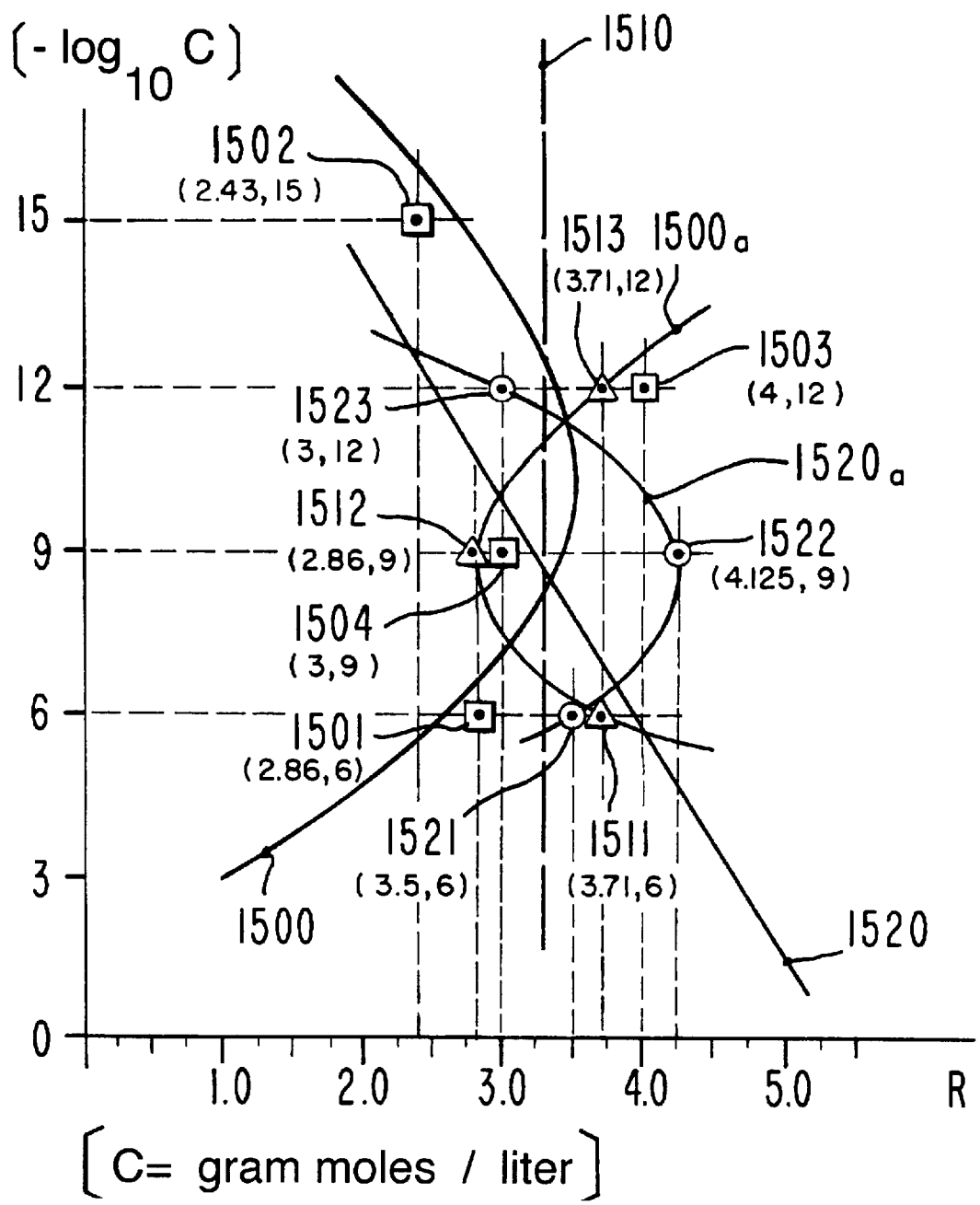

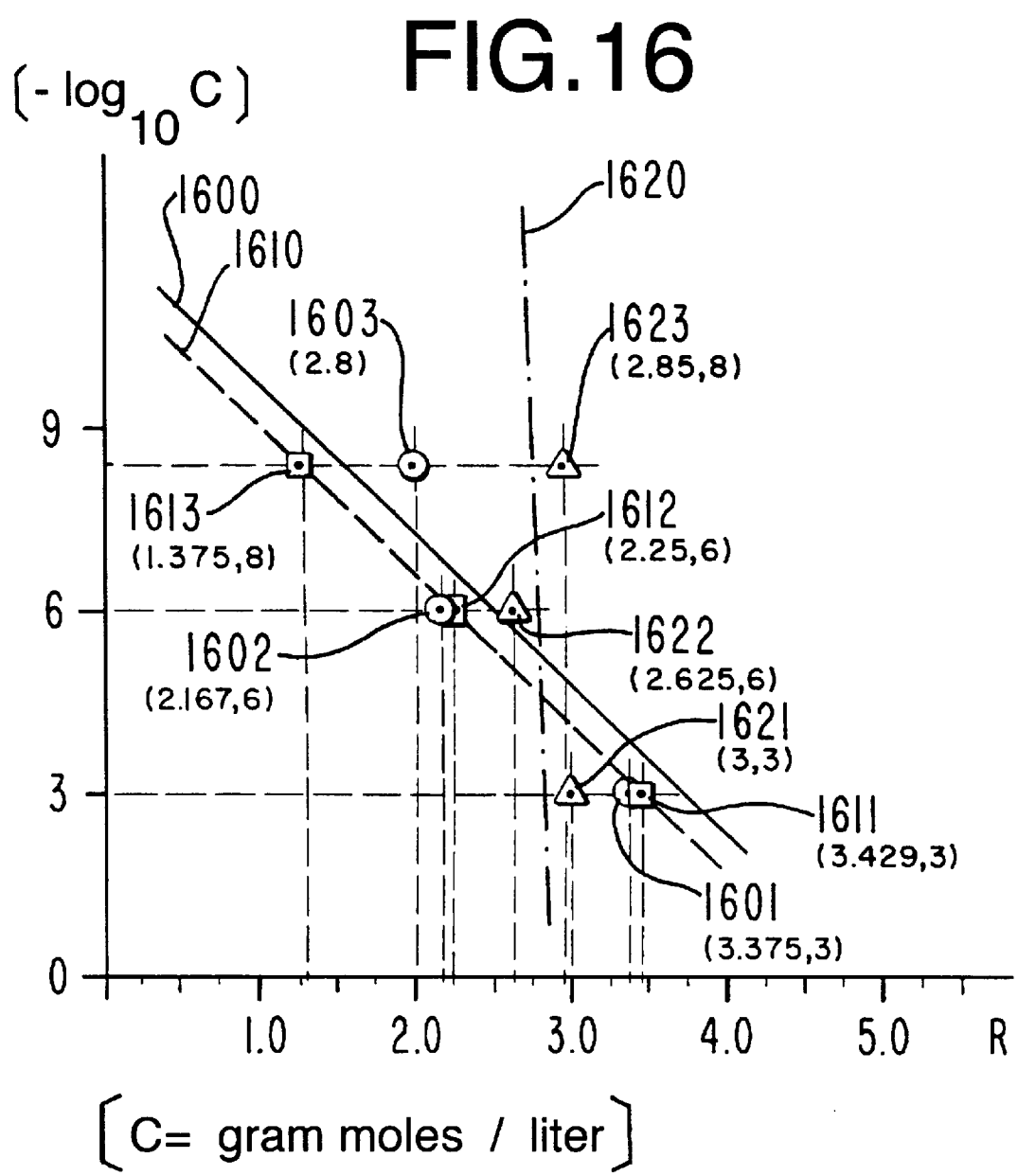

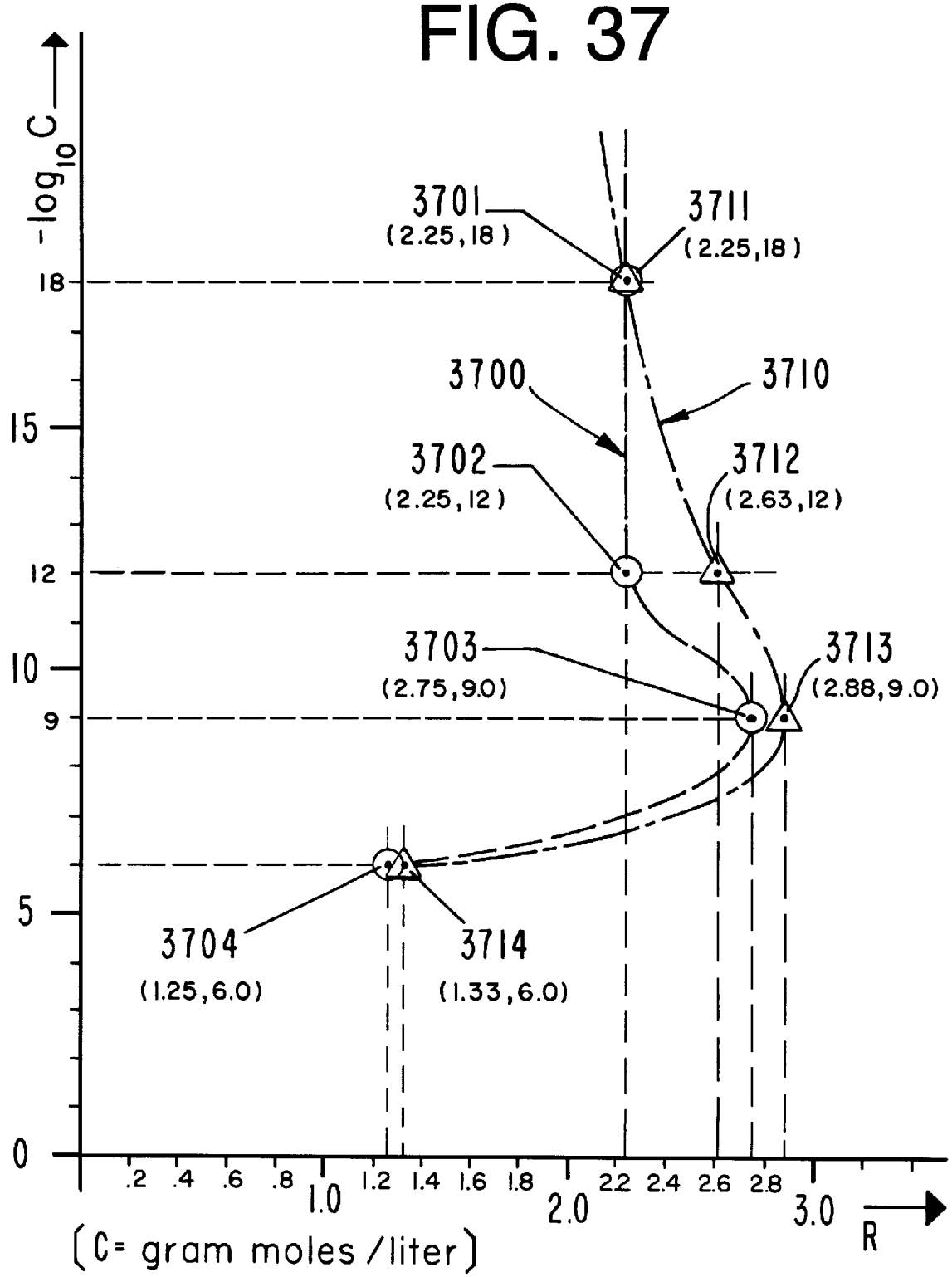

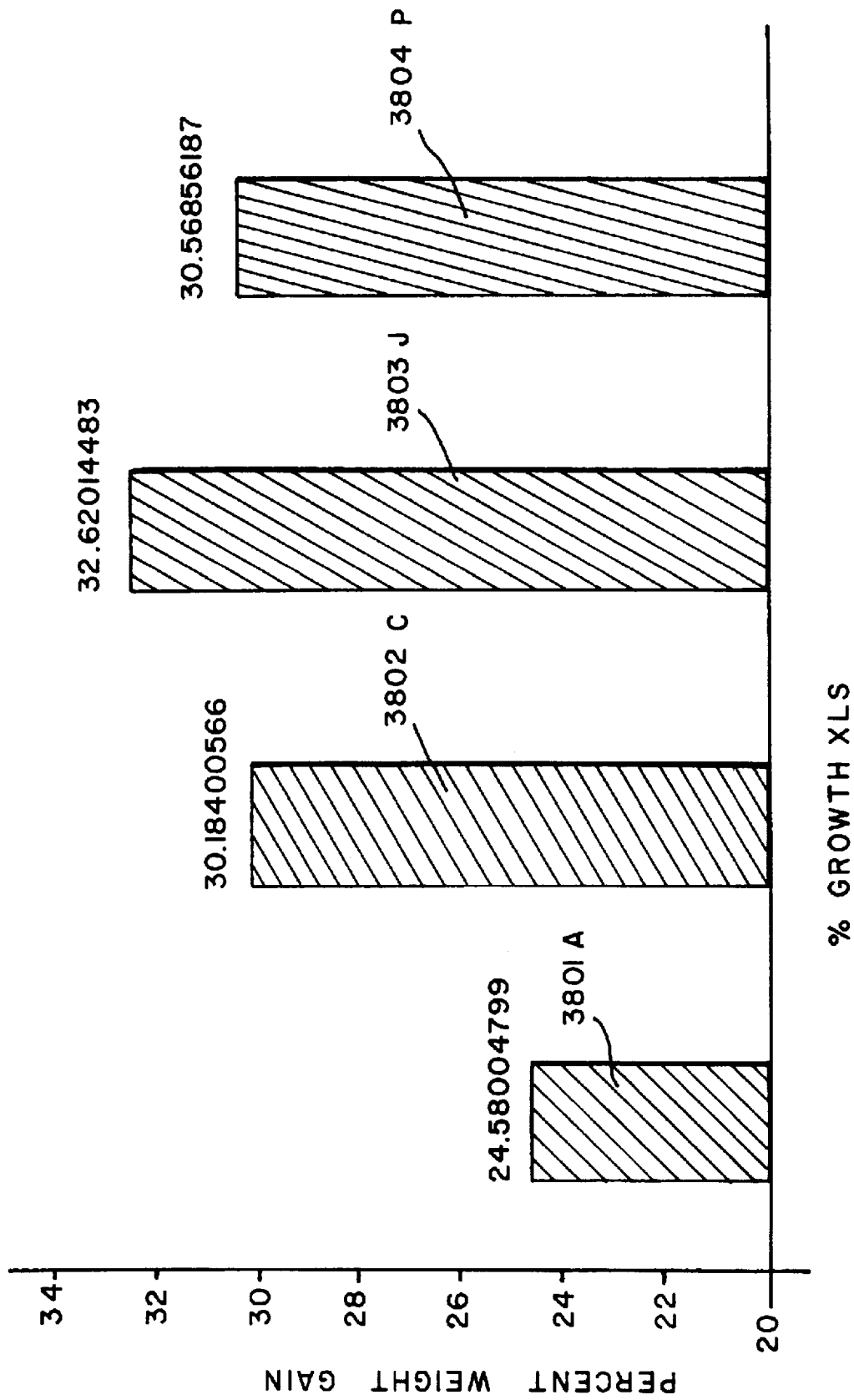
FIG. 38-A

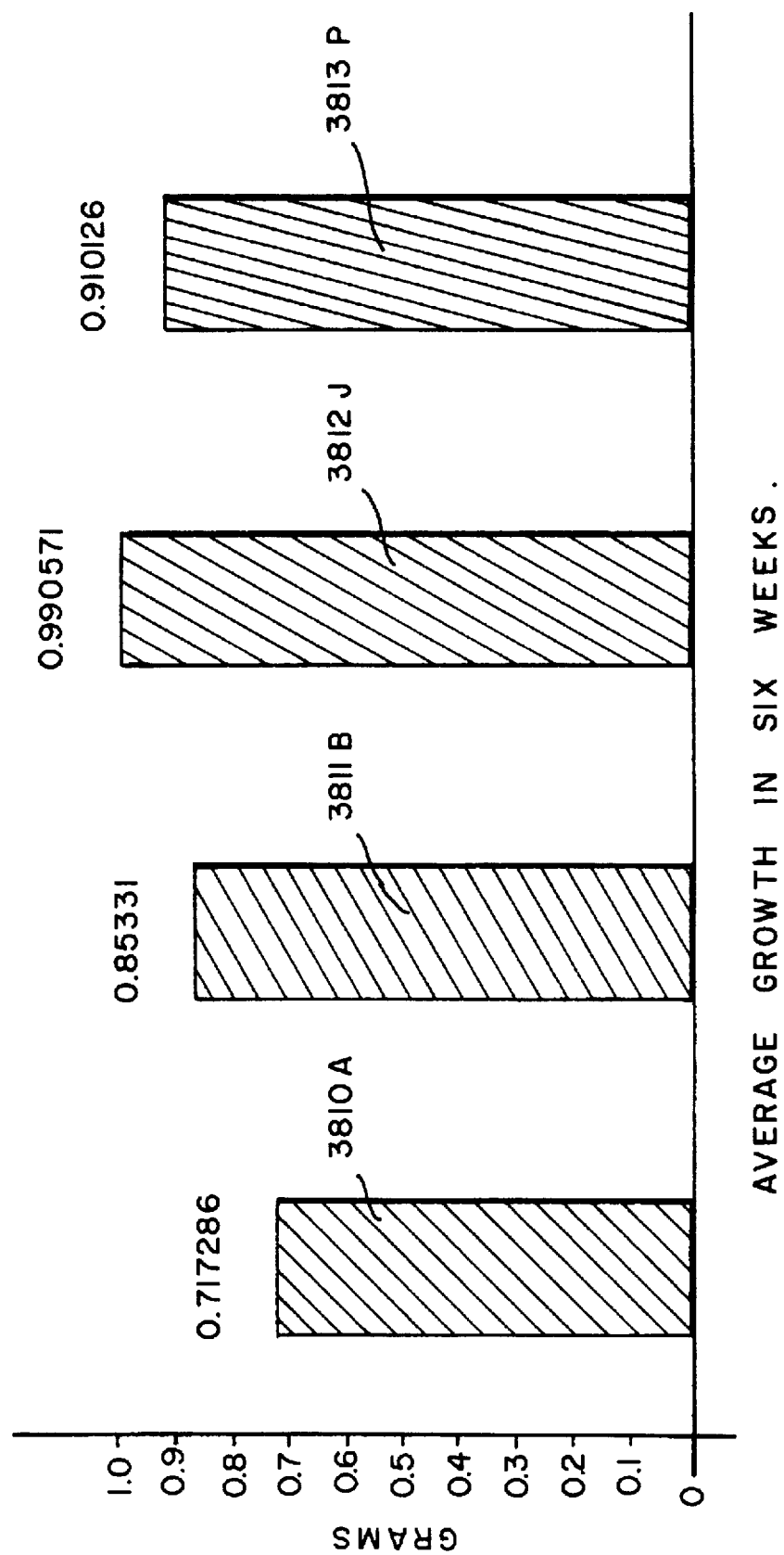

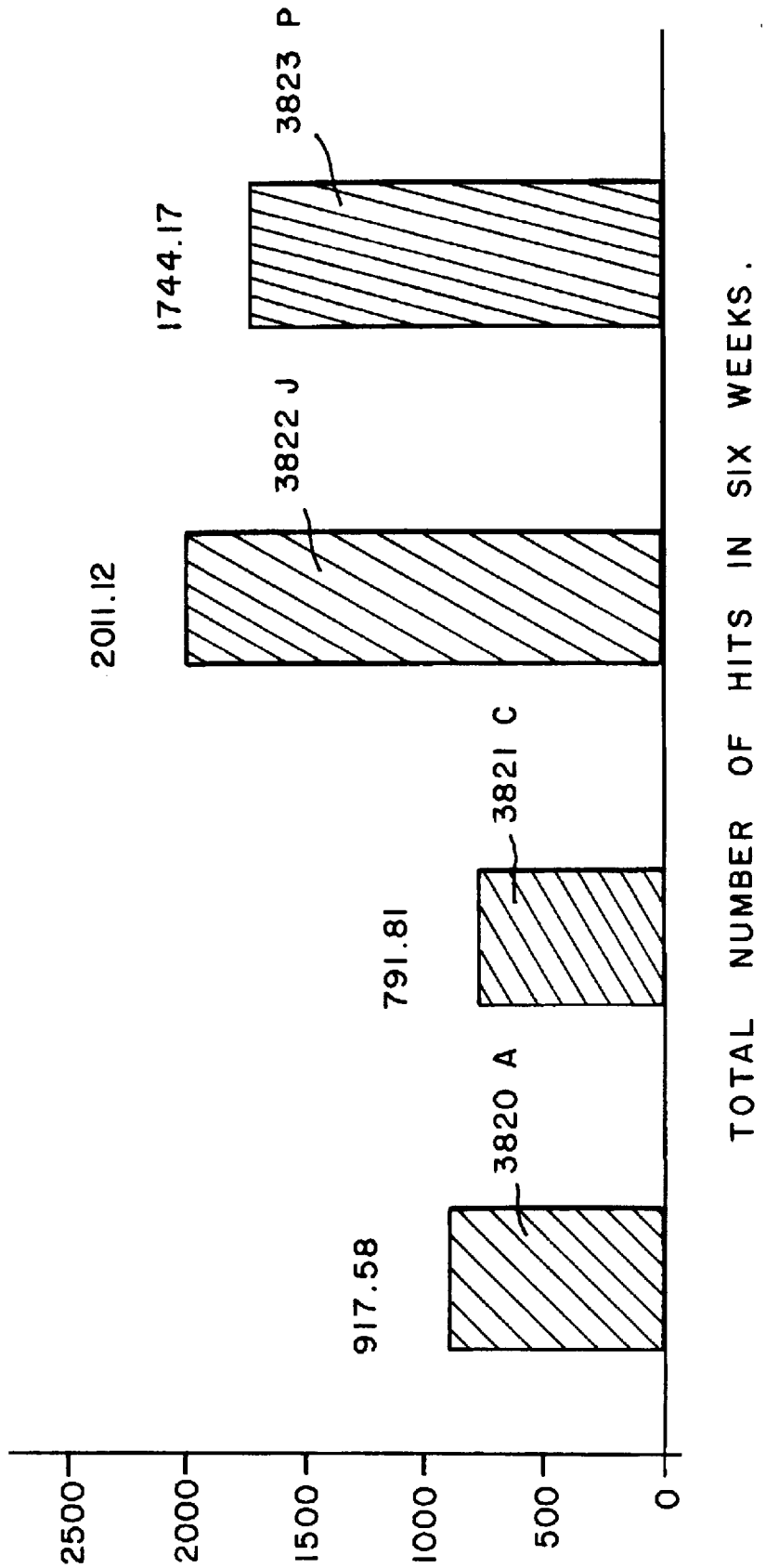
FIG.38-C

PROCESS AND FOR EXCITING, ATTRACTING, STIMULATING, AND/OR INCITING MEMBERS OF THE CLASS CRUSTACEA

This Application is a Continuation-in-Part of Application for U.S. patent Ser. No. 08/413,440 filed on Mar. 30, 1995, now U.S. Pat. No. 5,579,723. [Title: "PROCESS FOR DETERMINING EXCITANTS, ATTRACTANTS, STIMULANTS AND INCITANTS FOR MEMBERS OF THE *PENAEUS* GENUS OF THE CLASS CRUSTACEA, APPARATUS FOR CARRYING OUT SAID PROCESS; METHOD FOR EXCITING AND/OR ATTRACTING AND/OR STIMULATING AND/OR INCITING MEMBERS OF THE *PENAEUS* GENUS OF THE CLASS CRUSTACEA AND FEEDING COMPOSITIONS INCLUDING EXCITANTS, ATTRACTANTS, STIMULANTS AND INCITANTS FOR MEMBERS OF THE *PENAEUS* GENUS OF THE CLASS CRUSTACEA"] which, in turn, is a Continuation-in-Part of Application of Application for U.S. patent, Ser. No. 08/279,181 filed on Jul. 22, 1994, now U.S. Pat. No. 5,474,030 issued on Dec. 12,1995 [Title: "PROCESS OR DETERMINING EXCITANTS AND ATTRACTANTS FOR MEMBERS OF THE *PENAEUS* GENUS OF CRUSTACEA, APPARATUS FOR CARRYING OUT SAID PROCESS AND METHOD FOR EXCITING AND/OR ATTRACTING MEMBERS OF THE *PENAEUS* GENUS OF CRUSTACEAN"].

An additional related copending application is Application for U.S. Pat. No. 08/535,737 filed on Sep. 28, 1995 now U.S. Pat. No. 5,706,759 (Attorney's Docket No. IFF-9850K) entitled: "PROCESS FOR DETERMINING EXCITANTS, ATTRACTANTS AND STIMULANTS FOR MEMBERS OF THE *PROCAMBRUS CLARKII* SPECIES OF THE CLASS CRUSTACEA, AND METHOD FOR EXCITING AND/OR ATTRACTING AND/OR STIMULATING MEMBERS OF THE *PROCAMBRUS CLARKII* SPECIES OF THE CLASS CRUSTACEA". This application is also a Continuation-in-Part of Application for U.S. patent Ser. No. 08/279,181 filed on Jul. 22, 1994 now U.S. Pat. No. 5,474,030.

BACKGROUND OF THE INVENTION

Our invention is drawn to a process for determining excitants, stimulants, attractants and incitants for members of the Class Crustacea and a method for exciting, inciting, stimulating and/or attracting members of the Class Crustacea by means of placing within a body of saline water near a surface or throughout the volume to which such Crustacea are desired to be attracted, stimulated, incited and/or excited, Crustacea attracting, stimulating, inciting and/or exciting concentration and quantity of at least one of the substances:

(i) N-acetyl-D-Glucosamine, an epimeric mixture of compounds having the structures:

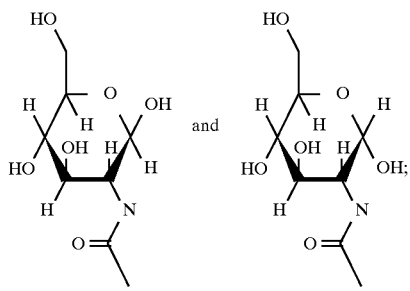

(ii) S-methyl methionine sulfonium halides defined according to the structure:

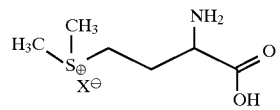

(wherein X is chloro or bromo);

(iii) methionine having the structure:

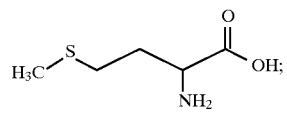

(iv) trimethyl amine oxide hydrate having the structure:

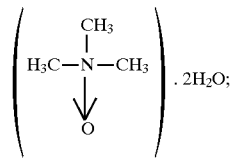

(v) 1-octen-3-ol having the structure:

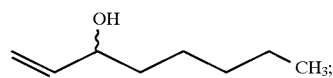

(a mixture of isomers having the structures:

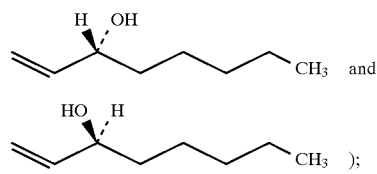

);

(vi) methional having the structure:

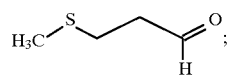

(vii) dimethyl sulfoxide having the structure:

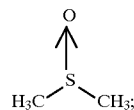

(viii) 50:50 mole:mole mixture of skatole/indole, skatole having the structure:

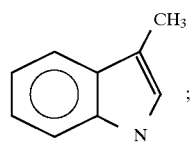

; and indole having the structure:

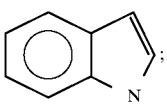

(ix) propionthetin halides having the structure:

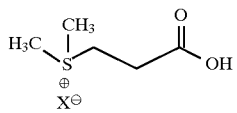

wherein X is chloro or bromo;
(x) ammonium chloride;
(xi) ammonium acetate;
(xii) acetic acid having the structure:

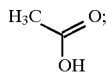

(xiii) glucose;
(xiv) "raw sugar" (sucrose and "impurities");
(xv) Thaumatin (known as TALIN® a trademark of the Tate and Lyle Company Limited of the United Kingdom), a mixture Thaumatin B, Thaumatin I and Thaumatin II, the liquid/the liquid chromatograms of which are indicated in FIGS. 23 and 24 attached hereto and described, infra. Thaumatin I is shown also by the symbol:

[Lys$^{46}$, Asp$^{113}$,Asp$^{137}$]

as further specifically described in U.S. Pat. No. 5,221, 624 issued on Jun. 22, 1993 the specification of which is incorporated herein by reference;
(xvi) 2-methyl-3-(methyldithio)furan having the structure:

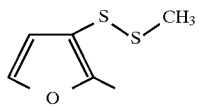

(xvii) aqueous ammonia;
(xviii) yeast extract;
(xix) D-Glucosamine, an epimeric mixture of compounds having the structures:

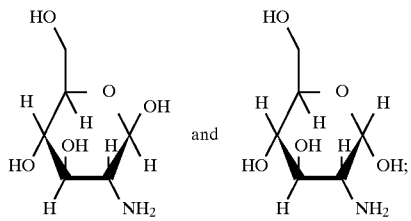

(xx) 2-methyl-3-furanthiol (also known as "OXYCYCLOTHIONE-030™", a trademark of International Flavors & Fragrances Inc.) having the structure:

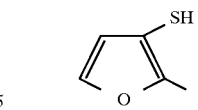

(also hereinafter referred to as "ASIE" substance(s)) as well as feeding compositions containing (i) one or more of such "ASIE" substances admixed with (ii) prior art feeding compositions.

Aquatic animals utilize water-borne "chemical signals" (chemical stimuli) to identify and orient toward potential food sources, to escape predators and locate mates. These specific chemical signals are recognized in spite of the chemical complexity of aquatic environments. Therefore, the chemical environment of aquatic animals is vitally important, both physiologically and behaviorally, to understand the status and role of animals in the aquatic environment. The function of specific chemical signals becomes even more significant in a managed biological system (i.e., aquaculture ponds or tanks) that is optimized for production of a single aquatic species (e.g., members of the *Penaeus* genus of the Class Crustacea) since these chemical signals regulate feeding behavior and possibly control reproduction. Because feeds are a significant expense in most aquaculture operations, the need to maximize feeding rates and reduce wasted feed, thereby lowering production costs and the possible lowering of bacterial/viral infections is paramount to economic success.

The importance of chemoattractants and/or feeding stimulants in improving both initial palatability and overall feeding rates as a means to reduce wasted feed is now fully recognized. The feed quality and environmental conditions (i.e., water quality and current patterns) have direct effects on the effectiveness of feed attractants and feed stimulants. For these reasons, food detection and feeding stimulation ultimately determine the commercial value of an aquatic feed.

A number of attempts at obtention of efficacious feeding stimulants for various aquatic species and for creation of appropriate testing apparatus having a high degree of efficiency for determining good stimulants and attractants for aquatic species are set forth in the literature. Thus, U.S. Pat. No. 4,250,835 issued Feb. 17, 1981 and U.S. Pat. No. 4,249,480 issued Feb. 10, 1981 disclose apparatus and methods for rearing shrimp through the larvae stage wherein the shrimp are subjected to controlled conditions and a common enclosure for the male and female adult shrimp is provided which permits uncontrolled access of the shrimp to one another and wherein the shrimp are maintained through a plurality of cycles of mating, spawning and hatching. The system disclosed provides filtration means for filtering the medium of the common enclosure and with collecting means for harvesting hatched shrimp at preselected times from the common enclosure medium as the medium moves into the filtration means. U.S. Pat. No. 4,828,829 of May 9, 1989 discloses a visual fish attractant that aids in the dispersion of traditional scent and taste attractants. The fish attractant compositions include one or more oils, such as mineral oil, cod liver oil, menhaden oil, herring oil, anise oil, salmon oil, as well as pigments, fragrances, fish scent, dispersed pigments, and light-reflective particles that act both as a visual attractant and as an aid to controlled dispersion of the oil and scent compositions.

Lombardo, et al, *Comp.Biochem.Physiol.*, Vol. 101C, No. 2, pages 389–398, 1992, "Amino Acids and Derivatives as Food-Finding Signals in the Freshwater Snail *Planorbarius*

*corneus* (L.)" discloses the behavioral responses of the freshwater snail to various amino acids including l-aspartic acid, d-alanine, histamine, proline and aspartame.

It should be pointed out, however, that the compounds having the structures:

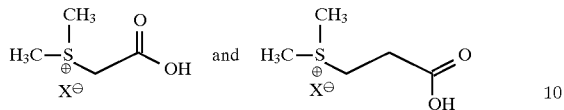

wherein X is a "univalent anion" such as chloride ion or bromide ion are used to attract in a gel vertebrate fish such as red snapper and carp in Japanese Published Application J91/27231 (Nakajima) abstracted at *Chem. Abstracts*, Volume 115:113303n. The disclosure of Japanese Published Application 91/27231 does not detract from the patentability of the instant invention.

Nothing in the prior art, however, discloses the efficient process for attracting, inciting, stimulating and/or exciting members of the Class Crustacea from or in a volume of water inhabited by said member(s) of the Class Crustacea in or to a desired location or volume within a body of water by applying at least one of the specific materials found to be useful in our invention, to wit the "ASIE" substances found to be so useful in our invention. Furthermore, nothing in the prior art discloses feeding compositions containing such "ASIE" substances admixed with prior art feeding materials for such members of the Class Crustacea.

THE INVENTION

Our invention provides a process for attracting, exciting, stimulating and/or inciting at least one member of the Class Crustacea from a volume of water or a surface inhabited by said member of the Class Crustacea to a desired location or volume within a body of water comprising the step of applying an aqueous saline solution containing a Crustacea-attracting, exciting, stimulating and/or inciting concentration of at least one substance (referred to as "ASIE" substance(s)) selected from the group consisting of:

(i) N-acetyl-D-Glucosamine, an epimeric mixture of compounds having the structures:

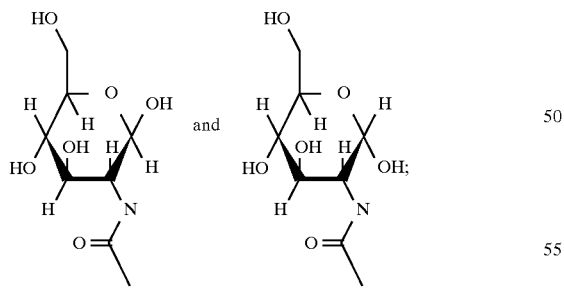

(ii) at least one S-methyl methionine sulfonium halide having the structure:

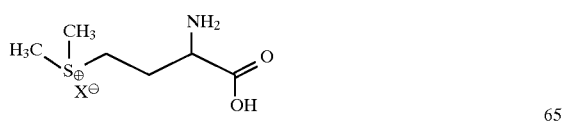

(wherein X is a chloride anion or a bromide anion);

(iii) methionine having the structure:

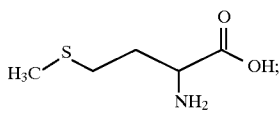

(iv) trimethyl amine oxide hydrate having the structure:

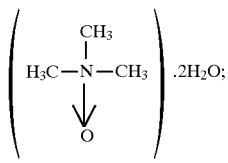

(v) (R)(S)1-octen-3-ol having the structure:

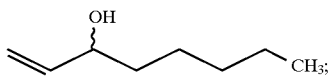

(a mixture of isomers having the structures:

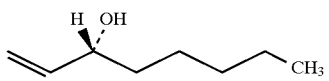

and

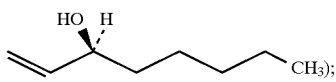

(vi) methional having the structure:

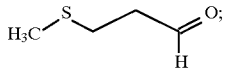

(vii) dimethyl sulfoxide having the structure:

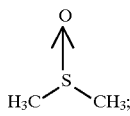

(viii) 50:50 mole:mole mixture of skatole/indole, skatole having the structure:

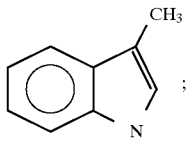

and indole having the structure:

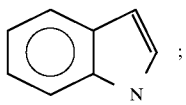

(ix) propionthetin halides having the structure:

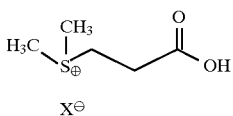

X⊖ wherein X is a chloride anion or a bromide anion;
(x) ammonium chloride;
(xi) ammonium acetate;
(xii) acetic acid having the structure:

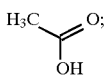

(xiii) glucose;
(xiv) raw sugar (sucrose and "impurities") for example, Osceola Brown Sugar marketed by Osceola Farms Inc. of Pahokee, Fla. (the headspace analysis for which is set forth in FIG. 27 described in detail, infra);
(xv) Thaumatin (known as TALIN® a trademark of the Tate and Lyle Company Limited of the United Kingdom), a mixture Thaumatin B, Thaumatin I and Thaumatin II, the liquid/the liquid chromatograms of which are indicated in FIGS. 23 and 24 attached hereto and described, infra. Thaumatin I is shown also by the symbol:

[Lys$^{46}$, Asp$^{113}$, Asp$^{137}$]

as further specifically described in U.S. Pat. No. 5,221, 624 issued on Jun. 22, 1993 the specification of which is incorporated herein by reference;
(xvi) 2-methyl-3-(methyldithio)furan (also called "MOS" or "METHYLOXYCYCLOSULFIDE™", a trademark of International Flavors & Fragrances Inc.) having the structure:

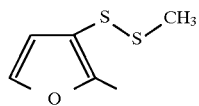

(xvii) aqueous ammonia;
(xviii) yeast extract;
(xix) D-Glucosamine, an epimeric mixture of compounds having the structures:

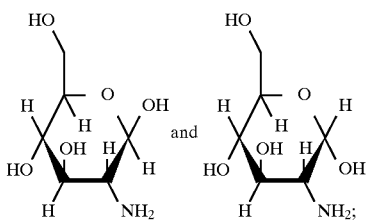

(xx) 2-methyl-3-furanthiol (also known as "OXYCYCLOTHIONE-030™", a trademark of International Flavors & Fragrances Inc.) having the structure:

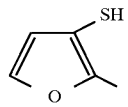

taken alone, or in combination with naturally occurring excitants, stimulants, attractants and/or incitants for the Class Crustacea such as natural Crustacean/cephalopod extracts to the vicinity of said desired location or volume. Our invention also describes a process for exciting, attracting, stimulating and/or inciting a member of the Class Crustacea within a volume of water inhabited by such member of the Class Crustacea comprising the step of applying an aqueous solution containing a Crustacean-exciting, attracting, inciting and/or stimulating concentration of one of the above materials (designated as "ASIE" materials) to the vicinity of said volume inhabited by said member of the Class Crustacea.

Examples of such members of the Class Crustacea are members of the *Penaeus* genus of the Class Crustacea such as *Penaeus setiferus, Penaeus vannamei* and *Penaeus aztecus*; and the *Procambrus clarkii* species of the Class Crustacea The ultimate goal of the ascertainment of such attractancy, stimulation, incitance and/or excitement is to intensify the feeding kinetics (e.g., rate and quantity of food intake and metabolism) for the members of the Class Crustacea. Accordingly, this invention also pertains to a feeding protocol for such members of the Class Crustacea relating to the aforesaid ascertainment and feeding compositions pertaining to said feeding protocol.

Thus, our invention is also directed to feeding compositions for feeding members of the Class Crustacea including (i) prior art feeding compositions (such as RAGEN®-35, a mixture of 35% protein, 7% fat, fish meal, fish oil and minor amounts of mineral and vitamin nutrients) and also containing, for example, L-ascorbic acid-2-phosphate or its salts as described in Published Japanese Applications J94/093,821 and J94/093,822 assigned to Showa Denko KK and abstracted in the *Derwent Patents Index Alerting Abstracts Bulletin* for week 9445 issued on Jan. 4, 1995 as follows:

SHOW D13 87•253800/36=JP94093821•B2 Food additive for fish farming •contains L-ascorbic acid-2-phosphate or its salts as active ingredient

SHOWA DENKO KK 86.01.30 86JP-016739

C01 (94.11.24) *JP62175142-A A23K 1/18, 1/16, A61K 31/375// C07D 307/62

Based on JP62175142A

A food additive contg. L-ascorbic acid-2-phosphate or its salts as active ingredient is claimed.

USE/ADVANTAGE-Used as a stable food additive with an ascorbic acid effect for fish farming.

In an example, a pellet fodder (basic fodder) composed of 55% white bait powder, 32% alpha-potato starch, 5% soy bean oil, 3% McCollum and 5%, ascorbic acid contg. vitamins was prepd. This was used in an ascorbic acid shortage fodder zone. To the basic fodder compsn. (1 kg). 2 m.mol of ascorbic acid was added for use in an ascorbic acid added fodder zone. To the basic fodder compsn. (1 kg). 2 m.mol of L-ascorbic acid-2-phosphate Mg was also added. The vitamins mixt. (5 g) contained 6 mg of thiamine, HCl, 20 mg of riboflavin, 4 mg of pyridoxic HCl, 0.009 mg of vitamin B12, 80 mg of nicotinic acid, 800 mg of Chlorin chloride, 400 mg of inositol, 28 mg of ca-pantothenate, 6 mg of blotin, 1.5 mg of acid 1.5 mg, 40 mg alpha-tocopherol. 4 mg menadione, 0.05 mg of calciferol, 20 mg of letinene.acetate and 3596 mg of cellulose. Satd. pellet fodders were suspended to the fry of rainbow trout which were fed for 100 days. In each zone, 200 of fries were fed. The fish were supplied 6 times per day from the first until the 80th day and 4 times per day from the 81st until the 100th day. The difference of average body wt. between zones was little, but transformed fries and mortality were decreased in the L-ascorbic acid adding zone. No appearance of transformed fries were observed in the L-ascorbic acid-2-phosphate Mg added zone. (5pp )

SHOW D13 88•025158/04=JP94093822•B2 Ingredient for feed of crustacea •comprises ester of L-ascorbic acid-2-phosphoric acid or its salt

SHOWA DENKO KK 86.06.05 86JP-129283

C03 (94.11.24) *JP62285759-A A23K 1/18, 1/16, A61K 31/375

Based on JP62285759A

The ingredient comprises an appropriate amt. of the ester of L-ascorbic acid-2-phosphoric acid or its salt, in the feed.

USE/ADVANTAGE •A nutritious and economical ingredient used as an efficient growth promoter for e.g. shrimps or lobsters. (6pp ) and/or fish growth hormone polypeptides produced by culturing microorganisms carrying recombinant DNA plasmids as described in Published Japanese Application J94/095,938 assigned to Kyowa Hakko Kogyo KK and abstracted as set forth below:

KYOW D16 86•008665/02=JP94095938•B2 Fish growth hormone poly-peptide produced by culturing microorganisms carrying recombinant DNA plasmid KYOWA HAKKO KOGYO KK 85.03.13 92JP-204982 (Div ex 85.03.13 85JP-050096)

C03 (94.11.30 ) *EP 166444-A C12N 15/18, C07K 13/00, C12N 1/21//A23K 1/165, A61K 35/74, 37/36, C12P 21/02 (C12N 1/21, C12R, 1:19) (C12P 21/02, C12R 1:19)

Based on JP5207883-A

Addnl. Data: SEKINE S (SEKI/)

Fish growth hormone polypeptide (I) having a disclosed peptide sequence is new. Also claimed are DNA and recombinant DNA which code for (I) and microorganisms contg. the recombinant DNA which codes for (I).

An m-RNA of fish growth hormone is isolated from the pituitary gland of fish belonging to Cupleiformes e.g. salmon, and used as a template to prepare DNA. A recombinant plasmid (e.g. pSGHI and pSGH14) incorporating the cDNA is prepd. The recombinant plasmid is incorporated in a host microorganism. The DNA and recombinant plasmid can be used for expression of fish growth hormone gene in bacteria such as E.coli. Fish growth hormones are produced by culturing microorganisms carrying the recombinant plasmid.

USE—(I) has a stimulating effect on the growth of fish and is used as a component of bait for fish cultivation. (11pp) as published in the *Derwent Chemical Patents Index Alerting Abstracts Bulletin* for week 9501 issued on Feb. 3, 1995 and being admixed therewith (ii) Crustacea-Class exciting and/or attracting and/or inciting and/or stimulating amounts and concentrations of at least one of the substances set forth as "ASIE" substances, supra.

Useful in practicing our invention is apparatus for determining whether a given substance at a given aqueous concentration or variable concentrations attracts, excites, incites and/or stimulates at least one member of the Class Crustacea comprising static holding tank means, flow-through holding tank means and/or Y-maze apparatus means.

More specifically, our invention is practiced using apparatus for determining whether a given substance at a given aqueous concentration or variable concentrations excites a member of the Class Crustacea comprising:

(a) static holding tank means containing (i) a volume of water and (ii) at least one live member of the Class Crustacea within said volume of saline water;

(b) pump-injected test solution feeding means for pumping aqueous solutions at variable or constant flow rates of test substance into the static holding tank means;

(c) visible light generating and guidance means for guiding visible wavelength light of variable or preferably constant intensity into said volume of water in said static holding tank means;

(d) first variable power source means for engaging the visible light generating means;

(e) second variable power source means for engaging the pump generated feeding means; and (f) variable focus/focal length video camera or camcorder recording means for recording the movements of one or more specified body appendages and/or the lateral direction and velocity of one or more specified body appendages of one or more of the members of the Class Crustacea when the pump injected feeding means and visible light generating means are engaged;

whereby it can be determined whether a particular dilution of a test substance will cause a member of the Class Crustacea to be "excited".

The "recording" by the variable focus/focal length video camera or camcorder recording means is preferably for recording on film or magnetic tape.

An additional aspect of the apparatus useful in practicing our invention is covered herein for determining whether a given substance at a given aqueous concentration or variable concentrations will attract, excite or incite members of the Class Crustacea. Such apparatus comprises:

(a) flow-through holding tank means where varying concentrations of test solutions are fed in at the inlet of the holding tank means and flow through the holding tank to an exit portal while a member of the Class Crustacea is positioned within the "flow-through" holding tank. The holding tank contains (i) flowing saline water and (ii) at least one live member of the Class Crustacea within the flowing saline water;

(b) pump-injected test solution feeding means for pumping aqueous solutions at variable or preferably constant flow rates of test solution into an orifice in front of the entry portal into the flow-through holding tank;

(c) visible light generating and guidance means for guiding visible wavelength light of variable or preferably constant intensity into the volume of water flowing in the flow-through holding tank;

(d) a first variable power source for energizing or "engaging" the visible light generating means;

(e) a valuable power source for energizing or "engaging" the pump injection feeding means (the pump has variable heads so that the flow rate of the added chemical solution (containing at least one "ASIE") may be added to the basic flow of saline water through the flow-through holding tank);

(f) variable focal length video camera or camcorder recording means for recording the movements and/or the lateral direction and velocity of one or more members of the Class Crustacea when the pump injection feeding means is engaged and when the visible light generating means is engaged; and (g) specially designed camera platform and blind means (a part of our invention) the purpose of which is to shield the observer from the test animal in order to prevent the test animal from being extraneously stressed and/or distracted. (The variable focal length video camera or camcorder recording means is mounted within the specially designed camera platform and blind means.)

The variable focal length video camera or camcorder recording means is of necessity on a line of visibility between the camera lens and the limits of motion of the member of the Class Crustacea. Accordingly, the apparatus useful in practicing our invention must contain one or two clear panels behind which is located the video camera or camcorder and in front of which is located at every point of view of the lens of the video camera or camcorder all of the members of the Class Crustacea within the flow-through holding tank or within the static holding tank or within the Y-maze apparatus as the case may be.

More specifically, the variable focus multi-directional video camera or camcorder/video camera or camcorder platform apparatus for facilitating visible wavelength radiation communication between the moving member of the Class Crustacea and an image display of the moving object on, for example, visible radiation sensitive film or visible radiation sensitive magnetic tape comprising:

(1) a horizontal static substantially rectangular planar base located in an "X-Y" plane, having an upper surface and having two substantially parallel ends parallel to the "X" axis and two substantially parallel ends parallel to the "Y" axis; with one end parallel to the "Y" axis being along a line designated "$E_1$";

(2) a vertically disposed substantially rectangular planar frame located in a "Y-Z" plane, substantially perpendicular to said horizontal static planar base and having two parallel ends parallel to the "Y" axis and two parallel ends parallel to the "Z" axis, one of said ends parallel to the "Y" axis being contiguous with said static planar base along a first end, said line $E_1$ of said static planar base, parallel to the "Y" axis, said frame having a first orifice therethrough permitting visible wavelength radiation to be transmitted therethrough;

(3) a continuous right angle-shaped horizontal/vertical planar base/frame movable platform movable in both the "X" and "Y" (or lateral) directions consisting of (i) a substantially rectangular horizontal lamina located in the "X-Y" plane facing and within the planar framework of said horizontal static planar base (1) plane and having an upper surface and a lower surface continuously and sealably juxtaposed in a direction parallel to line $E_1$ along a line designated $E_2$ said line $E_2$ being proximate said line $E_1$ with (ii) a substantially rectangular vertical lamina located in the "Y-Z" plane facing and within the planar framework of said vertically disposed frame (2) and containing a vertically disposed visible wavelength radiation shield (blind) having a second orifice therethrough located opposite to and being planarly parallel to and within the planar framework of said first orifice in said vertically disposed frame, said right angle-shaped movable platform being located on rollers juxtaposed with and immediately adjacent said lower surface of said right angle-shaped movable platform and said upper surface of said horizontal static base;

(4) a substantially rectangular rotating planar base having an upper surface and a lower surface and having two parallel ends parallel to the "Y" axis and two parallel ends parallel to the "X-Z" plane, being rotatable about a vertex line $E_3$ in a hinge manner having a direction parallel to each of lines $E_1$ and $E_2$ and being substantially proximate lines $E_1$ and $E_2$ along a first parallel hinge end in the "Y" direction parallel to the "Y" axis, having variable manually-controllable rotation movement means located at an end of said rotating planar base opposite said first parallel hinge end, and opposite the location of said line $E_3$, the direction of rotation of said rotating base being from the location of the "X-Y" plane of said right angle-shaped movable platform towards the location of the "Y-Z" plane of said right angle-shaped movable platform about the said vertex line $E_3$; and (5) a video camera or camcorder fixedly mounted on the upper surface of said rotating planar base, comprising a housing and a lens located in said housing, the focal plane of said lens being substantially parallel to and at a controllably variable distance from the plane of said first orifice of said vertically disposed frame and said second orifice of said visible wavelength radiation shield with said lens, said first orifice and said second orifice all having a common line of vision, whereby simultaneous manipulation of said rotating planar base and said right angle-shaped movable platform, when the video camera or camcorder is in operation, facilitate visible wavelength radiation communication between (i) an image display resulting from operation of said video camera or camcorder onto, for example, visible light sensitive film or visible light sensitive magnetic tape and (ii) the image of the moving object (that is the member of the Class Crustacea) being transmitted to said video camera or camcorder.

Another aspect of apparatus useful in the practice of our invention concerns an additional apparatus for determining whether a given substance at a given aqueous concentration or variable concentrations attracts, or stimulates to feed, or incites to feed, or excites, or stimulates a member of the Class Crustacea; and it comprises a "Y-maze" apparatus similar to that disclosed in a paper by Lee, *J.Exp.Mar.Biol.Ecol.*, Volume 153 (1992), pages 53–67, "Chemotaxis by *Octopus maya* Voss et Solis in a Y-maze".

More specifically, an aspect of apparatus useful in the practice of the instant invention comprises, inter alia, a recirculating tank means containing a Y-maze which is a rectangular parallelepiped as its "three-dimensional base" having two rectangular parallelepiped-shaped arms; the three-dimensional base having one closed end and one open end and two sides, each sealably connected to an end panel and each terminating at the open end, said open end connected to two diverging parallelepiped-shaped sections as set forth, supra (having a vertex of 5°–45° (preferably having a 10° vertex)); (i) a test substance input section and (ii) a control section, each of which is sealably connected at the open end to one another and to a side of the first three-dimensional base rectangular parallelepiped section. This apparatus has one or both top and bottom panels as transparent panels whereby a variable focal length video camera or camcorder recording means is maintained on one side of the transparent panel with a line of vision from the lens of the video camera or camcorder to every place where all of the members of the Class Crustacea may travel. It should be noted that the control section and test substance input section can be reversed or interchanged (as by changing the location of the test substance input tube as more particularly shown in FIG. 5G and the detailed description of FIG. 5G in the "Detailed Description of the Drawings" section, infra).

In the Y-maze apparatus useful in the practice of our invention, a constant concentration of the test chemical entering one arm of the Y-maze is the preferred method of addition. In the flow-through apparatus, however, there is a constant increase of concentration of the test chemical during the run.

Furthermore, the Y-maze apparatus useful in the practice of our invention also contains a volume of water and at least one live member of the Class Crustacea within the volume of water. The Y-maze apparatus useful in the practice of our invention contains a pump-injected test solution of test chemical for pumping aqueous solutions of test chemical at various flow rates or preferably constant flow rates into the feeding sections of the Y-maze (at one of the diverging parallelepiped-shaped "arms" connected to the base parallelepiped).

Like the flow-through apparatus and the static tank apparatus, the "Y-maze" apparatus has a visible light generating and guidance means for guiding visible wavelength light of variable or preferably constant intensity into the volume of water in the holding tank and feeding section where a member of the Class Crustacea is located.

The "Y-maze" aspect of the apparatus useful in the practice of our invention also contains variable focal length video camera or camcorder recording means for recording the movements of one or more appendages and/or the lateral direction and velocity of one or more of the members of the Class Crustacea when the pump injection test chemical means an when the visible light generating means are simultaneously energized or "engaged".

More specifically, in determining a value for the response, "R" or "G" of the member of the Class Crustacea whose responses are measured as a result of the practice of our invention, the time taken for the member of the Class Crustacea to act or to respond to the feeding incitant or stimulant or attractant of our invention is a function of the particular material used and its concentration as well as the flow rate of the liquid.

Proposed mathematical models are set forth herein, to wit:

$$G_1 = \frac{100}{\theta} - 5 \text{ (static tank apparatus)}$$

and $$G_2 = 100 - 10\theta \text{ (static tank apparatus)}$$

wherein the term: $\theta$
is the time taken and the terms "$G_1$" and "$G_2$") are each values for the responses of the members of the Class Crustacea from the initial time "0" of substance injection until the time that a given definitive Crustacean forward motion commences.

It should be noted that the term "G" is also shown herein as "R".

The rate of change of response with respect to test substance concentration (C) (for example, in terms of moles per liter or grams per liter) is given by the equation:

$$\frac{dG_2}{dC} = -10 \left( \frac{d\theta}{dC} \right)$$

$$\frac{d\theta}{dC}$$

$$\frac{dG_2}{dC}$$

is the rate of change of response with respect to concentration as is the symbol:

$$\frac{dG_1}{dC}$$

A similar equation is:

$$\frac{dG_1}{dC} = \frac{-100}{\theta^2} \left( \frac{d\theta}{dC} \right)$$

which depends on the mathematical model:

$$G_1 = \frac{100}{\theta} - 5$$

Combining the initial mathematical model with the differential equation yields the differential equation:

$$\frac{dG_1}{dC} + G_1 = \frac{100}{\theta} - \frac{100}{\theta^2} \left( \frac{d\theta}{dc} \right) - 5$$

and the differential equation:

$$\frac{dG_2}{dC} + G_2 = 100 - 10 \left( \frac{d\theta}{dc} \right) - 100.$$

Changes in response value when concentrations of stimulant change or when concentrations of excitant change or when concentrations of attractant change are shown by the equations:

$$\Delta G = \int_{c_1}^{c_2} \left( \frac{\partial G}{\partial c} \right)_\theta dC;$$

$$\Delta G_1 = \int_{c_1}^{c_2} \left( \frac{\partial G_1}{\partial c} \right)_\theta dC;$$

and $$\Delta G_2 = \int_{c_1}^{c_2} \left( \frac{\partial G_2}{\partial c} \right)_\theta dC.$$

Thus, for example, in the case of the use with the *Penaeus vannamei* species of the *Pennaeus* genus of the Class Crustacea of N-acetyl-D-Glucosamine, an epimeric mixture of compounds having the structures:

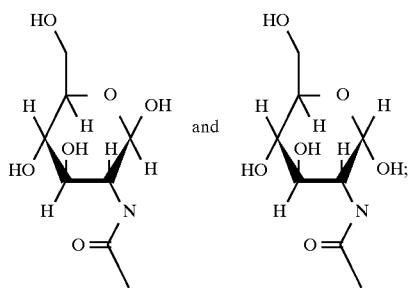

the response versus concentration can be shown by the equation:

$$-\log_{10}C = 0.8\,G - 2.3$$

in the static tank, or by one of the equations:

$$\log_{10}C = 2.3 - 0.8G;$$

$$0.8G = 2.3 - \log_{10}C;$$

$$G = 2.9 - 1.25\,\log_{10}C;$$

$$G_1 = 2.9 - 1.25\,\log_{10}C;$$

$$G_2 = 2.9 - 1.25\,\log_{10}C;$$

or $$G_2 = 2.9 - 2.9\,\log_e C.$$

Furthermore, the rate of change of response with respect to concentration can be shown by the equations:

$$\frac{\partial G_2}{\partial C} = \frac{-2.9}{C} \text{ and } \frac{\partial G_1}{\partial C} = \frac{-2.9}{C}$$

and the change in response can be shown by the equation:

$$\Delta G_1 = \int_{c_1}^{c_2} \left(\frac{-2.9}{c}\right) dC = -2.9\,\log_e\left(\frac{c_2}{c_1}\right).$$

Combining the equation:

$$G_1 = 2.9 - 2.9\,\log_e C.$$

with the equation:

$$\frac{dG_1}{dC} = \frac{-2.9}{C}$$

and the equation:

$$\frac{dG_1}{dC} + G_1 = \frac{100}{\theta} - \frac{100}{\theta^2}\left(\frac{d\theta}{dc}\right) - 5$$

will yield the equation:

$$\frac{-2.9}{c} + 2.9 - 2.9\,\log_e C = \frac{100}{\theta} - \frac{\phi}{\theta^2}\left(\frac{d\theta}{dc}\right) - 5$$

(showing concentration as a function of time; when a test chemical is added continuously as when using the flow-through or static apparatus; but not the Y-maze apparatus) and the equation:

$$7.9 - 2.9\left(\frac{1}{c} + \log_e C\right) = 100\left(\frac{1}{\theta} - \frac{1}{\theta^2}\left(\frac{d\theta}{dc}\right)\right).$$

When using the flow-through apparatus and using with the *Penaeus vannamei* species of the *Pennaeus* genus of the Class Crustacea, N-acetyl-D-Glucosamine, an epimeric mixture of compounds having the structures:

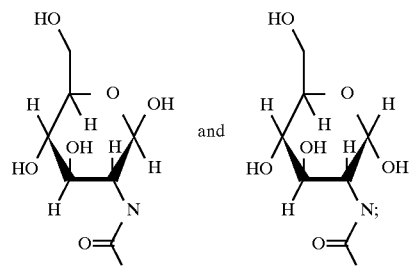

as an excitant, attractant, stimulant and/or incitant (on a scale of 0–50, as opposed to a scale of 1–5 when using the static tank-containing apparatus), the mathematical models for the mean response as a function of concentration of the N-acetyl-D-Glucosamine, the test chemical, are as follows:

$$R = 51.06 + \frac{16.14}{\log_{10}C + 11.04}$$

or $$R = 100\,\log_e\left[\frac{30 - \log_{10}C}{30}\right].$$

The mathematical model for the median response as a function of concentration of N-acetyl-D-Glucosamine, the test chemical, is as follows:

$$R = -41.98 - 5.68\,\log_{10}C.$$

Other materials which were tested but which have not been made a part of our invention are as follows:

(i) Taurine, the compound having the structure:

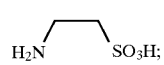

(ii) Guanidine, the compound having the structure:

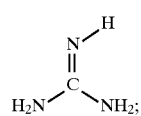

(iii) Betaine, the compound having the structure:

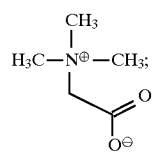

(iv) citric acid, the compound having the structure:

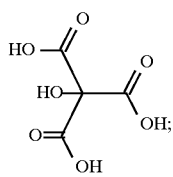

(v) Pyruvic acid, the compound having the structure:

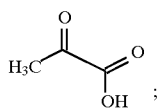

(vi) Ferulic acid, the compound having the structure:

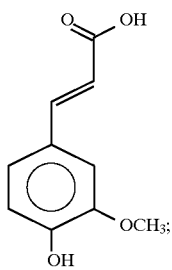

(vii) Vanillin, the compound having the structure:

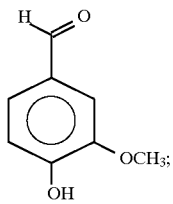

(viii) Isovaleraldehyde, the compound having the structure:

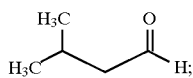

(ix) trans-2-hexenal, the compound having the structure:

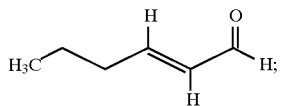

(x) Citral, the mixture of compounds having the structures:

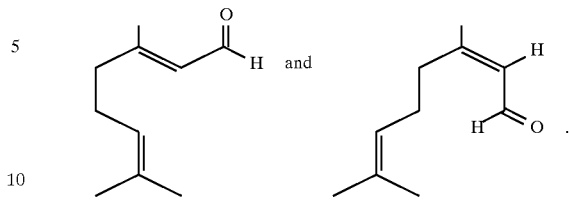

Each of the substances of our invention tested is diluted in a saline solution containing 30 parts per thousand of a "FRITZ®" Super Salt concentration manufactured by the Fritz Chemical Company of Dallas, Tex. 75217. The FRITZ® Super Salt Concentrate contains in major amounts sodium chloride, magnesium sulfate, magnesium chloride and calcium chloride and in minor amounts lithium chloride, sodium molyedate, disodium phosphate, strontium chloride, potassium chloride, sodium bicarbonate, calcium carbonate and magnesium carbonate.

The volume of water described, supra, for containing a member of the Class Crustacea is a dilute saline solution containing the same concentration of 30 parts per thousand of a FRITZ® Super Salt solution containing the above ingredients.

The protocols for using the apparatus of our invention and for determination of the feed compositions of our invention are set forth as follows:

STATIC TANK: TESTING PROTOCOL

I. Preparation

1. APPARATUS
   A. BETWEEN CHEMICALS
   1. Soak test chamber (static tank) in warm water for at least one hour before testing different chemicals.
   2. Rinse with hot tap water for approximately 30 seconds.
   3. Rinse with de-ionized water for 10 seconds.
   4. Dry off outside of chamber and place on test stand.
   5. Replace peristaltic pump tubing before testing different chemicals.
   6. Calibrate peristaltic pump to deliver at the predetermined flow rate.
   7. Place tubing inflow and outflow ends into test chemical bottle.
   8. Turn on peristaltic pump to fill tube with water and purge out all the air.
   9. Adjust lighting for even illumination in the tank.
   10. Set up camera in an appropriate area for viewing the entire bottom of tank.
   11. Pour 1,000 mLs of sea water taken from the shrimp holding system into the test tank.
   B. BETWEEN TRIALS USING THE SAME CHEMICALS
   1. Rinse test tank with warm tap water for approximately 30 seconds.
   2. Rinse with de-ionized water for 10 seconds.
   3. Dry off outside of chamber and place on tank stand.
   4. Between the trials using the same chemical or concentration of the same chemical, pump peristaltic pump tubing with at least 250 mLs salt water.

5. Calibrate peristaltic pump to deliver at the predetermined flow rate.
6. Place tubing inflow and outflow ends into test chemical bottle.
7. Turn on peristaltic pump to fill tube with water and purge out all the air.
8. Adjust lighting for even illumination in the tank.
9. Set up camera in an appropriate area for viewing the entire bottom of the tank.
10. Pour 1,000 mLs of sea water taken from the shrimp holding system into the test tank.

2. TEST ORGANISM

Animals should be chosen from a previously isolated set of animals so repetition does not occur within the test set for a particular chemical concentration. All test animals should be free of chitinolytic bacteria if possible. Most importantly, animals should have all head and mouth appendages (antennules, antennae, maxillae, maxillipeds and walking legs).

1. Select an animal that appears to be calm (i.e., not repetitively hitting head into wall).
2. Net the animal carefully.
3. Place the animal into the test tank.
4. Quickly set the cover over the test tank so the animal does not jump out.
5. If an animal jumps out of the tank or net at any time during transfer, pick it up and place it back into the holding chamber and choose another animal.

II. TEST PROCEDURE

1. PRETRIAL
    1. When the animal is placed into the test tank, begin timing the acclimation period of 15 minutes.
    2. Record the test date onto the data sheet.
    3. When the acclimation period ends, record the acclimation time and turn on the camera to record animal movements.
2. TRIAL
    4. Immediately begin timing the run.
    5. Observe and record on data sheet the placement and movements of the animal. Also note any problems that occurred during testing.
    6. When the 3 minute test is over, turn off the peristaltic pump, camera and timer.
3. POST-TRIAL
    7. Remove the chemical delivery tube from the tank and place into the test chemical bottle.
    8. Pour the water from the test tank through a net into a waste bucket. The animal should now be in the net.
    9. Place the animal into a group or individual holding chamber for later testing.
    10. Begin preparation of apparatus and test animal.

FLOW-THROUGH TANK: TESTING PROTOCOL

I. Preparations

1. APPARATUS

A. BETWEEN CHEMICALS

1. Soak test chamber (flow-through tank) and divider in an alkaline solution and warm water for at least one hour before testing different chemicals.
2. Rinse with hot tap water for approximately 30 seconds.
3. Rinse with de-ionized water for 10 seconds.
4. Dry off outside of chamber and place on table.
5. Insert the tank divider into the appropriate groove in the center of the tank.
6. Replace peristaltic injection pump tubing before testing different chemicals.
7. Calibrate peristaltic injection pump to deliver at the predetermined flow rate.
8. Place smaller tubing inflow and outflow ends into test chemical bottle.
9. Attach larger recirculation tubing to the ends of the tank via the reducers. The flow of water should go from the tank end with the chemical inlet to opposite end of the tank.
10. Turn on peristaltic injection pump to fill tubes with water and purge out all the air.
11. Adjust lighting for even illumination in the tank.
12. Set up camera blind and camera in an appropriate area for viewing the entire test tank.
13. Pour 500 mLs of sea water taken from the shrimp holding system into the test tank.

B. BETWEEN TRIALS USING THE SAME CHEMICAL

1. Rinse test tank and tank divider with warm tap water for approximately 30 seconds.
2. Rinse with de-ionized water for 10 seconds.
3. Dry off outside of chamber and place on table.
4. Insert the tank divider into the appropriate groove in the center of the tank.
5. Between the trials using the same chemical or concentration of the same chemical, pump peristaltic injection pump tubing with at least 1 liter salt water.
6. Calibrate peristaltic injection pump to deliver at the predetermined flow rate.
7. Place smaller tubing inflow and outflow ends into test chemical bottle.
8. Attach larger recirculation tubing to the ends of the tank via the reducers. The flow of water should go from the tank end with the chemical inlet to opposite end of the tank.
9. Turn on peristaltic injection pump to fill tubes with water and purge out all the air.
10. Adjust lighting for even illumination in the tank.
11. Set up camera blind and camera in an appropriate area for viewing the entire test tank.
12. Pour 500 mLs of sea water taken from the shrimp holding system into the test tank.

2. TEST ORGANISM

Animals should be chosen from a previously isolated set of animals so repetition does not occur within the test set for a particular chemical concentration. All test animals should be free of chitinolytic bacteria if possible. Most importantly, animals should have all head and mouth appendages (antennules, antennae, maxillae, maxillipeds and walking legs).

1. Select an animal that appears to be calm (i.e., not repetitively hitting head into wall).
2. Net the animal carefully.
3. Place the animal into the test tank in the end nearest the tank outflow, facing the inflow (face the animal against the future flow of water).
4. Quickly set the cover over the test tank so the animal does not jump out.
5. If an animal jumps out of the tank or net at any time during transfer, pick it up and place it back into the holding chamber and choose another animal.

II. TEST PROCEDURE

1. PRETRIAL
   1. When the animal is placed into the test tank, begin timing the acclimation period. The duration of the acclimation period should be the period of time it takes for the animal to become calm (i.e., not bumping into walls and not attempting to swim or turn in tank). This period should be at least one minute.
   2. Record the test date onto the data sheet.
   3. Turn on peristaltic injection pump to allow water to circulate in the test chamber.
   4. When the acclimation period ends, record the acclimation time and turn on the camera to record animal movements.
2. TRIAL
   5. Immediately begin timing the run.
   6. Carefully remove the tank divider.
   7. Wait 5 seconds. If the animal lunges to the inlet side of the test tank during this time, terminate testing.
   8. If the animal stays on the outlet end of the tank, place the chemical outlet tube into the test chemical inlet of the tank.
   9. Wait 30 seconds. If the animal lunges to the inlet side of the test tank during this time, terminate testing.
   10. Observe and record on data sheet the placement and movements of the animal. Also note any problems that occurred during testing.
   11. When the predetermined test time is over, turn off the peristaltic injection pump, camera and timer.
3. POST-TRIAL
   12. Remove the chemical delivery tube from the chemical delivery inlet and place into the test chemical bottle.
   13. Remove large recirculation tubing and begin cleaning (see Apparatus Preparation above).
   14. Pour the water from the test tank through a net into a waste bucket. The animal should now be in the net.
   15. Place the animal into a group or individual holding chamber for later testing.
   16. Begin preparation of apparatus and test animal.

Y-MAZE: TESTING PROTOCOL

I. Preparation

1. APPARATUS
   A. BETWEEN CHEMICALS
   1. Soak test chamber (Y-maze) and divider in an alkaline solution and warm water for at least one hour before testing different chemicals.
   2. Rinse with hot tap water for approximately 30 seconds.
   3. Rinse with de-ionized water for 10 seconds.
   4. Dry off outside of chamber and place on table.
   5. Insert the appropriate tank dividers in the Y-maze.
   6. Replace peristaltic injection pump tubing before testing different chemicals.
   7. Calibrate peristaltic injection pump to deliver at the predetermined flow rate.
   8. Place tubing inflow and outflow ends into test chemical bottle.
   9. Turn on peristaltic injection pump to fill tube with liquid and purge out all the air.
   10. Adjust lighting for even illumination in the tank.
   11. Set up camera in an appropriate area for viewing the entire Y-maze.
   12. Fill Y-maze to the proper water level with 5 liters sea water taken from the shrimp holding system.

B. BETWEEN TRIALS USING THE SAME CHEMICAL
   1. Rinse Y-maze and divider with warm tap water for approximately 30 seconds.
   2. Rinse with de-ionized water for 10 seconds.
   3. Dry off outside of chamber and place on table.
   4. Insert the appropriate tank dividers in the Y-maze.
   5. Between the trials using the same chemical or concentration of the same chemical, pump peristaltic injection pump tubing with at least 250 mLs salt water.
   6. Calibrate peristaltic injection pump to deliver at the predetermined flow rate.
   7. Place smaller tubing inflow and outflow ends into test chemical bottle.
   8. Turn on peristaltic injection pump to fill tube with liquid and purge out all the air.
   9. Adjust lighting for even illumination in the Y-maze.
   10. Set up camera in an appropriate area for viewing the entire Y-maze.
   11. Fill Y-maze to the proper water level with 5 liters of sea water taken from the shrimp holding system.
2. TEST ORGANISM
   Animals should be chosen from a previously isolated set of animals so repetition does not occur within the test set for a particular chemical concentration. All test animals should be free of chitinolytic bacteria if possible. Most importantly, animals should have all head and mouth appendages (antennules, antennae, maxillae, maxillipeds and walking legs).
   1. Select an animal that appears to be calm (i.e., not repetitively hitting head into wall).
   2. Net the animal carefully.
   3. Place the animal in the appropriate position in is the Y-maze (in the base of the Y-maze).
   4. If an animal jumps out of the tank or net at any time during transfer, return it to the holding chamber and choose another animal.

II. Test Procedure

1. PRETRIAL
   1. When the animal is placed into the Y-maze, turn on the recirculation lines of pump; begin timing the acclimation period of 15 minutes.
   2. Record the test date onto the data sheet.
   3. When the acclimation period ends, turn on the camera to record animal movements.
2. TRIAL
   4. Immediately begin timing the run and begin pumping test chemical into the chemical inlet of the Y-maze.
   5. After 3 minutes, carefully remove any tank divider.
   6. Wait 30 seconds. If the animal lunges into an arm of the Y-maze during this time, terminate testing.
   7. Observe and record on data sheet the placement and movements of the animal. Also note any problems that occurred during testing.
   8. When the predetermined test time is over, turn off the peristaltic injection pump, camera and timer.
3. POST-TRIAL
   9. Return chemical delivery tubes to the test chemical bottles.
   10. Remove Y-maze recirculation tubing and begin cleaning (see Apparatus Preparation above).

11. Pour the water from the Y-maze through a net into a waste bucket. The animal should now be in the net.
12. Place the animal into a group or individual holding chamber for later testing.
13. Begin preparation of apparatus and test animal.

FEEDING BEHAVIOR: TESTING PROTOCOL

I. Preparation

1. APPARATUS

A. BETWEEN CHEMICALS

1. Soak test chamber (Y-maze) and divider in an alkaline solution and warm water for at least one hour before testing different chemicals.
   2. Rinse with hot tap water for approximately 30 seconds.
   3. Rinse with de-ionized water for 10 seconds.
   4. Dry off outside of chamber and place on table.
   5. Insert the appropriate tank dividers into the Y-maze.
   6. Replace peristaltic injection pump tubing before testing different chemicals.
   7. Calibrate peristaltic injection pump to deliver at the predetermined flow rate.
   8. Place tubing inflow and outflow ends into test chemical bottle.
   9. Turn on peristaltic injection pump to fill tube with liquid and purge out all the air.
   10. Adjust lighting for even illumination in the tank.
   11. Set up camera in an appropriate area for viewing the entire Y-maze.
   12. Fill Y-maze to the proper water level with 5 liters of sea water taken from the shrimp holding system.

B. BETWEEN TRIALS USING THE SAME CHEMICAL

1. Rinse Y-maze and divider with warm tap water for approximately 30 seconds.
   2. Rinse with de-ionized water for 10 seconds.
   3. Dry off outside of chamber and place on table.
   4. Insert the appropriate tank dividers into the Y-maze.
   5. Between the trials using the same chemical or concentration of the same chemical, pump peristaltic injection pump tubing with at least 250 mLs salt water.
   6. Calibrate peristaltic injection pump to deliver at the predetermined flow rate.
   7. Place smaller tubing inflow and outflow ends into test chemical bottle.
   8. Turn on peristaltic injection pump to fill tube with liquid and purge out all the air.
   9. Adjust lighting for even illumination in the Y-maze.
   10. Set up camera in an appropriate area for viewing the entire Y-maze.
   11. Fill Y-maze to the proper water level with 5 liters of sea water taken from the shrimp holding system.

2. TEST ORGANISM

Animals should be chosen from a previously isolated set of animals so repetition does not occur within the test set for a particular chemical concentration. All test animals should be free of chitinolytic bacteria if possible. Most importantly, animals should have all head and mouth appendages (antennules, antennae, maxillae, maxillipeds and walking legs).

1. Select an animal that appears to be calm (i.e., not repetitively hitting head into wall).
   2. Net the animal carefully.
   3. Place the animal in the appropriate position in the Y-maze (in the base of the Y-maze).
   4. If an animal jumps out of the tank or net at any time during transfer, return it to the holding chamber and choose another animal.

II. Test Procedure

1. PRETRIAL

1. When the animal is placed into the Y-maze, turn on the recirculation lines of pump and begin timing the acclimation period of 15 minutes.
   2. Record the test date onto the data sheet.
   3. When the acclimation period ends, turn on the camera to record animal movements.

2. TRIAL

4. Immediately begin timing the run.
   5. Insert feeding station with preweighed feed in place.
   6. After 3 minutes, carefully remove any tank dividers.
   7. Observe and record on a data sheet the placement and movements of the animal. Also note any problems that occurred during the testing.
   8. When the predetermined test time is over, turn off the peristaltic injection pump, camera and timer.

3. POST-TRIAL

9. Collect and place food in a drying oven to later record amount ingested by animal or dispersed into the water.
   10. Remove Y-maze recirculation tubing and begin cleaning (see Apparatus Preparation above).
   11. Pour the water from the Y-maze through a net into a waste bucket. The animal should now be in the net.
   12. Place the animal into a group or individual holding chamber for later testing.
   13. Begin preparation of apparatus and test animal.

With respect to the Y-maze testing protocol, three tests were carried out using the Y-maze of FIGS. 5A, 5C and 5E described in detail in the Detailed Description of the Drawings, infra.

Mixtures containing "natural extract" and glucose in saline solution were prepared and tested against a control which only had saline solution.

In the following tables, "natural extract" is defined as a 1:1:1 weight ratio of squid mantle:shrimp abdomen:crab claw. Sea water is used containing 30 parts per 1,000 of FRITZ® salt.

EXAMPLE 1
1 ML NATURAL EXTRACT:1 LITER SEA WATER:GLUCOSE
(FINAL CONCENTRATION OF GLUCOSE $10^{-3}$M)

| Chemical Arm | Inserts | Figure Reference | Reactions and Position in Tank |
|---|---|---|---|
| A | NONE | 5A | animal (*Paneaus vannamei*) excited but facing outlet |
| A | NONE | 5A | animal jumped into A when gate lifted |
| A | NONE | 5A | animal jumped into A when gate lifted |
| A | NONE | 5A | went into arm A at 0:16 |

EXAMPLE 1
1 ML NATURAL EXTRACT:1 LITER SEA WATER:GLUCOSE
(FINAL CONCENTRATION OF GLUCOSE $10^{-3}$M)

| Chemical Arm | Inserts | Figure Reference | Reactions and Position in Tank |
|---|---|---|---|
| B | CURVED | 5E | facing back wall, slowly turned and moved toward arms: turned to side wall: turned to back wall: turned to side wall: observed level 5 reactions |
| B | CURVED | 5E | animal jumped when gate lifted |
| B | CORRAL | 5C | jumped to back when gate lifted: at 4:40, animal came out and went toward B: jumped into A |
| B | CORRAL | 5C | jumped into A when gate lifted |
| B | CORRAL | 5C | jumped when lifted gate, but stayed along back of corral: level 5 reaction |
| B | CORRAL | 5C | animal never left position along back of corral: could not see antennule or maxilliped movements |

EXAMPLE 2
1 ML NATURAL EXTRACT:100 ML SEA WATER:GLUCOSE
(AT A GLUCOSE CONCENTRATION OF $10^{-2}$M)

| Chemical Arm | Inserts | Figure Reference | Reactions and Position in Tank |
|---|---|---|---|
| B | CORRAL | 5C | animal jumped out of Y-maze |
| B | CORRAL | 5C | swimming around corral: back against outlet: into A: stayed in A: extreme max and antennule movements |
| B | CORRAL | 5C | animal "playing dead" in corral: into back A by corral: into corral: into back of B: to B: long B-left wall: into corral: extreme max and antennular movements |
| B | CORRAL | 5C | into back A corner by corral facing back: across to B side wall to B back corner facing side: across to A wall: animal became stressed and jumped into B: remained in B |
| B | CORRAL | 5C | into A: extreme antennule and maxilliped movements |
| B | CORRAL | 5C | playing dead in corral until 5:30: into back A corner: moved to opening of A |
| A | CORRAL | 5C | to A back corner facing A wall: into A after a short stop: ran only approximately 1 minute after entry into A: extreme antennule and maxilliped movements |
| A | CORRAL | 5C | no movements: stayed in corral |
| B | CORRAL | 5C | facing back of corral when started: backed out of corral, then returned: animal hit head into wall for a time: level 5 reaction |
| A | CORRAL | 5C | facing arms: turned to outlet end at approximately 2:15: level 5 reactions |

EXAMPLE 3
CONTROL (SOLELY SEA WATER)

| Chemical Arm | Inserts | Figure Reference | Reactions and Position in Tank |
|---|---|---|---|
| NONE | CORRAL | 5C | remained in corral: animal jumped into A at approximately 7:00 when adjusting camera: level 2 rxn |
| NONE | CORRAL | 5C | never left corral: level 3 or 4 reaction |
| NONE | CORRAL | 5C | never left corral: level 4 or 5 reaction |
| NONE | CORRAL | 5C | into A approximately 0:15 and remained in A |
| NONE | CORRAL | 5C | jumped into A then back in corral when gate lifted: slowly came out into back corner of A: over to B wall: slowly walked into B |
| NONE | CORRAL | 5C | jumped into A at approximately 4:00: jumped back into corral after 0:30: no outside stimuli caused these reactions |
| NONE | CORRAL | 5C | never left corral |
| NONE | CORRAL | 5C | active during acclimation: searched corral until went into A at 9:00: jumped to A back at 9:55 |
| NONE | CORRAL | 5C | went to A wall at approximately 4:00: to A back corner: slowly turned and went into B after pausing and turning in front of A |
| NONE | CORRAL | 5C | animal jumped in air then back into corral when gate lifted: never left corral |

The following application of the feeding behavior:testing protocol was carried out on *Paneaus vannamei*. Stock solutions were made up at a concentration of $10^{-3}$ molar. 5 Ml of the stock solution is admixed with 500 grams of feed causing 0.5 grams of feed to contain $1 \times 10^{-8}$ moles of test chemical. The volume in the aquarium where the feed testing is taking place is 150 liters. Accordingly, the average concentration of the test chemical is $7 \times 10^{-12}$ molar. When using 7 ml of test solution rather than 5 ml, the final concentration will be $1 \times 10^{-11}$. The actual feed is RANGEN® 35 containing 35% protein, 7% fat, fish meal (without squid) fish oil, and minor amounts of nutrient vitamins and minerals.

The stock solution is diluted to 25 ml with sea water containing 30 ppt of FRITZ® salt described, supra. 25 Ml of the stock solution is sprayed onto the 500 grams of feed. The water content is increased by approximately 5%. The jar containing the solution is sealed and stored for ten days at 0° C. Prior to use, the contents are shaken well.

The feed level is 0.5 grams of pellets per tank per feeding. The following diets J; P; A and C were used on *Paneaus vannamei* using the feeding behavior testing protocol described, supra.

DIET J

7 Ml of $1 \times 10^{-3}$ molar 2-methyl-3-(methyldithio)furan having the structure:

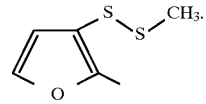

The solution is diluted to 25 ml with the artificial sea water containing 35 ppt of FRITZ® salt.

DIET P

N-acetyl-D-Glucosamine, an epimeric mixture of compounds having the structures:

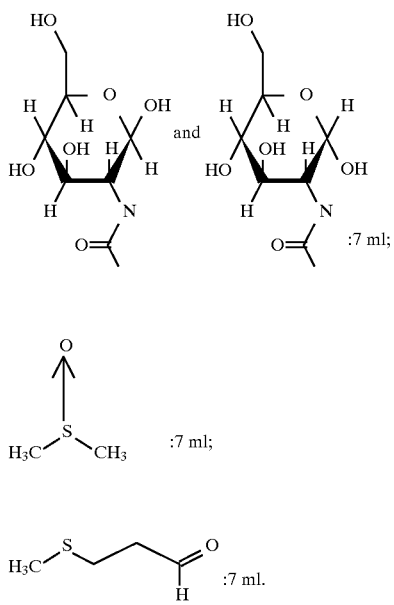:7 ml;

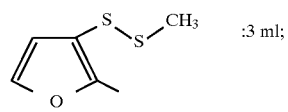:7 ml;

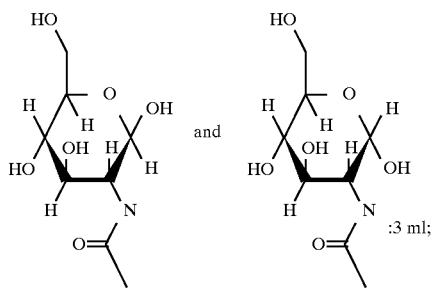:7 ml.

Each of the solutions are 1×10$^{-3}$ molar. The 21 ml is diluted to 25 ml with artificial sea water containing 30 ppt FRITZ® salt.

DIET A

2-Methyl-3-(methyldithio)furan having the structure:

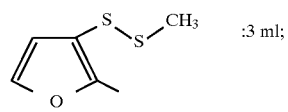:3 ml;

N-acetyl-D-Glucosamine, an epimeric mixture of compounds having the structures:

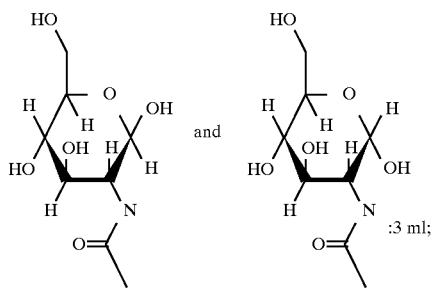:3 ml;

dimethyl sulfoxide having the structure:

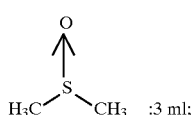:3 ml;

Osceola Brown Sugar produced by Osceola Farms Inc. of Pahokee, Fla. having a headspace analysis (trapped on TENAX® GC) as set forth in FIG. 27, described in the Detailed Description of the Drawings, infra:3 ml;

a 50:50 mixture of skatole and indole, with the skatole having the structure:

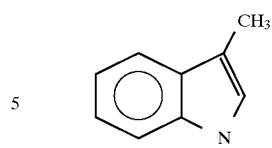

and the indole having the structure:

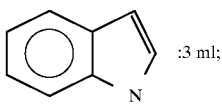:3 ml;

trimethyl amine oxide hydrate having the structure:

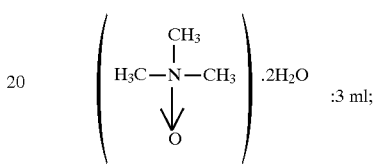:3 ml;

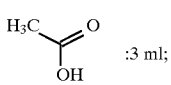:3 ml;

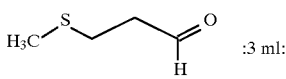:3 ml;

the 24 ml (total) is diluted to 25 ml with artificial sea water.

DIET C (CONTROL DIET)

7 Ml of food grade ethyl alcohol (95%) is diluted to 25 ml with artificial sea water containing 30 ppt FRITZ® salt.

In grams, the overall growth of the *Paneaus vannamei* with each of the diets is set forth in the following table:

TABLE I

| Diet | Overall Growth in Grams |
| --- | --- |
| Diet C | 1.43 |
| Diet A | 1.22 |
| Diet J | 1.58 |
| Diet P | 1.36 |

Thus, the most superior diet was Diet J, significantly better than the Control. Diet J contained the compound having the structure:

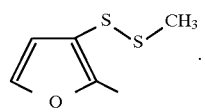

Results of the feeding studies using Diets C, A, J and P are summarized in FIGS. 38A, 38B, 39, 40, 41, 42 and 43; described briefly and in detail, infra.

The following feeding model summarizes the use of the "ASIE" chemicals of our invention as attractants, incitants, stimulants or excitants for the members of the *Penaeus* genus of the Class Crustacea and sets forth a summary of the protocols of our invention:

FEEDING MODEL

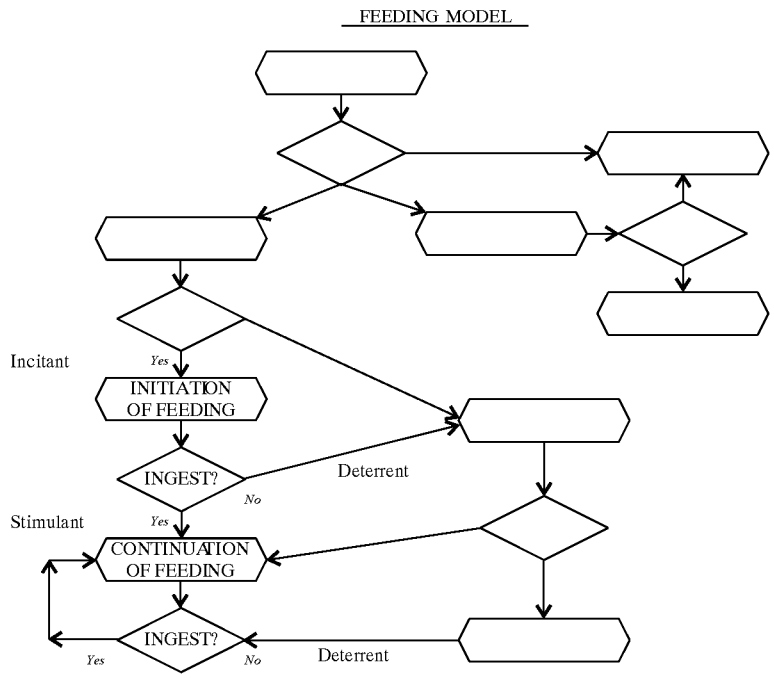

It should be noted that the feeding "recipe" is as follows:

I. The following "alginate" mixture is prepared in the following manner:
1. Ingredients: A 2.5% aqueous solution of sodium alginate; and a 2.0% aqueous solution of sodium hexametaphosphate;
2. Apparatus: Two 750 ml beakers and two hot plates for use in heating the contents of the beakers; and
3. Procedure: Heat 500 ml of water to 80°–90° C. in one of the beakers using one of the hot plates. Transfer 100 ml of the thus-heated water to the second beaker. In the event that water-soluble attractants are being used, the said water-soluble attractants are also added to the second beaker.

Solid sodium alginate is slowly added to the 100 ml of heated water until the solution is at a level of 2.5% sodium alginate. Solid sodium hexametaphosphate is then slowly added to the 100 ml alginate solution until the sodium hexametaphosphate is at a level of 2%. The attractant, for example, the compound having the structure:

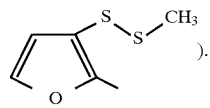

(not soluble in water) or Osceola Brown Sugar (soluble in water) is added as a solution (approximately 10–20 ml) in water (in the case of Osceola Brown Sugar and other water-soluble materials) or in 95% aqueous food grade ethyl alcohol (in the case of the compound having the structure:

).

The blending is to be continued for a period of 5 minutes in order to ensure uniformity.

II. Feed Mixing Protocol:
1. Grind the RANGEN® feed as fine as possible;
2. Place the feed into an industrial mixer and mix for a period of 30 minutes;
3. Add the resulting "alginate" mixture from "I." and mix for a period of 5 minutes;
4. If the resulting product has the proper amount of moisture, it will not cake on the sides of the mixing vessel. Otherwise, it will adhere to the sides of the mixing vessel as well as the mixing paddle. In that event, either additional water in an amount of 10–20 ml is required or a higher speed (approximately 10% greater) for the paddle is required;
5. The final mix is to be extruded through a meat grinder using an appropriate die; and
6. In the event that the feed is still too dry, the surface of the feed will flake and pellets will appear ragged. If the feed is too wet, the operator will be unable to separate the strands as they extrude. A proper amount of moisture will give rise to extrudates appearing as smooth tubes that are only slightly sticky.

The numerical results of the feed study for feed attractants A, C, J and P are set forth in the following Table IA:

TABLE IA

"FEED STUDY-% WEIGHT GAIN IN TEST DIETS"

| | BEG AVE | END AVE | % WEIGHT GAIN | allowance for rounding |
|---|---|---|---|---|
| A1 | 3.033 | 3.82 | 25.94790636 | |
| A2 | 2.889 | 3.579 | 23.88369678 | |
| A3 | 2.829 | 3.483 | 23.11770944 | |
| A AVE | 2.917 | 3.634 | 24.58004799 | 24.31643753 |
| C1 | 2.846 | 3.784 | 32.9585383 | |
| C2 | 2.721 | 3.411 | 25.35832415 | |
| C3 | 2.911 | 3.861 | 32.63483339 | |
| C AVE | 2.826 | 3.679 | 30.18400566 | 30.31723195 |
| J1 | 3.073 | 4.141 | 34.75431175 | |
| J2 | 2.996 | 4.058 | 35.44726302 | |
| J3 | 3.045 | 3.874 | 27.22495895 | |
| J AVE | 3.038 | 4.029 | 32.62014483 | 32.47551124 |
| P1 | 3.024 | 3.748 | 23.94179894 | |
| P2 | 2.855 | 3.84 | 34.50087566 | |
| P3 | 3.09 | 4.148 | 34.2394822 | |
| P AVE | 2.99 | 3.904 | 30.56856187 | 30.89405227 |

Listed in the first column are each of the tank numbers for all of the diets. In the second column is the average weight in grams of that tank before the first day of the study. The row that says "A AVE", as well as corresponding rows, to wit: "C AVE", "J AVE" and "P AVE", is the average for all three tanks for that specific diet. The third column is the average weight in grams for each tank and diet at the end of the study, that is, after six weeks. Then follows the percent weight gained by each tank and the average percent gained for the corresponding diet. The average of the combined percentages for the three tanks is then calculated and appears in the final column with appropriate allowance for "rounding" of the numerical data. Bold numbers are those used in FIGS. 38A and 38B comparing the percent growth for each diet. FIGS. 38A and 38B are described briefly and in detail, infra, in the "BRIEF DESCRIPTION OF THE DRAWINGS" section and in the "DETAILED DESCRIPTION OF THE DRAWINGS" section, infra.

Another aspect of our invention is the combination of the use of the static tank apparatus and procedure with the flow-through tank apparatus and procedure.

Another aspect of our invention is the use of the combination of the static tank apparatus, the flow-through apparatus and the Y-maze apparatus and the procedures covering same.

With respect to the *Procambrus clarkii* species work, the volume of water for containing a member of the *Procambrus clarkii* species of the Class Crustacea (against which a chemical is to be tested) is also a dilute saline solution containing 30 parts per thousand of a FRITZ® Super Salt solution described, supra.

Also with reference to the *Procambrus clarkii* species of the Class Crustacea, the amount of attracting, stimulating, exciting or inciting chemical such as the trimethyl amine oxide hydrate having the structure:

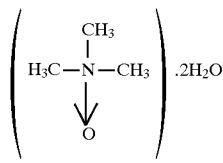

in the salt solution may vary from about $10^{-4}$ gram moles per liter up to about $10^{-21}$ gram moles per liter; and the most preferable concentration range varies from about $10^{-6}$ gram moles per liter down to about $10^{-12}$ gram moles per liter in the saline solution.

We have measured responses of *Procambrus clarkii* on a scale of 0–6 and the measurement of such responses to various concentrations of various attracting, exciting, stimulating and inciting chemicals is set forth in detail in the "DETAILED DESCRIPTION OF THE DRAWINGS" section of the instant Application, infra.

The following results were obtained in the static system of FIG. 7B (described, infra) using the following parameters: all crawfish (*Procambrus clarkii* species of the Class Crustacea) tested had an intact shell and visible head appendages. All were acclimated in the static chamber for 10 minutes and then run for 5 minutes. All positions and movements within the tank were recorded, along with the excitatory responses they exhibited during that time. The following codes were used to record their responses:

A=Antennule flicking;

$AN_2$=Antennae movement;

M=Maxilliped movement;

MP=Mouthpart movement; and

D=Dactyl movement (in the characteristic "feeding" motion).

In the following groups of data, OBS means "Osceola Brown Sugar" manufactured by Osceola Farms Inc. of Pahokee, Fla.; NAG is an epimeric mixture of compounds having the structures:

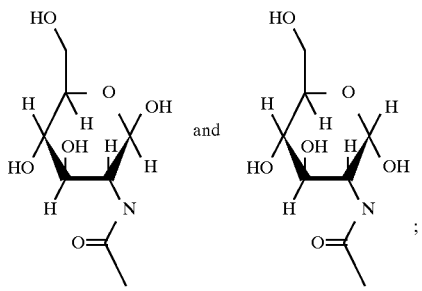

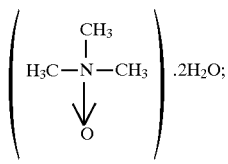

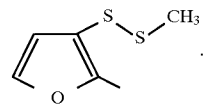

Furthermore, such terms as 10–6 stand for 10–6 gram moles per liter. The "SCORE" is determined as set forth in the "DETAILED DESCRIPTION OF THE DRAWINGS" section, infra.

| CHEMICAL | CRAWFISH NO. | CODES | SCORE |
|---|---|---|---|
| OBS $10^{-9}$ | 1 | M, A, D | 4 |
| OBS $10^{-9}$ | 2 | A, M, D | 5 |
| OBS $10^{-9}$ | 3 | M, A | 4 |
| OBS $10^{-9}$ | 4 | M, A, D | 5 |
| OBS $10^{-9}$ | 5 | A, M | 3 |
| OBS $10^{-9}$ | 6 | M, A | 5 |
| OBS $10^{-9}$ | 7 | M, A, D | 5 |

| | | | |
|---|---|---|---|
| OBS $10^{-9}$ | 8 | A, M | 3.5 |
| OBS $10^{-9}$ | 9 | M, A | 5 |
| OBS $10^{-9}$ | 10 | | X |
| OBS $10^{-9}$ | 11 | A, M | 5 |
| OBS $10^{-9}$ | 12 | A, M | 4 |
| OBS $10^{-9}$ | 13 | A, $AN_2$, M, D | 5 |
| OBS $10^{-9}$ AVERAGE = 4.45 | | | |
| OBS $10^{-12}$ | 1 | A, M | 4 |
| OBS $10^{-12}$ | 2 | A, M | 4 |
| OBS $10^{-12}$ | 3 | A, M | 3 |
| OBS $10^{-12}$ | 4 | A, M | 3 |
| OBS $10^{-12}$ | 5 | M, A | 4 |
| OBS $10^{-12}$ | 6 | A, M | 2.5 |
| OBS $10^{-12}$ | 7 | A, M, D | 6 * |
| OBS $10^{-12}$ | 8 | A, M | 3 |
| OBS $10^{-12}$ | 9 | M, A | 3 |
| OBS $10^{-12}$ | 10 | A, M | 4 |
| OBS $10^{-12}$ | 11 | A, M, D | 3.5 |
| OBS $10^{-12}$ | 12 | A, M, MP | 4 |
| OBS $10^{-12}$ AVERAGE = 3.67 *ANIMAL TOUCHED CHEM TUBE WITH MOUTHPARTS AND/OR CHELIPEDS | | | |
| TMOH $10^{-6}$ | 1 | M, A, MP, D | 5 |
| TMOH $10^{-6}$ | 2 | A, M | 3 |
| TMOH $10^{-6}$ | 3 | A, M, D | 4 |
| TMOH $10^{-6}$ | 4 | M, A | 5 |
| TMOH $10^{-6}$ | 5 | A, M | 4 |
| TMOH $10^{-6}$ | 6 | A | 1 |
| TMOH $10^{-6}$ | 7 | A, M | 3 |
| TMOH $10^{-6}$ | 8 | A, M, $AN_2$ | 3.5 |
| TMOH $10^{-6}$ | 9 | | 0 |
| TMOH $10^{-6}$ | 10 | M, A, D, MP | 6 * |
| TMOH $10^{-6}$ | 11 | A, M | 4 |
| TMOH $10^{-6}$ | 12 | A, M | 4 |
| TMOH $10^{-6}$ AVERAGE = 3.54 *ANIMAL TOUCHED CHEM TUBE WITH MOUTHPARTS AND/OR CHELIPEDS | | | |
| TMOH $10^{-12}$ | 1 | M, A, D | 4 |
| TMOH $10^{-12}$ | 2 | A, M | 2.5 |
| TMOH $10^{-12}$ | 3 | A, M, MP | 6 * |
| TMOH $10^{-12}$ | 4 | A, M | 2.5 |
| TMOH $10^{-12}$ | 5 | A, M | 2.5 |
| TMOH $10^{-12}$ | 6 | A, M, D | 4 |
| TMOH $10^{-12}$ | 7 | A, M | 3.5 |
| TMOH $10^{-12}$ | 8 | M, $AN_2$ | 3 |
| TMOH $10^{-12}$ | 9 | M, A | 4 |
| TMOH $10^{-12}$ | 10 | A, M | 6 * |
| TMOH $10^{-12}$ | 11 | M, $AN_2$, A | 3 |
| TMOH $10^{-12}$ | 12 | | 0 |
| TMOH $10^{-12}$ AVERAGE = 3.42 *ANIMAL TOUCHED CHEM TUBE WITH MOUTHPARTS AND/OR CHELIPEDS | | | |
| BLANK | 1 | A | 2 |
| BLANK | 2 | A, M | 2.5 |
| BLANK | 3 | A, $AN_2$ | 1.5 |
| BLANK | 4 | A, M | 3 |
| BLANK | 5 | M, $AN_2$ | 2.5 |
| BLANK | 6 | A, D | 3 |
| BLANK | 7 | A | 2 |
| BLANK | 8 | $AN_2$, A | 2 |
| BLANK | 9 | M, A | 3.5 |
| BLANK | 10 | M, A | 2.5 |
| BLANK | 11 | A, $AN_2$ | 2.5 |
| BLANK | 12 | M, A | 1.5 |
| BLANK AVERAGE = 2.38 | | | |
| NAG $10^{-9}$ M | 1 | M, $AN_2$, MP, A | 4 |
| NAG $10^{-9}$ M | 2 | A, M | 3 |
| NAG $10^{-9}$ M | 3 | A, $AN_2$, M | 3 |
| NAG $10^{-9}$ M | 4 | A, M, MP | 5 |
| NAG $10^{-9}$ M | 5 | M, $AN_2$, A | 3 |
| NAG $10^{-9}$ M | 6 | A, $AN_2$, M | 3.5 |
| NAG $10^{-9}$ M | 7 | A, M | 3 |
| NAG $10^{-9}$ M | 8 | D, $AN_2$, A | 4 |
| NAG $10^{-9}$ M | 9 | A, M, D | 3 |
| NAG $10^{-9}$ M | 10 | $AN_2$, A, MP | 3 |
| NAG $10^{-9}$ M | 11 | A, M, D | 3.5 |
| NAG $10^{-9}$ M | 12 | $AN_2$, M, A | 3 |
| NAG $10^{-9}$ AVERAGE = 3.42 | | | |
| NAG $10^{-12}$ | 1 | A, D, M | 3 |
| NAG $10^{-12}$ | 2 | A, M, $AN_2$, D | 3.5 |
| NAG $10^{-12}$ | 3 | A, MP, D, M | 4 |
| NAG $10^{-12}$ | 4 | $AN_2$, A, M | 3.5 |
| NAG $10^{-12}$ | 5 | A, D, M | 4 |
| NAG $10^{-12}$ | 6 | $AN_2$, A, M | 3.5 |
| NAG $10^{-12}$ | 7 | A | 1 |
| NAG $10^{-12}$ | 8 | A, M | 3 |
| NAG $10^{-12}$ | 9 | M, A | 3 |
| NAG $10^{-12}$ | 10 | A, M, D | 3 |
| NAG $10^{-12}$ | 11 | MP, M, $AN_2$, A | 4 |
| NAG $10^{-12}$ | 12 | A, M, D | 3 |
| NAG $10^{-12}$ AVERAGE = 3.21 | | | |
| NAG $10^{-18}$ | 1 | A, M | 2.5 |
| NAG $10^{-18}$ | 2 | A, M, D | 3 |
| NAG $10^{-18}$ | 3 | M, A, $AN_2$ | 3 |
| NAG $10^{-18}$ | 4 | A, M | 3 |
| NAG $10^{-18}$ | 5 | M, A, D | 4 |
| NAG $10^{-18}$ | 6 | $AN_2$, A | 2.5 |
| NAG $10^{-18}$ | 7 | M, D, A | 3.5 |
| NAG $10^{-18}$ | 8 | A, M | 2.5 |
| NAG $10^{-18}$ | 9 | A, M | 3 |
| NAG $10^{-18}$ | 10 | A, $AN_2$ | 2 |
| NAG $10^{-18}$ | 11 | A, M, D | 3.5 |
| NAG $10^{-18}$ | 12 | A, MP | 3 |
| NAG $10^{-18}$ AVERAGE = 3.17 | | | |

| CHEMICAL CRAWFISH # | MOS $10^{-18}$ | MOS $10^{-12}$ | MOS $10^{-9}$ | MOS $10^{-6}$ |
|---|---|---|---|---|
| 1 | 3 | 1 | 5 | 3.0 |
| 2 | 1.5 | 2 | 1.5 | 1 |
| 3 | 3 | 2 | 1 | 2.0 |
| 4 | 1 | 4 | 1.5 | 2.5 |
| 5 | 2 | 4 | 3 | 1 |
| 6 | 2.5 | 2.5 | 2.5 | 0 |
| 7 | 1.5 | 4.5 | 3 | .5 |
| 8 | 2 | 1 | 4 | 1.5 |
| 9 | 3 | 2 | 4.5 | 2.5 |
| 10 | 2 | 1 | 3.5 | .5 |
| 11 | 2.5 | 3 | 2.5 | 1.5 |
| 12 | 3 | 4.5 | 2.5 | 0 |
| AVERAGE | 2.25 | 2.63 | 2.88 | 1.33 |
| MEDIAN | 2.25 | 2.25 | 2.75 | 1.25 |

The foregoing and additional data are set forth graphically in FIGS. 34, 35, 36 and 37 described in the "BRIEF DESCRIPTION OF THE DRAWINGS" and "DETAILED DESCRIPTION OF THE DRAWINGS" sections, infra.

Specific aspects of the testing apparatus used in testing the above chemicals as against the *Procambrus clarkii* species of the Class Crustacea (crawfish) is set forth in the brief description of FIGS. 2 and 3 and in the detailed description of FIGS. 2 and 3, infra, and is further set forth in copending Applications for U.S. patent Ser. No., 08/279,181 filed on Jul. 22, 1994 and Ser. No. 08/413,440 filed on Mar. 30, 1995, the specifications for incorporated herein by reference.

Response as a function of concentration of active chemical, e.g., TMOH, NAG and/or OBS taken alone or in combination is described via a number of different mathematical models which are graphically set forth in FIGS. 6, 7 and 8 described, infra. These mathematical models set forth as follows:

$$R = 5.0014 - [\log_{10}C]^2(0.0084 + 0.5169\, e^{+0.45\,[\log_{10}C]})$$

(for NAG: mean of data);

$$R=0.7874[-\log_{10}C]^{-3/2}-0.0001[\log_{10}C]^2+3.041$$

(for NAG: median of data);

$$R=4.6574+0.0018[\log_{10}C]^3+0.0322[\log_{10}C]^2+0.0907[\log_{10}C]$$

(for NAG: for mean of all data points);

$$R=(-6\times10^{-4})[\log_{10}C]e^{-0.2569[\log 10C]}+0.0207[\log_{10}C]+3.5607$$

(for TMOH: mean of data);

$$R=-2.6824 \sinh[-0.1\{\log_{10}C\}]-0.3680[\log_{10}C]+3.1913$$

(for TMOH: for median of data points);

$$R=(-0.0082)[\log_{10}C]^2 e^{-0.0573[\log 10C]}-0.0066[\log_{10}C]^2+6.3210$$

(for OBS: mean of data points);

$$R=(-1.5542\times10^4)\{\log_{10}C\}^2 e^{+2.1941[\log 10C]}-0.1613[\log_{10}C]^2+11.2387$$

(for OBS: median of data points);

$$R=0.1302[\log_{10}C]^2 e^{0.092\,[\log 10C]}-0.3697[\log_{10}C]-5.0549$$

(for MOS: mean of data points); and $$R=152.9674-0.732[\log_{10}C]^2 e^{0.0485}\log^{10C}+12.433[\log_{10}C]$$

(for MOS: for median of data points).

In the foregoing equations, the term "R" is the "response" scored as described, infra; and the term "C" is the concentration of active ingredient, e.g., OBS in the saline solution in gram moles per liter.

BRIEF DESCRIPTION OF THE DRAWINGS

FIG. 1A is a schematic side elevation diagram of *Peneaus vannamei*, Pacific White Shrimp, farm-reared species, showing the locations of various chemoreceptors as well as other appendages that are the basis for measurement of excitation, incitation, attraction and stimulation of the *Paneaus vannamei*, a member of the Class Crustacea.

FIG. 1B is a schematic side elevation diagram of the *Procambrus clarkii* (crawfish) species of the Class Crustacea, showing the locations of various chemoreceptors as well as other appendages that are the basis for measurement of excitation, attraction and stimulation of the *Procambrus clarkii* (crawfish) species of the Class Crustacea.

FIG. 1C is a schematic bottom ("ventral") view of the *Procambrus clarkii* (crawfish) species of the Class Crustacea showing the locations of various chemoreceptors as well as other appendages that are the basis for measurement of excitation, attraction and stimulation of the *Procambrus clarkii* (crawfish) species of the Class Crustacea.

FIG. 1D is a schematic top ("dorsal") view of the *Procambrus clarkii* (crawfish) species of the Class Crustacea showing the locations of various chemoreceptors as well as other appendages that are the basis for measurement of excitation, attraction and stimulation of the *Procambrus clarkii* (crawfish) species of the Class Crustacea.

FIG. 2A is a schematic diagram of the static tank testing apparatus useful in the practice of our invention showing the interrelationship of the projection device 201 with the video camera or camcorder means 210 of our invention.

FIG. 2B is a perspective view of the static tank 208 shown in the static test apparatus of FIG. 2A.

FIG. 3 is a schematic cut-away side elevation view of apparatus showing the use of the flow-through testing apparatus useful in the practice of our invention.

FIG. 3A is a cut-away plan view of the flow-through tank apparatus useful in the practice of our invention taken in combination with the video camera/camcorder lens of the flow-through testing apparatus useful in the practice of our invention shown in FIG. 3.

FIG. 3B is a cut-away side elevation view of the flow-through tank portion of the flow-through testing apparatus of FIG. 3 useful in the practice of our invention.

FIG. 3C is an end view of the flow-through tank of the flow-through testing apparatus of FIG. 3 useful in the practice of our invention.

FIG. 4 is a cut-away side elevation view of the variable focus/focal length video camera or camcorder used in conjunction with the variable or constant intensity visible light and (i) the static tank testing apparatus useful in the practice of our invention; (ii) the flow-through testing apparatus useful in the practice of our invention or (iii) the Y-maze apparatus useful in the practice of our invention.

FIG. 4A is a side elevation view of the support apparatus for the camera used in conjunction with the apparatus of FIG. 4.

FIG. 4B is a front view of the support equipment for the camera of FIG. 4.

FIG. 4C is a side elevation view of another embodiment of the apparatus used in conjunction with the camera of FIG. 4.

FIG. 4D is a front view of the support apparatus for the camera of FIG. 4.

FIG. 4E is a top view of the support apparatus for the apparatus of FIG. 4.

FIG. 4F is another embodiment of the support apparatus of the equipment of FIG. 4.

FIG. 5A is the top view (cut-away). of the Y-maze testing apparatus useful in the practice of our invention without insertion of either a "corral" or a "curved wall" insert.

FIG. 5B is a cut-away side elevation view of the apparatus of FIG. 5A.

FIG. 5C is the top view of another embodiment of the Y-maze testing apparatus useful in the practice of our invention containing a "corral" section at the back of the base rectangular parallelepiped section of the Y-maze.

FIG. 5D is a cut-away side elevation view of the apparatus of FIG. 5C.

FIG. 5E is a top view (cut-away) of another embodiment of the Y-maze testing apparatus useful in the practice of our invention containing a "curved wall" insert at the back of the base rectangular parallelepiped of the Y-maze apparatus.

FIG. 5F is a cut-away side elevation view of the Y-maze testing apparatus of FIG. 5E.

FIG. 5G is a schematic diagram illustrating the testing protocol using the Y-maze apparatus system useful in the practice of our invention.

FIG. 6A is a schematic diagram of Y-maze testing apparatus of the prior art.

FIG. 6B is a schematic block flow diagram showing production of Osceola Brown Sugar manufactured by Osceola Farms, Inc. of Pahokee, Fla.

FIG. 7A is a perspective view of the static tank testing apparatus of our invention shown in FIG. 2A, showing testing of *Penaeus vannamei*.

FIG. 7B is a perspective schematic diagram of the static tank testing apparatus useful in practicing our invention showing the interrelationship of the projection device 201 with the video camera or camcorder means 210 useful in practicing our invention; and showing testing of *Procambrus clarkii*.

FIG. 7C is a perspective view in schematic form of the flow-through testing apparatus of FIG. 3 (without showing the camera blind combination useful in the practice of our invention).

FIG. 7D is a schematic perspective view of apparatus showing the use of the flow-through testing apparatus useful in the practice of our invention; and showing testing of *Procambrus clarkii*.

FIG. 8 sets forth two graphs showing the response "R" versus:

$[-\log_{10}C]$ with $[-\log_{10}C]$ on the "Y" axis and the response ("R") on the "X" axis for the testing of the mixture of compounds having the structures:

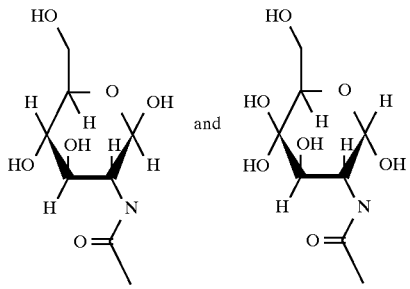

in the static tank testing apparatus.

Figure 23:
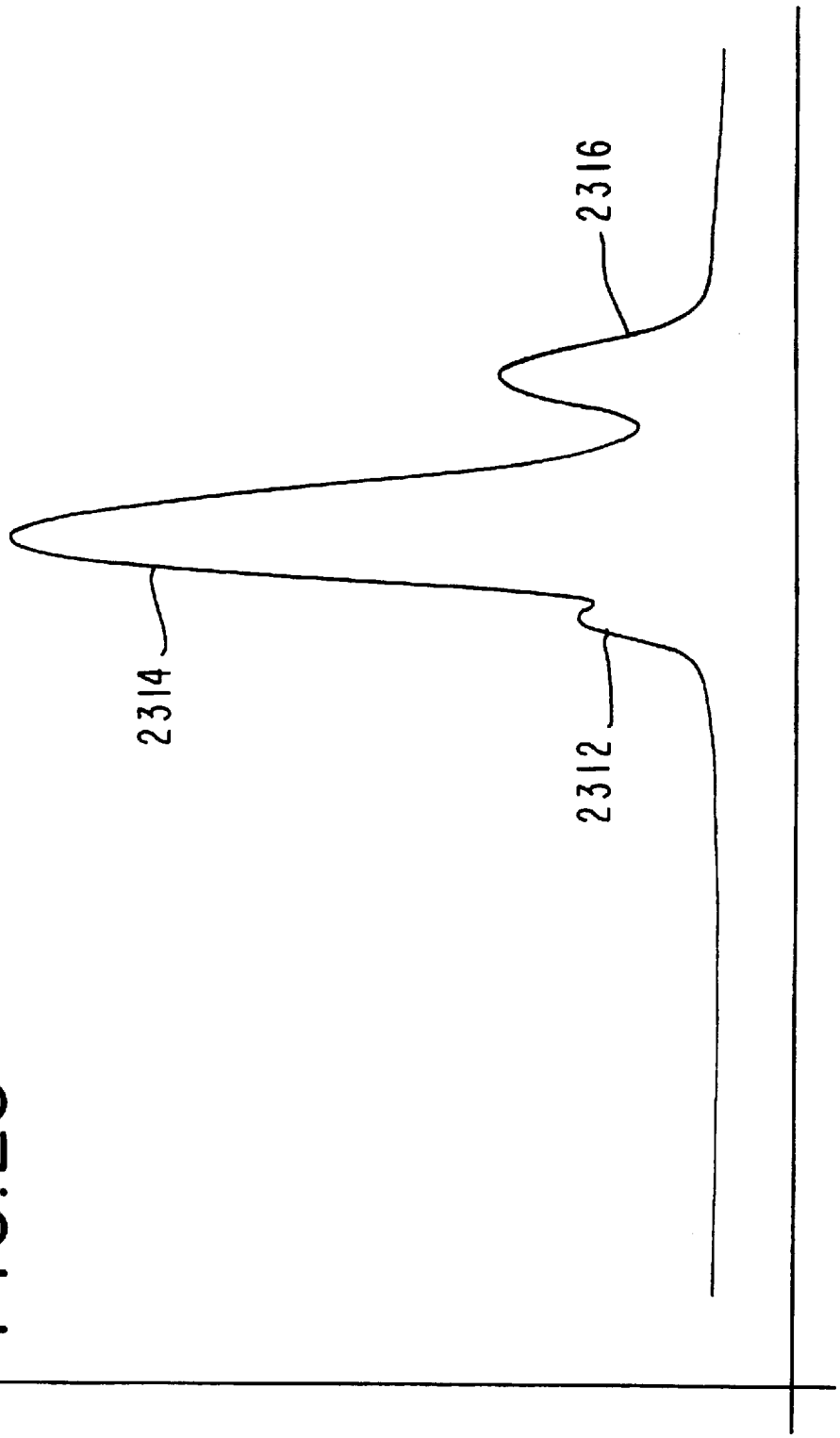
Figure 24:
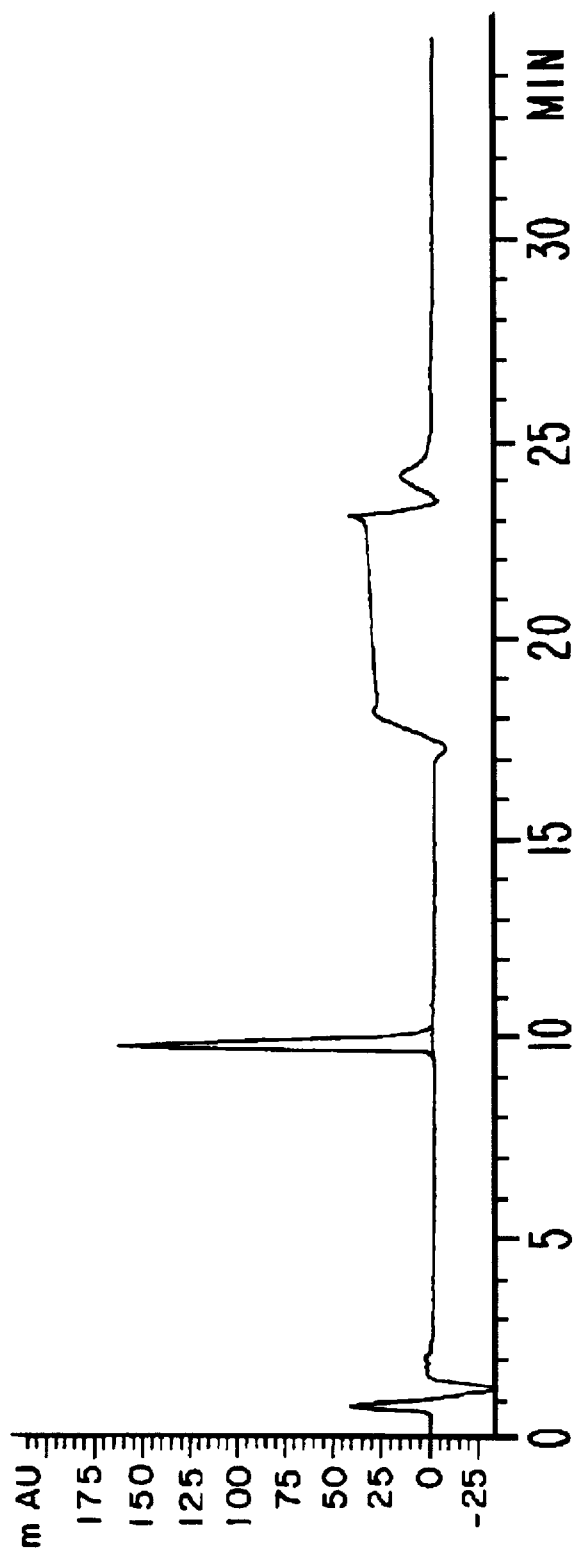

FIG. 9 is a series of "Response as a function of concentration" graphs (parabolic and linear regression) showing on the "Y" axis:

$[-\log_{10}C]$ and on the "X" axis the response "R" with "C" being in gram moles per liter for the materials:

(a) TALIN®, a mixture of Thaumatin I, Thaumatin II and Thaumatin B the liquid chromatograms of which are set forth in FIGS. 23 and 24 (TALIN® is a trademark of Tate and Lyle Limited of the United Kingdom);

(b) S-methyl methionine sulfonium chloride having the structure:

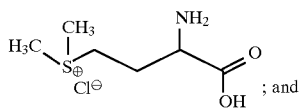

(c) D-Glucosamine, an epimeric mixture of compounds having the structures:

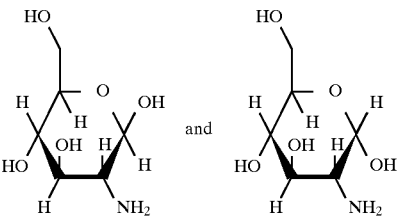

tested against *Penaeus vannamei* in a static tank testing apparatus of FIGS. 2A and 7A.

FIG. 10 is a series of "Response as a function of concentration" graphs (parabolic and linear regression) of:

$[-\log_{10}]$ versus response "R" with:

$[-\log_{10}C]$ being on the "Y" axis and "R" being on the "X" axis for the substances:

(a) trimethyl amine oxide hydrate having the structure:

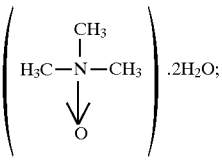

(b) propiothetin (bromide) having the structure:

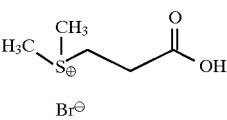

in the static tank testing apparatus of FIGS. 2A and 7A as against *Penaeus vannamei*.

FIG. 11 is a series of "Response as a function of concentration" graphs (parabolic and linear regression) of:

$[-\log_{10}C]$ versus response "R", with:

$[-\log_{10}C]$ on the "Y" axis and "R" on the "X" axis for the substances:

(a) (R)(S)1-octen-3-ol having the structure:

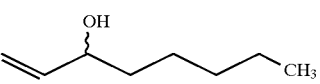

(a mixture of isomers having the structures:

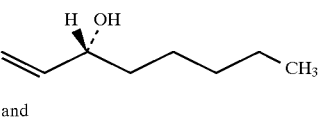

and

-continued

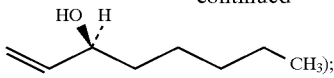

(b) guanidine having the structure:

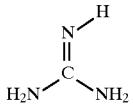

in the static tank testing apparatus of FIGS. 2A and 7A against the species *Penaeus vannamei*.

FIG. 12 is a "Response as a function of concentration" graph (linear) of:

$[-\log_{10}C]$ on the "Y" axis versus response "R" on the "X" axis for TALIN® (a mixture of Thaumatin I, Thaumatin II and Thaumatin B, the liquid chromatograms for which are set forth in FIGS. 23 and 24 described, infra) in the static tank testing apparatus for FIGS. 2A and 7A as against *Penaeus vannamei*. The concentration is in grams per liter.

FIG. 13 is a series of "Response as a function of concentration" graphs (parabolic and linear regression) of:

$[-\log_{10}C]$ on the "Y" axis versus response "R" on the "X" axis for the substances:

(a) dimethyl sulfoxide having the structure:

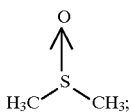

(b) methional having the structure:

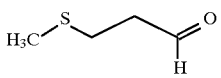

in the static tank test apparatus of FIGS. 2A and 7A as against the species *Penaeus vannamei*.

FIG. 14 is a "Response as a function of concentration" pair of graphs (parabolic and linear regression) of:

$[-\log_{10}C]$ on the "Y" axis versus response "R" on the "X" axis for the substance, a 50:50 mole:mole mixture of skatole having the structure:

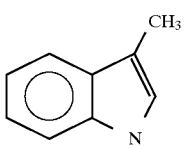

and indole having the structure:

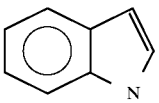

in the static tank test apparatus of FIGS. 2A and 7A as against *Penaeus vannamei*.

FIG. 15 is a series of "Response as a function of concentration" graphs (parabolic and linear regression) of:

$[-\log_{10}C]$ on the "Y" axis versus response "R" on the "X" axis for the substances:

(a) ammonium chloride;
(b) ammonia (aqueous); and
(c) acetic acid using the static tank testing apparatus of FIGS. 2A and 7A as against the species *Penaeus setiferus*.

FIG. 16 is a series of "Response as a function of concentration" graphs (linear regression) of:

$[-\log_{10}C]$ on the "Y" axis versus response "R" on the "X" axis for the substances:

(a) glycine;
(b) betaine having the structure:

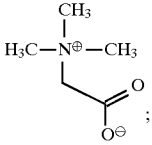

(c) aspartate ion (as sodium aspartate in solution)

in the static tank test apparatus of FIGS. 2A and 7A as against the species *Penaeus setiferus*.

Figure 17:
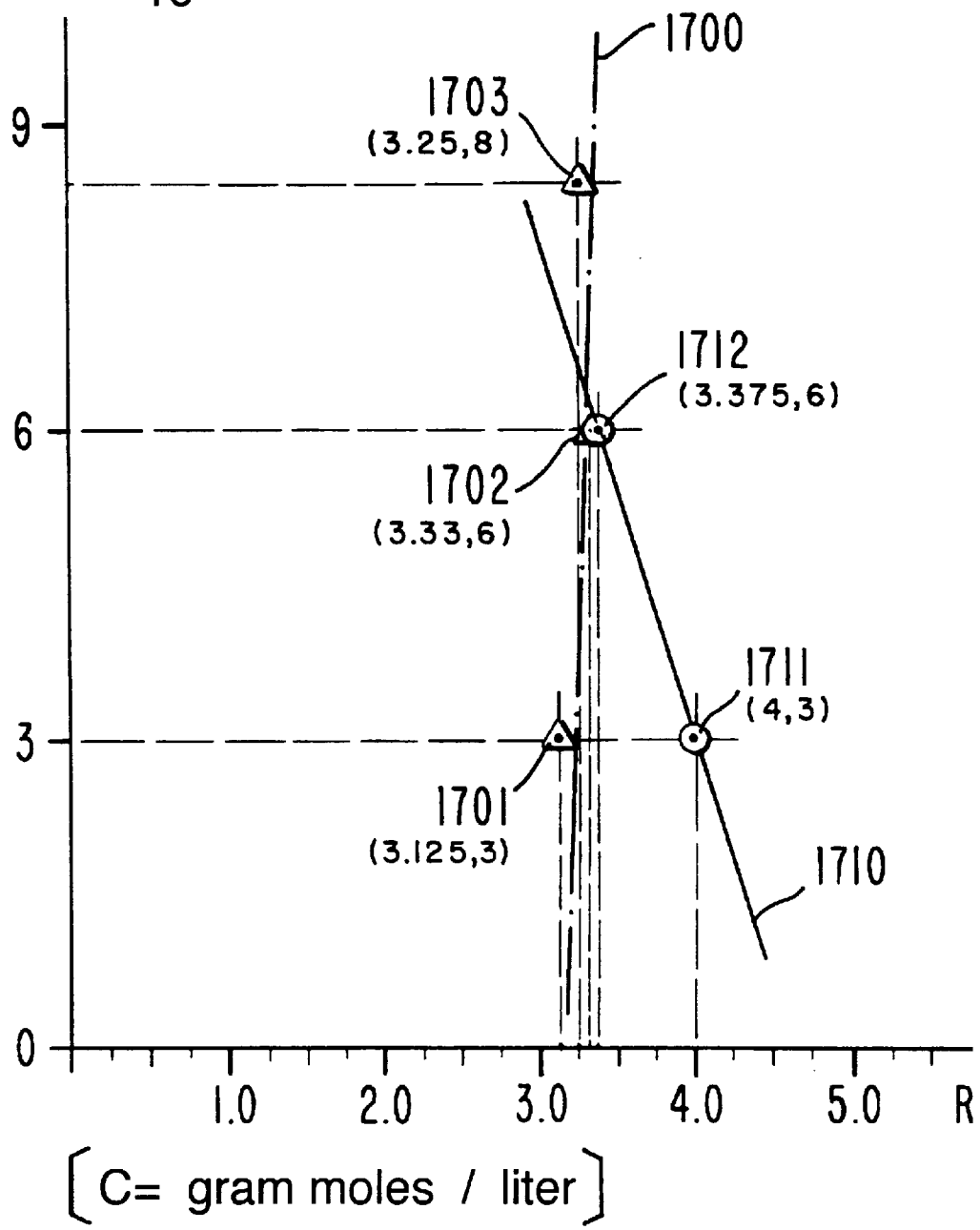

FIG. 17 is a pair of "Response as a function of concentration" graphs (linear regression) of:

$[-\log_{10}C]$ on the "Y" axis versus response "R" on the "X" axis for the substances:

(a) glucose; and
(b) taurine having the structure:

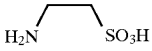

in the static tank testing apparatus of FIGS. 2A and 7A as against *Penaeus setiferus*.

Figure 18:
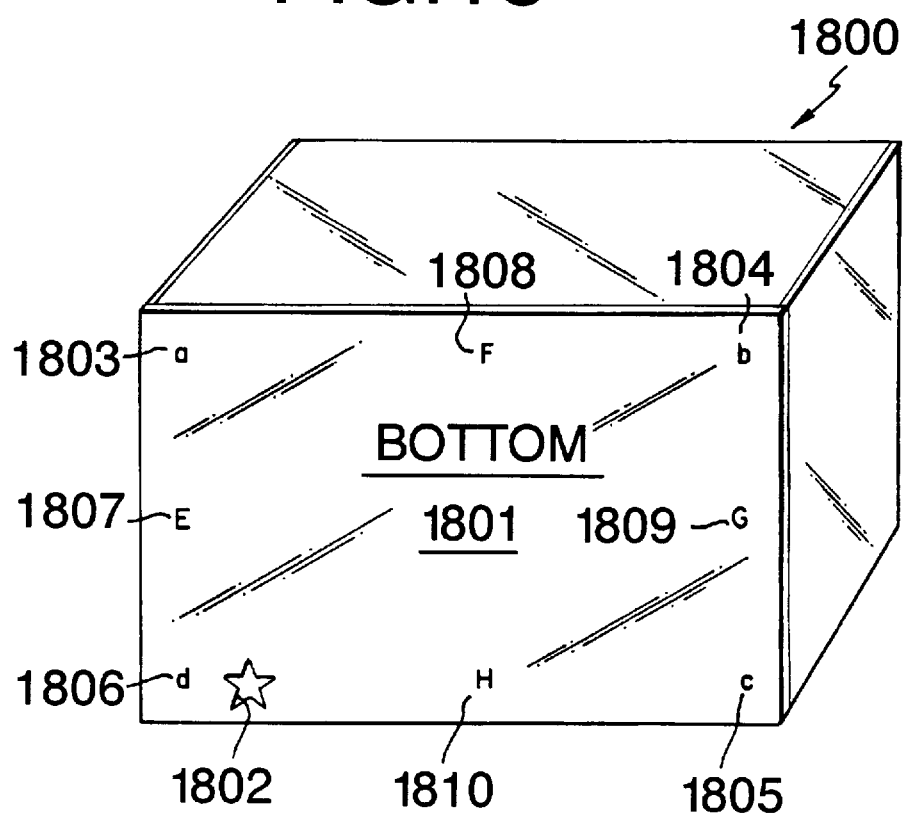

FIG. 18 is a schematic perspective diagram (bottom view) of the chemoreception test tank in the static tank testing apparatus of FIGS. 2A and 7A.

Figure 19:
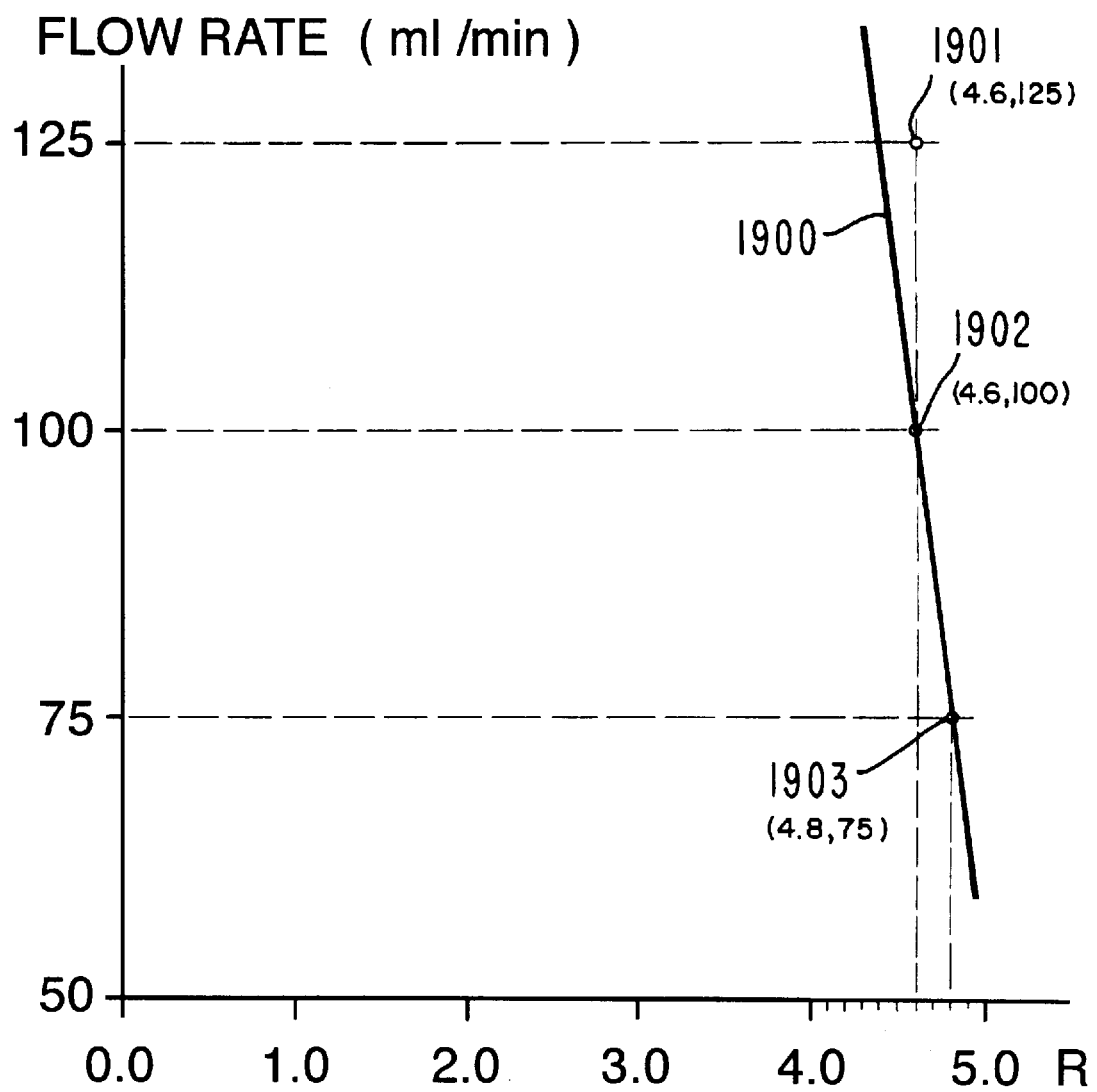

FIG. 19 is a linear graph of flow rate (ml per minute) on the "Y" axis versus response "R" on the "X" axis for a mixture of glucose and "natural extract", a mixture of one part of equal portions of tissue of crab claw, squid mantle and shrimp abdomen in 1,000 parts of FRITZ® Super Salt Concentrate, "synthetic sea salt" solution, 30 parts per thousand, described in detail, supra. The ratio of "natural" extract:super salt solution:glucose solution being 1:1,000:1 (weight:weight:weight). The graph is for the use of the solution in the flow-through apparatus of FIGS. 3 and 3B as against the species *Penaeus vannamei*.

Figure 20:
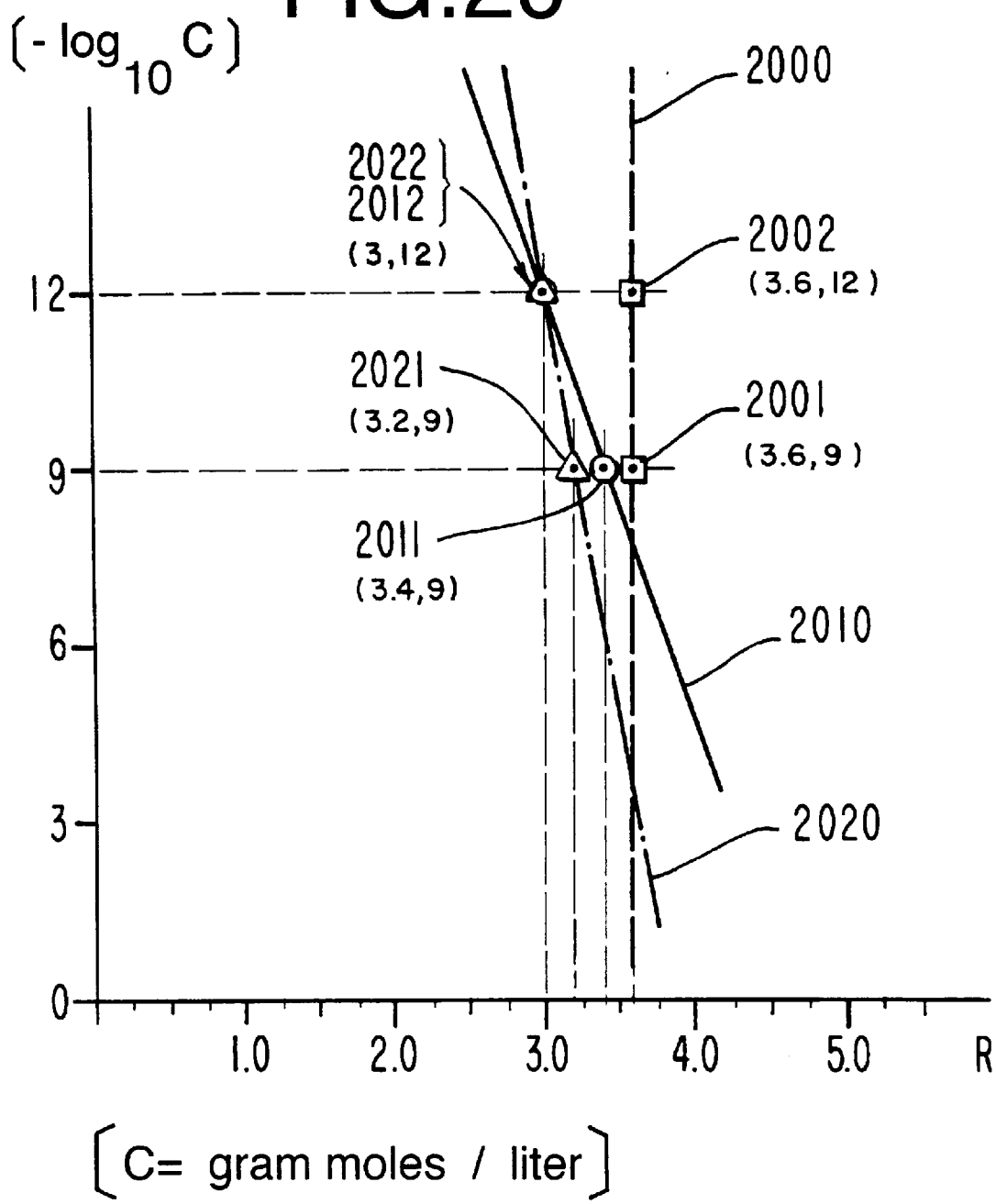

FIG. 20 is a pair of "Response as a function of concentration" graphs (linear regression) of:

[−log₁₀C]

(on the "Y" axis) versus response "R" on the "X" axis for various flow rates at various concentrations of ammonium acetate using the flow-through apparatus of FIGS. 3 and 3B for the species *Penaeus vannamei*.

Figure 21:
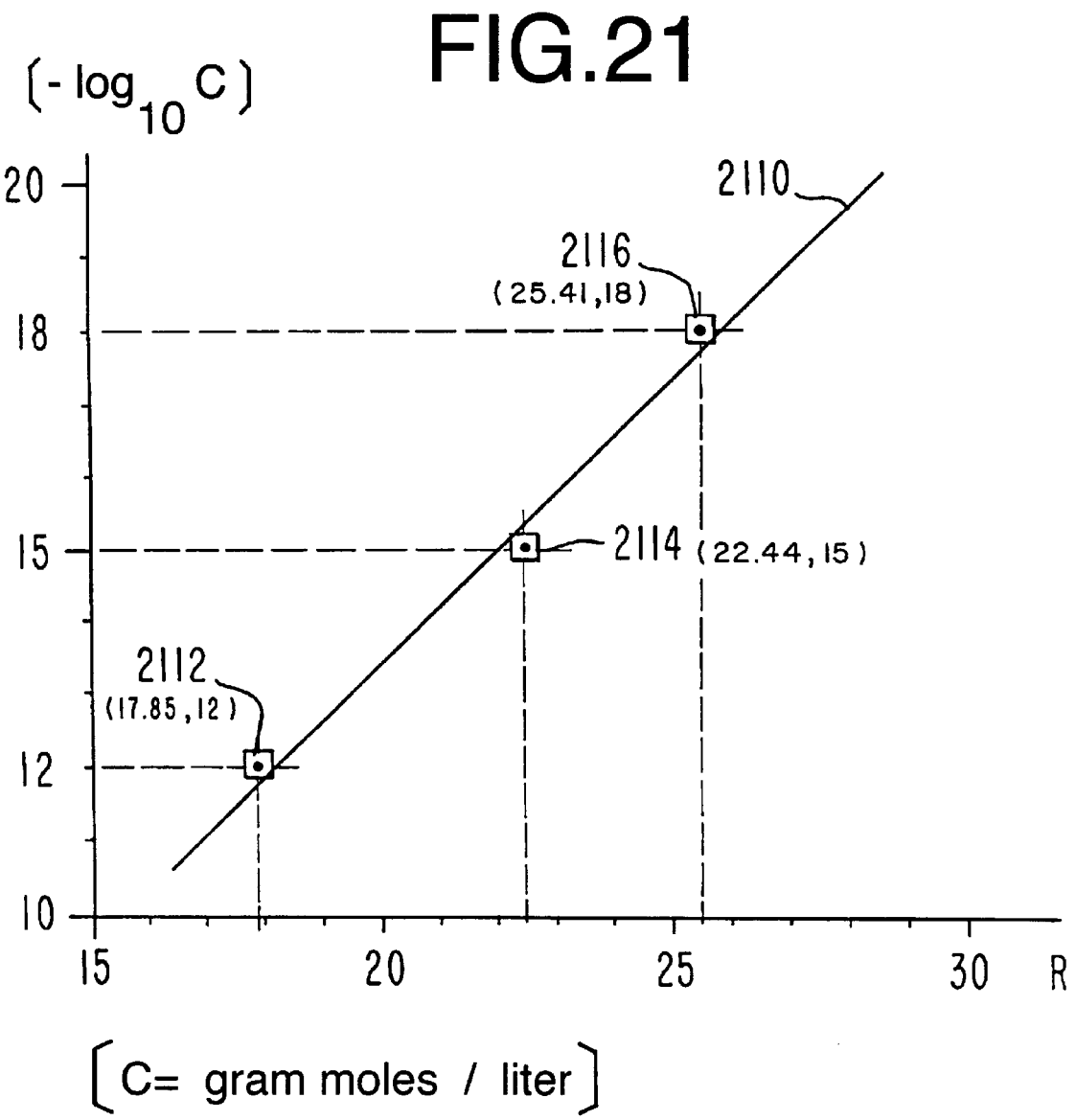

FIG. 21 is a "Response as a function of concentration" graph (linear regression) of:

[−log₁₀C]

(on the "Y" axis) versus response "R" on the "X" axis for the substance N-acetyl-D-Glucosamine, an epimeric mixture of compounds having the structures:

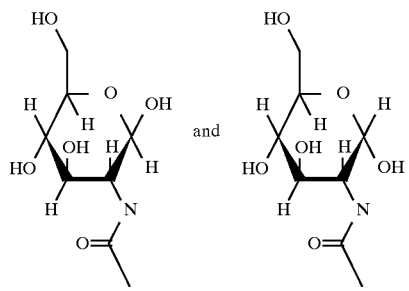

in the flow-through chamber testing apparatus of FIGS. 3 and 3B as against *Penaeus vannamei*.

Figure 22:
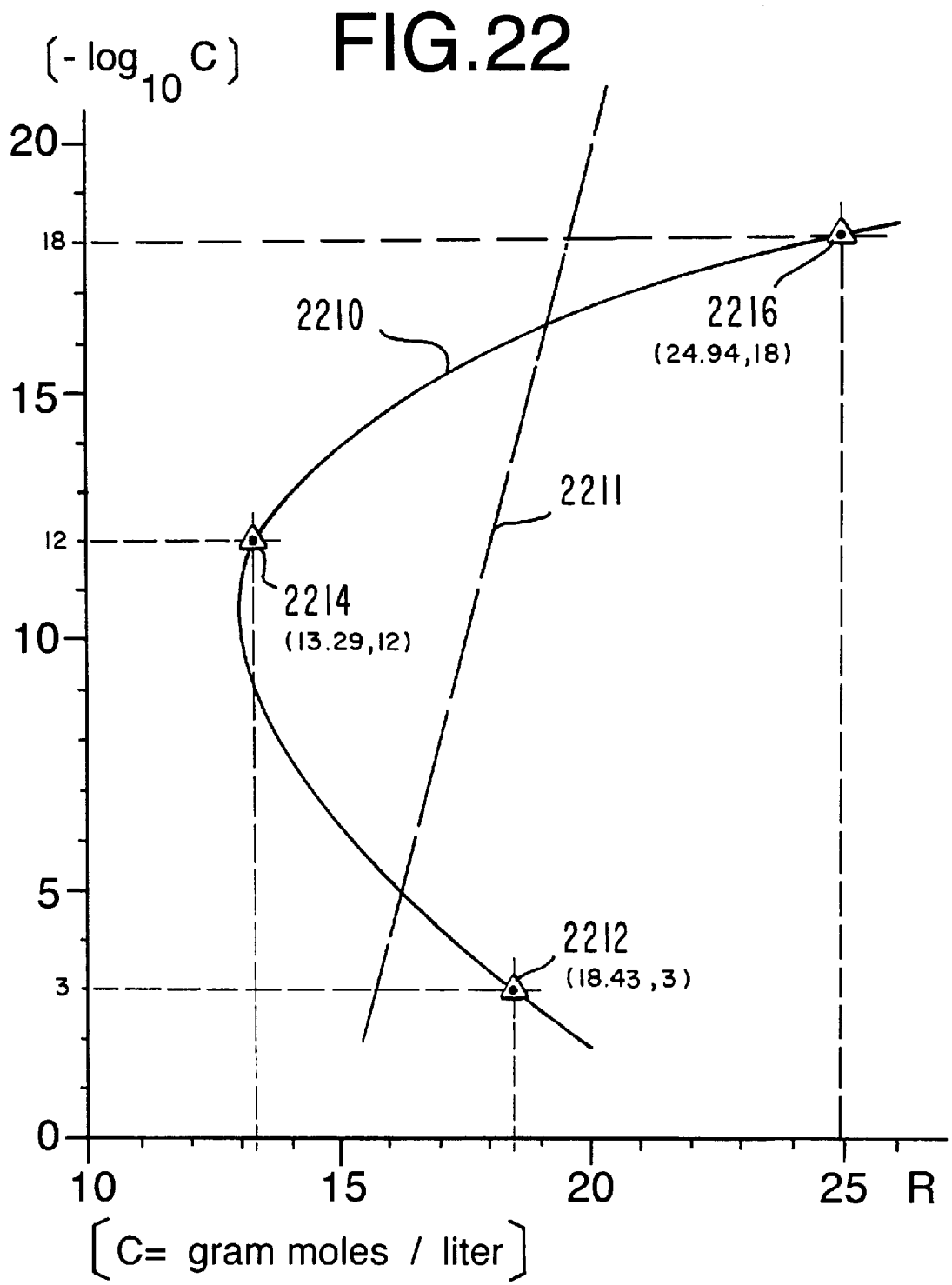

FIG. 22 is a pair of "Response as a function of concentration" graphs (parabolic and linear regression) of:

[−log₁₀C]

on the "Y" axis versus response "R" on the "X" axis with "C" being in gram moles per liter for the substance, methional having the structure:

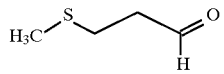

using the flow-through apparatus of FIGS. 3 and 3B as against the species *Penaeus vannamei*.

FIG. 23 is a liquid chromatogram profile for TALIN®, trademark of Tate and Lyle Limited of the United Kingdom, a mixture of Thaumatin I, Thaumatin II and Thaumatin B.

FIG. 24 is an HPLC (high pressure liquid chromatography) profile for TALIN®, the mixture of Thaumatin B, Thaumatin I and Thaumatin II, trademark of Tate and Lyle Limited of the United Kingdom.

Figure 25:
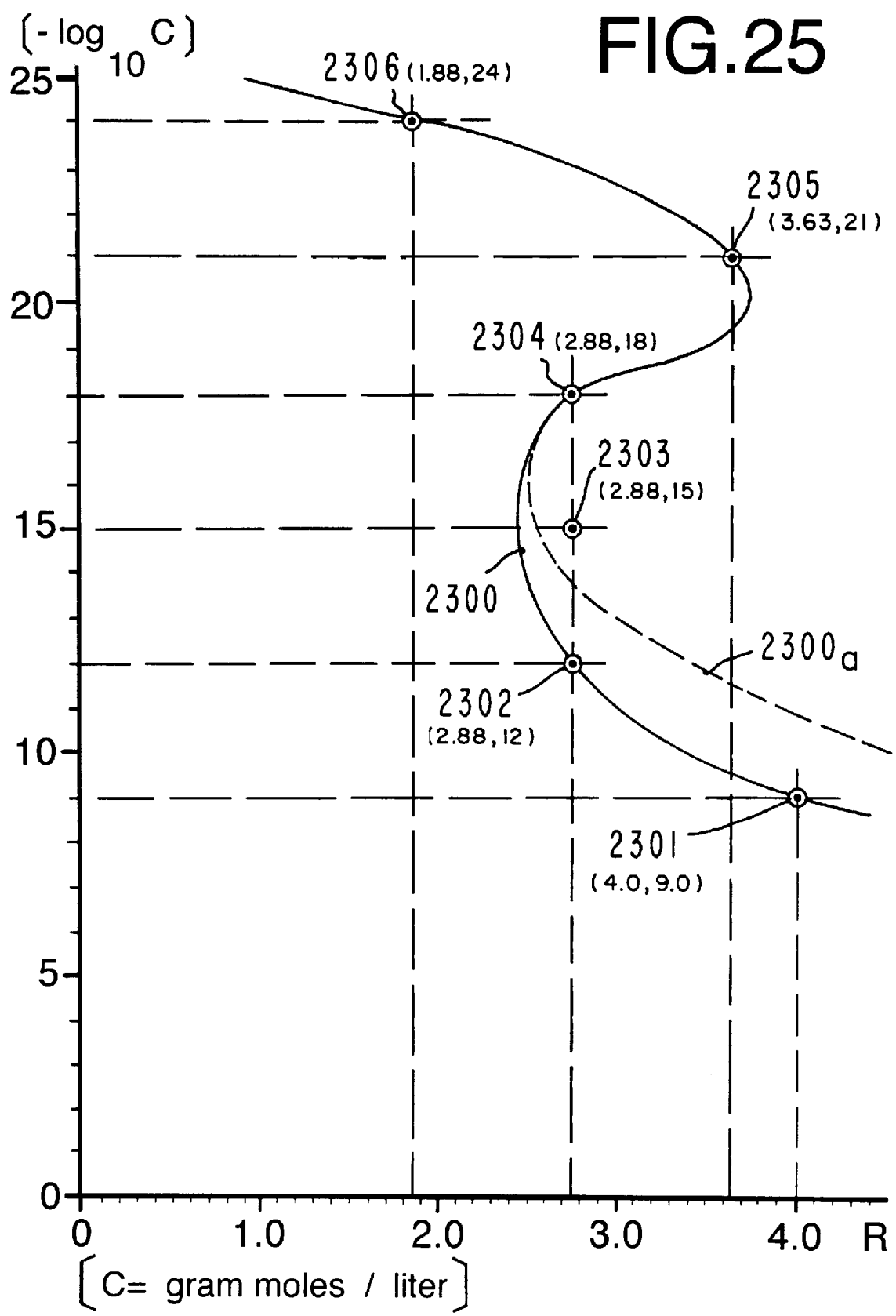

FIG. 25 is a pair of "Response as a function of concentration" graphs (cubic and cubic regression) of:

[−log₁₀C ]

on the "Y" axis versus response "R" on the "X" axis with "C" being in gram moles per liter for the substance, 2-methyl-3-(methyldithio)furan having the structure:

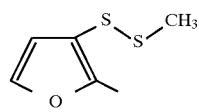

in the flow-through chamber testing apparatus of FIGS. 3 and 3B as against *Penaeus vannamei*.

Figure 26:
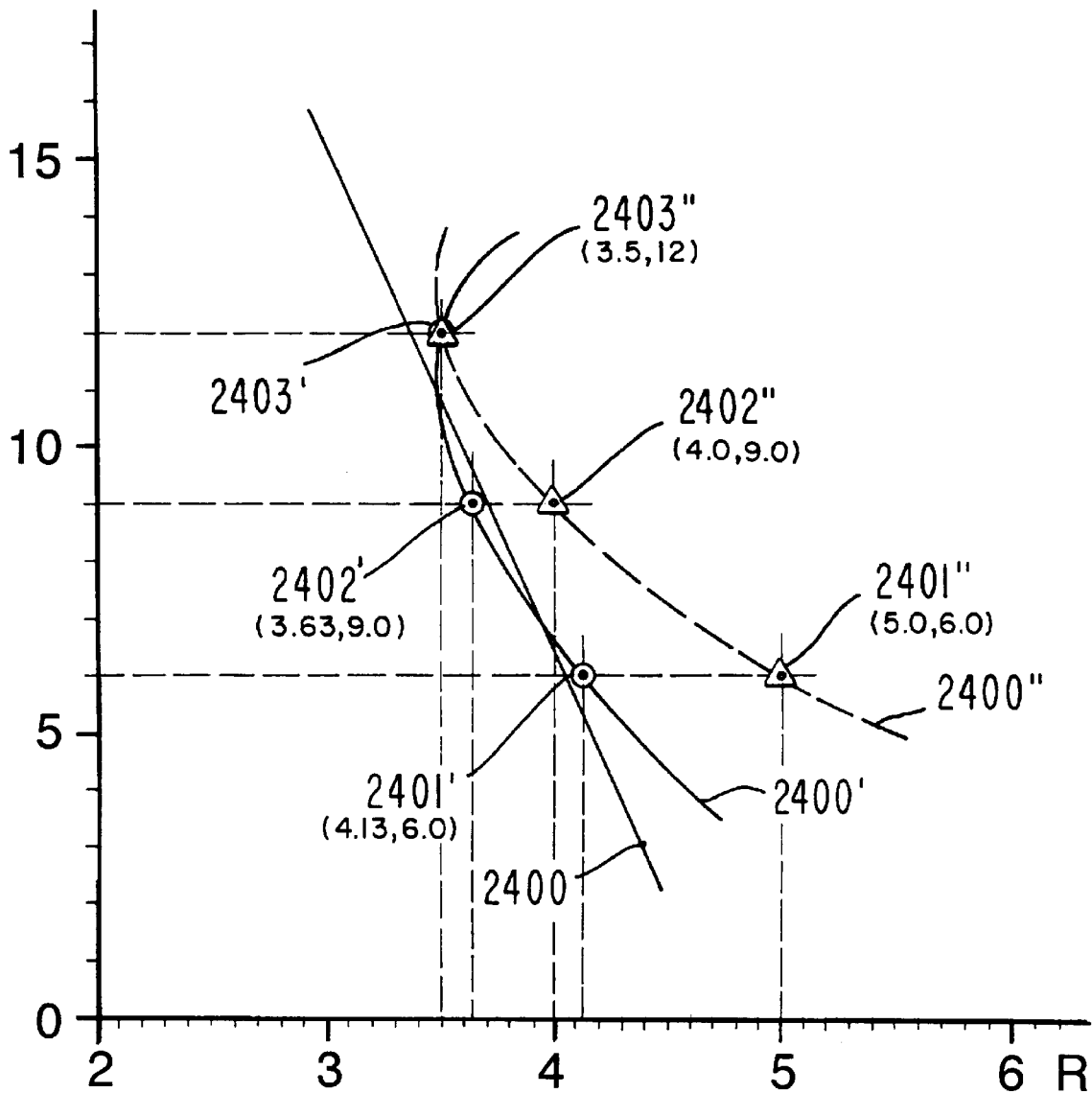

FIG. 26 is a series of "Response as a function of concentration" graphs (exponential, hyperbolic and linear regression) of:

[−log₁₀C]

on the "Y" axis versus response "R" on the "X" axis with "C" being in gram moles per liter for the substance Osceola Brown Sugar, manufactured by Osceola Farms Inc. of Pahokee, Fla. (headspace analysis as trapped on TENAX® as set forth in FIG. 27) in the flow-through chamber testing apparatus of FIGS. 3 and 3B as against *Penaeus vannamei*.

Figure 27:
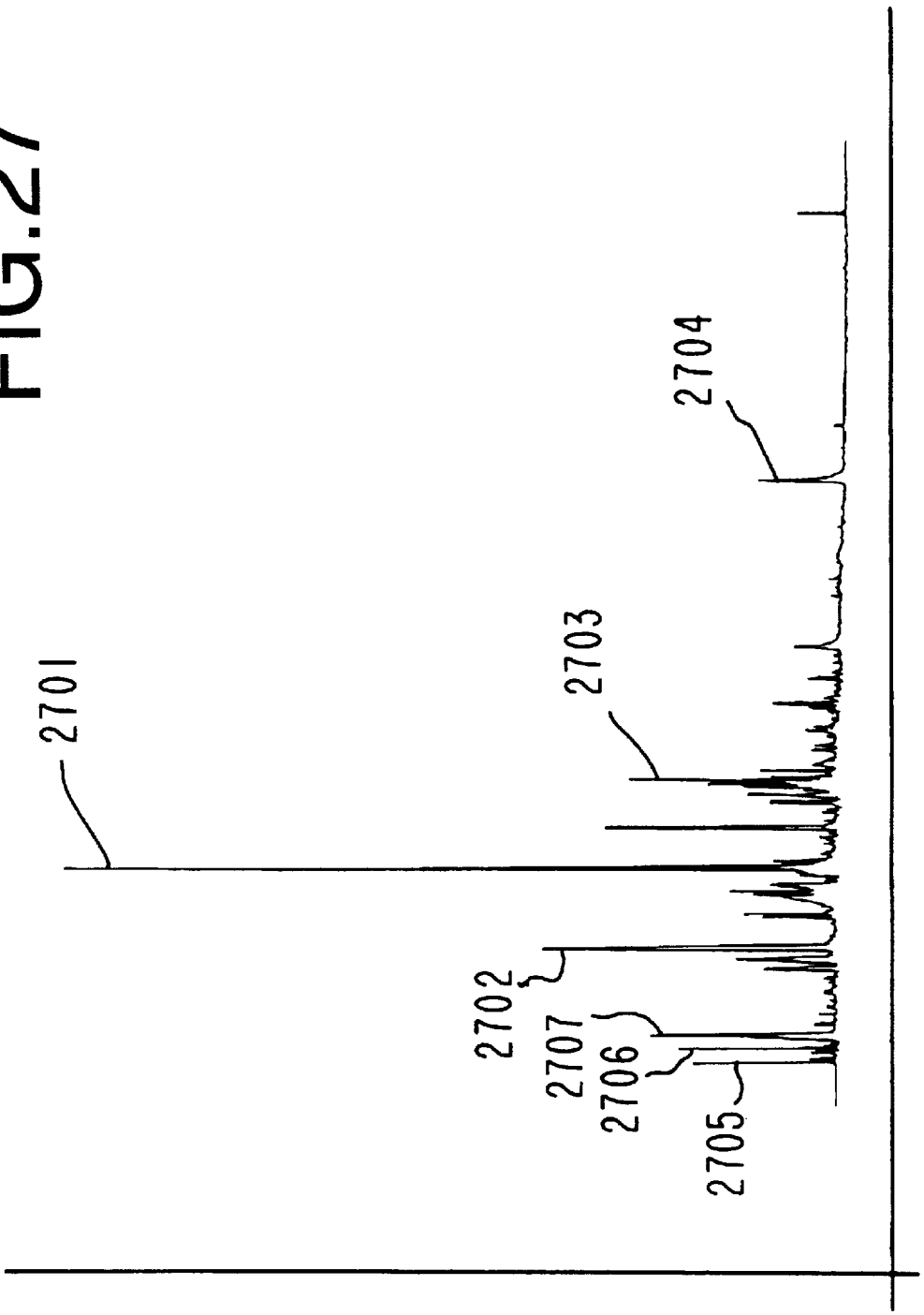

FIG. 27 is a GC profile for the headspace analysis (trapped on TENAX®) for Osceola Brown Sugar, manufactured by Osceola Farms Inc. of Pahokee, Fla.

Figure 28:
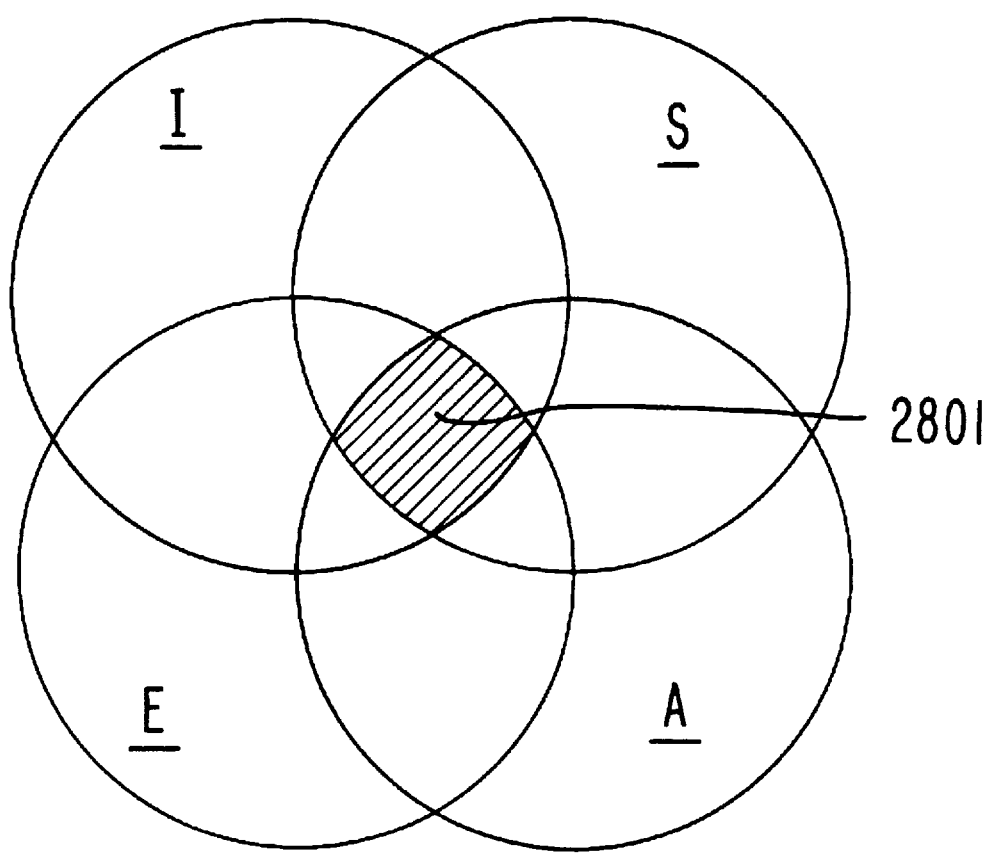

FIG. 28 is a "VENN" set diagram showing intersecting sets of stimulants, attractants, incitants and excitants for members of the species *Penaeus* genus of the Class Crustacea and the shaded intersection for those specific substances which are each of incitants, stimulants, excitants and attractants for members of the *Penaeus* genus of the Class Crustacea.

Figure 29:
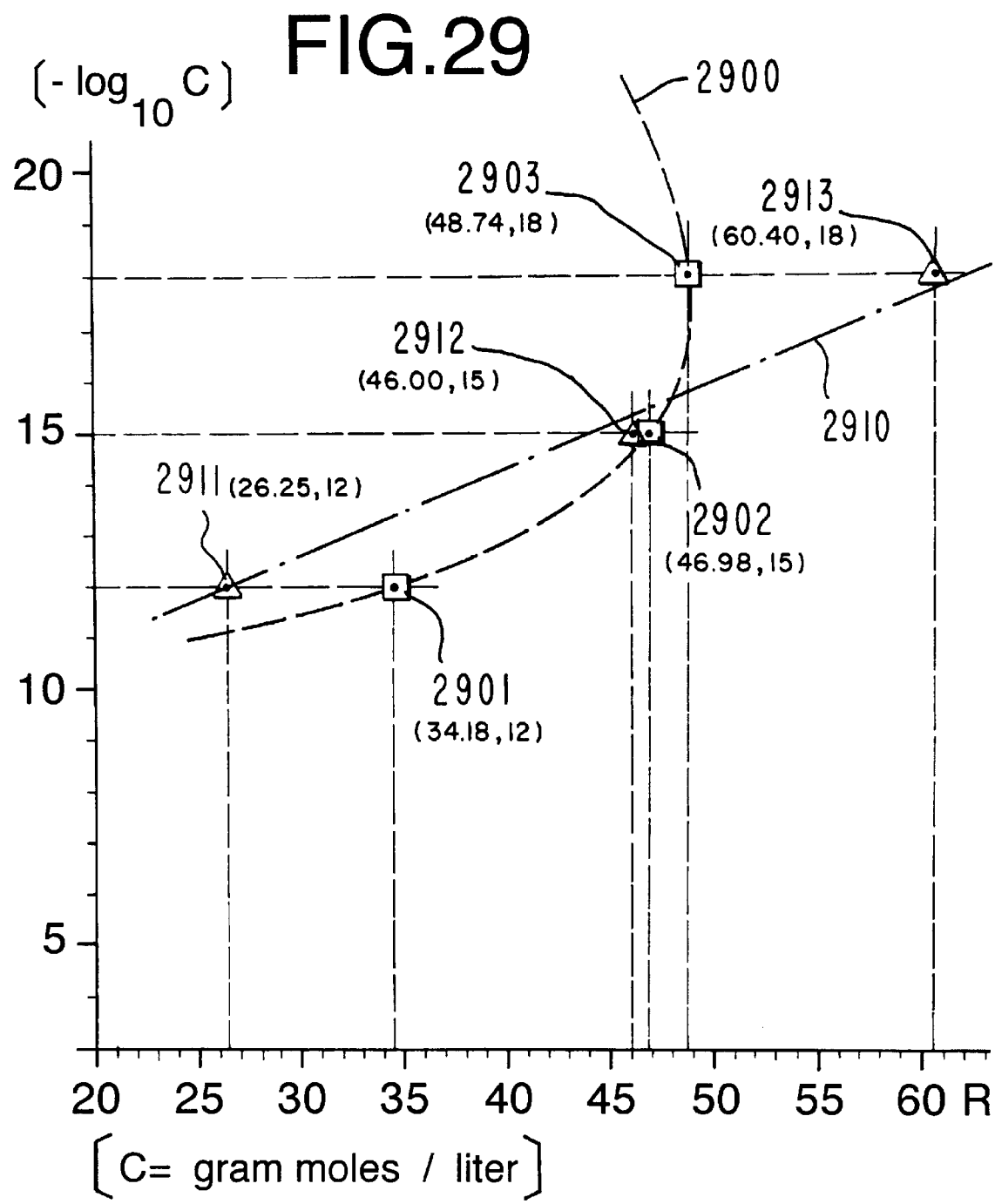

FIG. 29 is a pair of "Response as a function of concentration" graphs (hyperbolic or exponential and linear regression) of:

[−log₁₀C]

on the "Y" axis versus response "R" on the "X" axis with "C" being in gram moles per liter for the substance, N-acetyl-D-Glucosamine, an epimeric mixture of compounds having the structures:

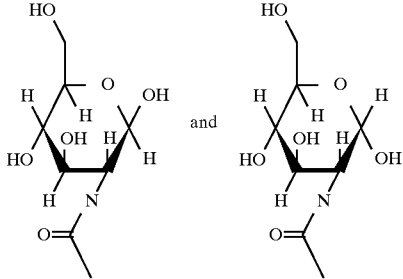

in the flow-through chamber testing apparatus of FIGS. 3 and 3B as against *Penaeus vannamei*.

Figure 30:
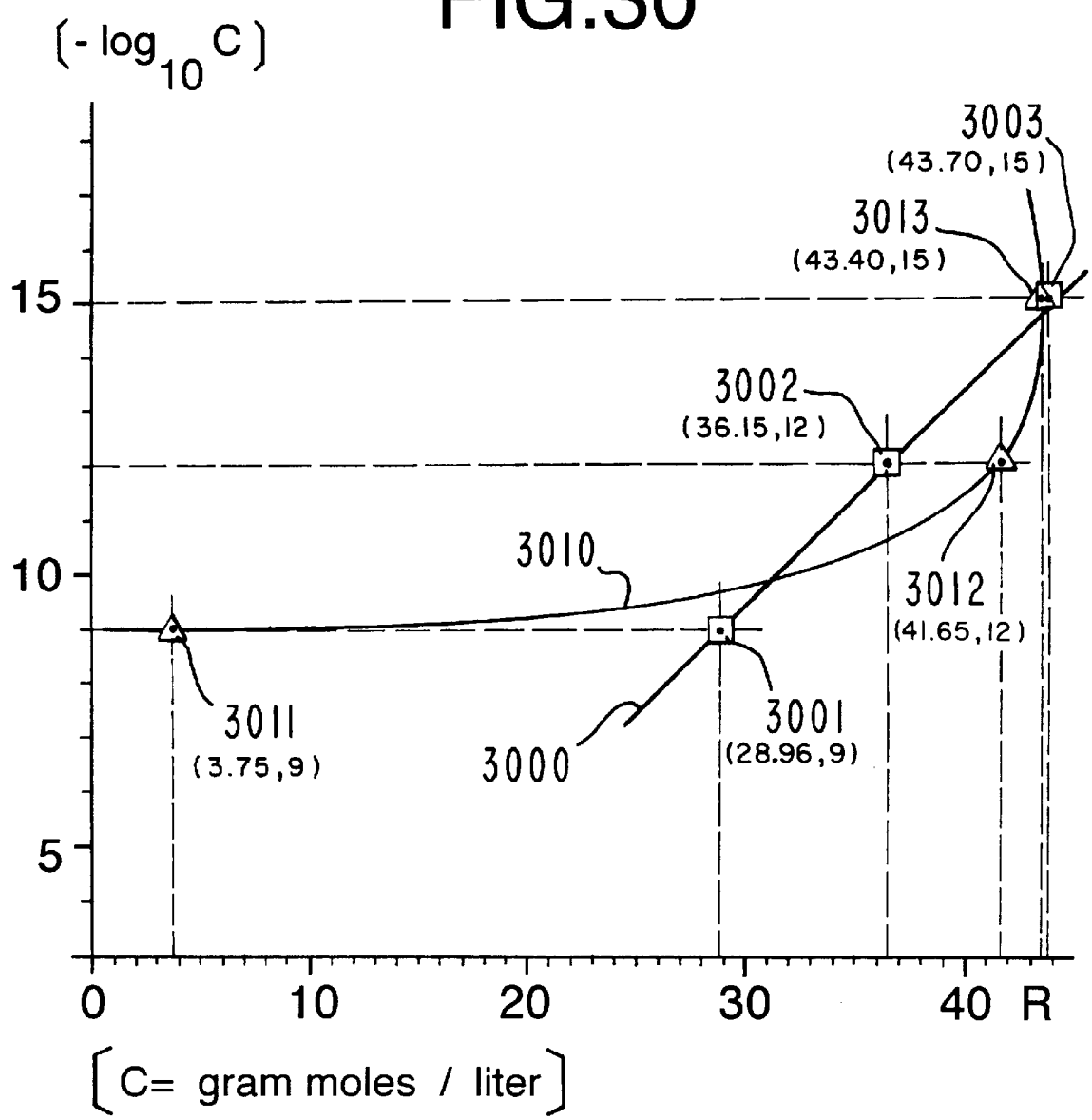

FIG. 30 is a pair of "Response as a function of concentration" graphs (mean and median) (exponential and linear regression) of:

[−log₁₀C]

on the "Y" axis versus response "R" on the "X" axis with "C" being in gram moles per liter for the substance, methional having the structure:

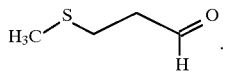

Figure 31:
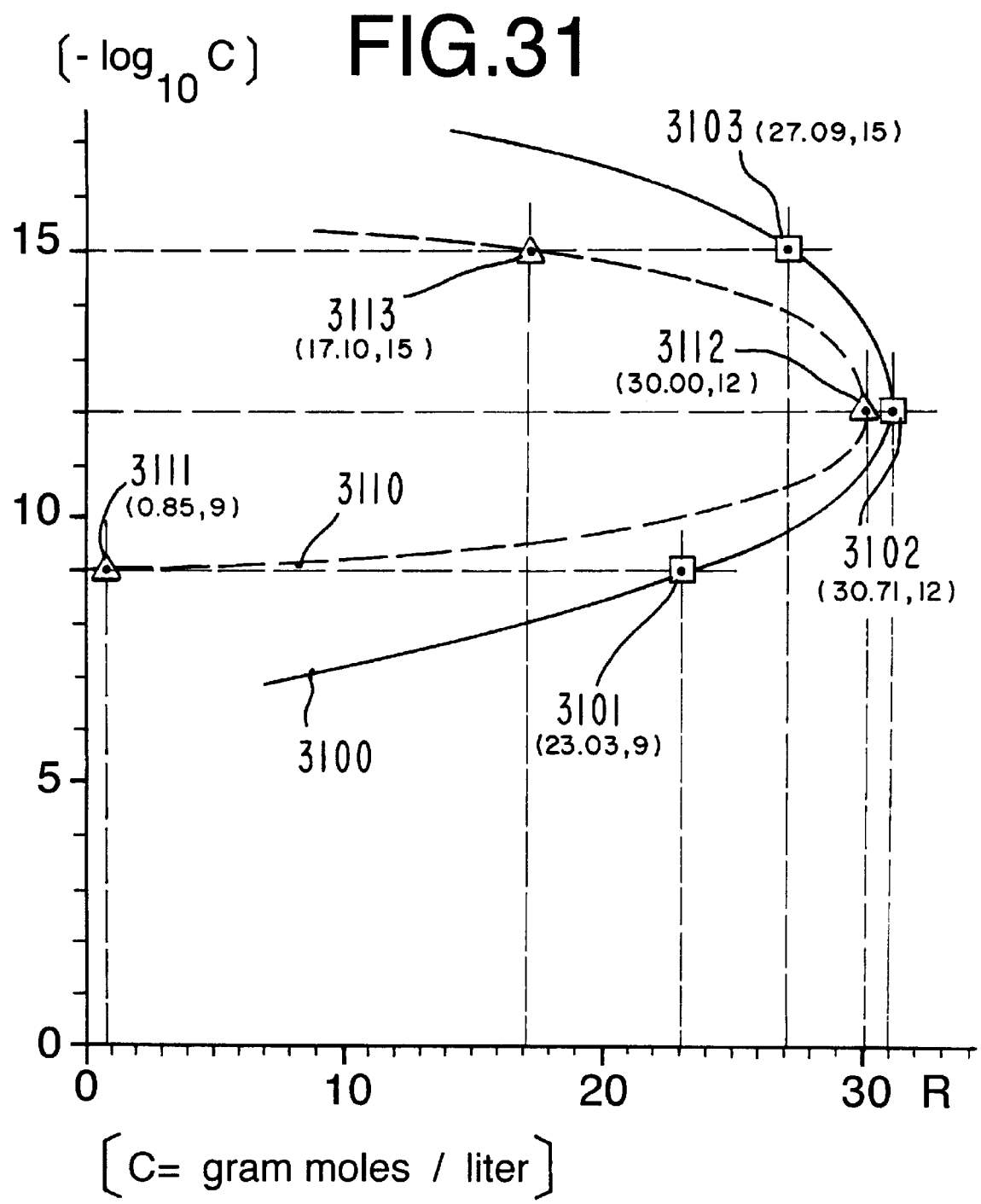

FIG. 31 a pair of "Response as a function of concentration" graphs (mean and median) (parabolic) of:

$[-\log_{10} C]$ on the "Y" axis versus response "R" on the "X" axis with "C" being in gram moles per liter for the substance, a 50:50 mixture of skatole having the structure:

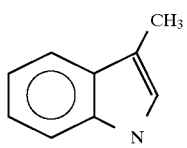

and indole having the structure:

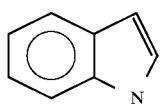

in the flow-through chamber testing apparatus of FIGS. 3 and 3B as against *Penaeus vannamei*.

Figure 32:
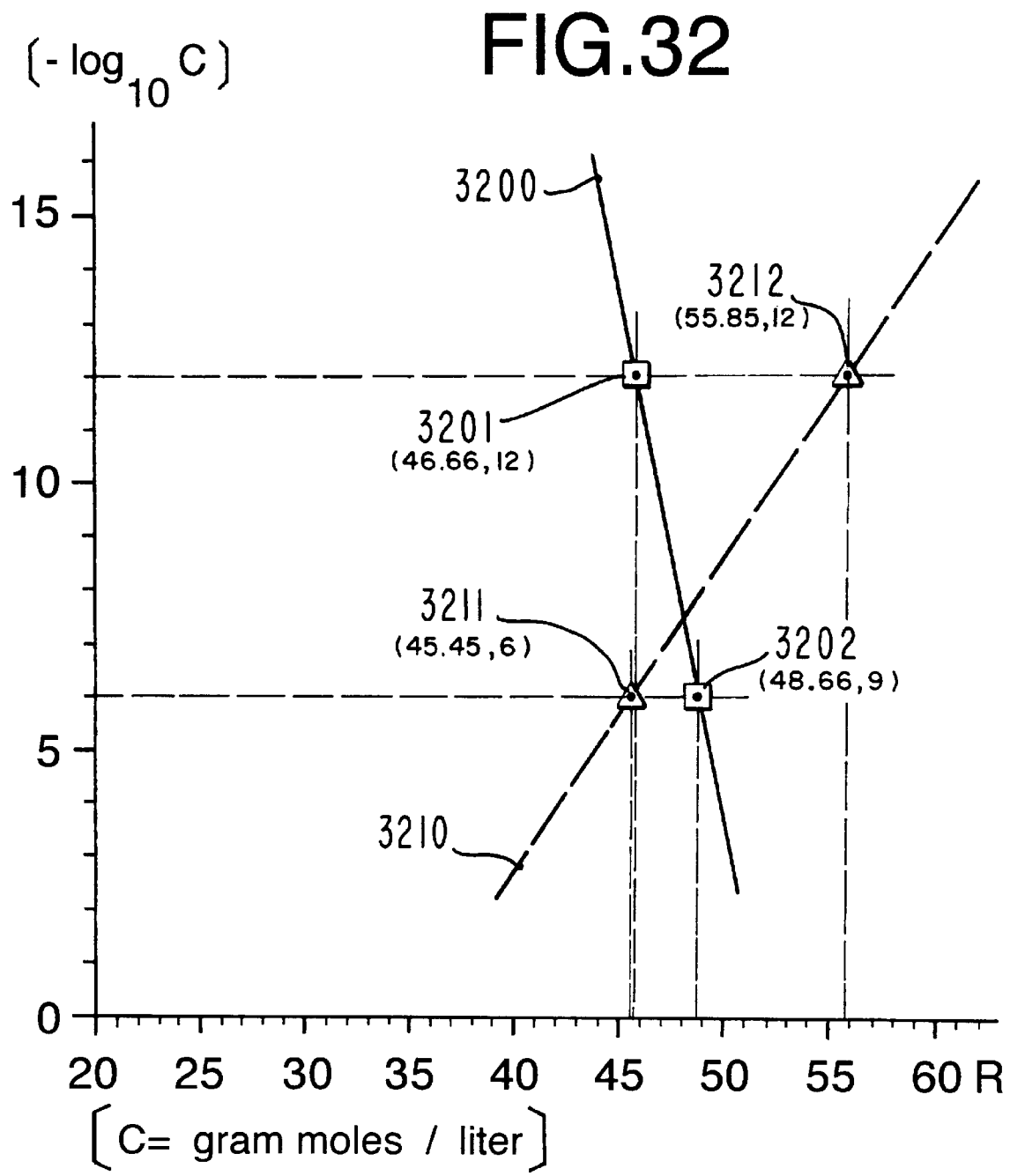

FIG. 32 is a pair of "Response as a function of concentration" graphs (mean and median) (linear) of:

$[-\log_{10} C]$ on the "Y" axis versus response "R" on the "X" axis with "C" being in gram moles per liter for the substance methionine having the structure:

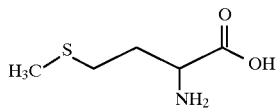

in the flow-through chamber testing apparatus of FIGS. 3 and 3B as against *Penaeus vannamei*.

Figure 33:
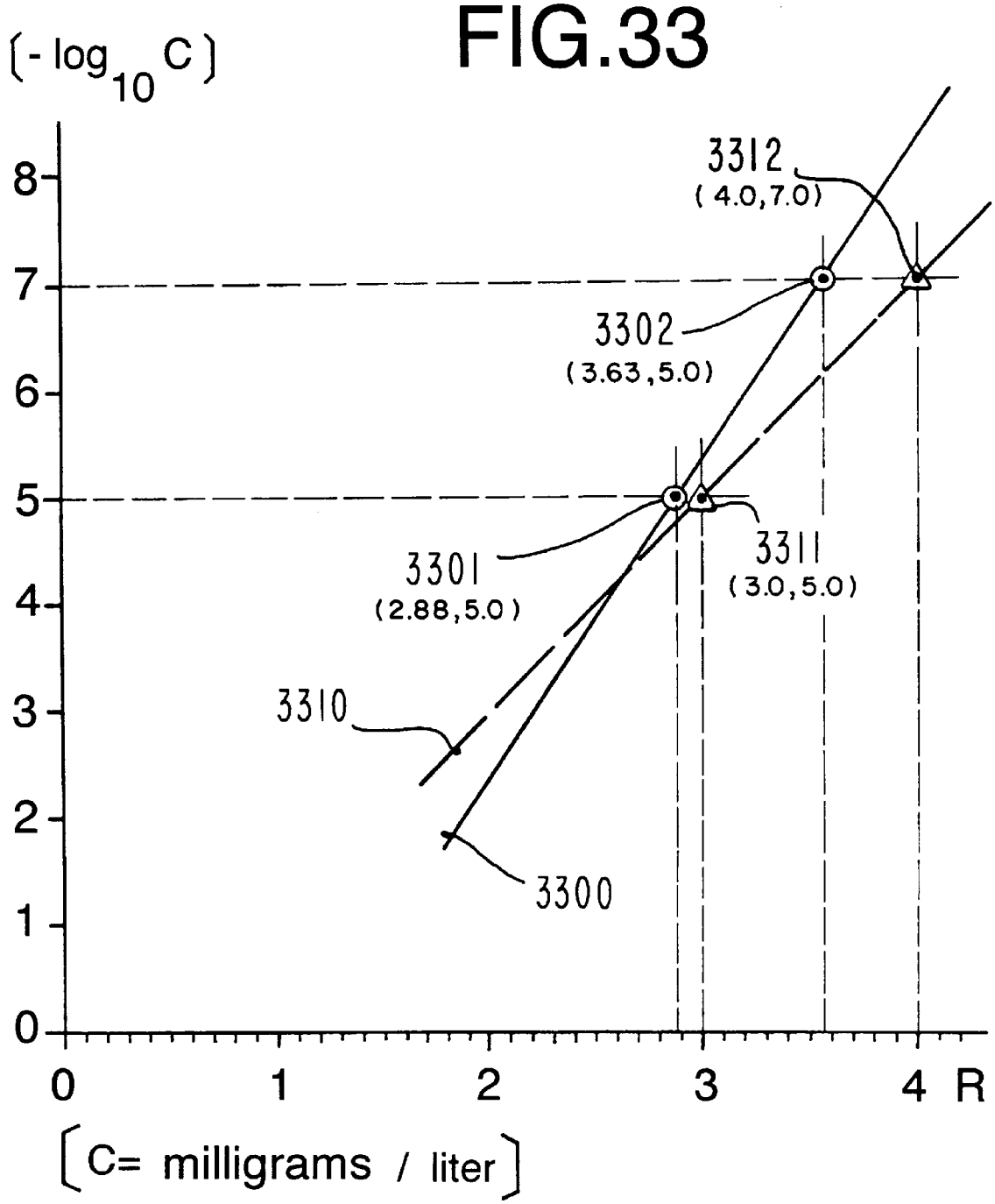

FIG. 33 is a graph of "Response as a function of concentration" (linear) for the mean and median of data in the static tank apparatus of FIG. 2A for yeast extract as against *Penaeus vannamei*.

Figure 34:
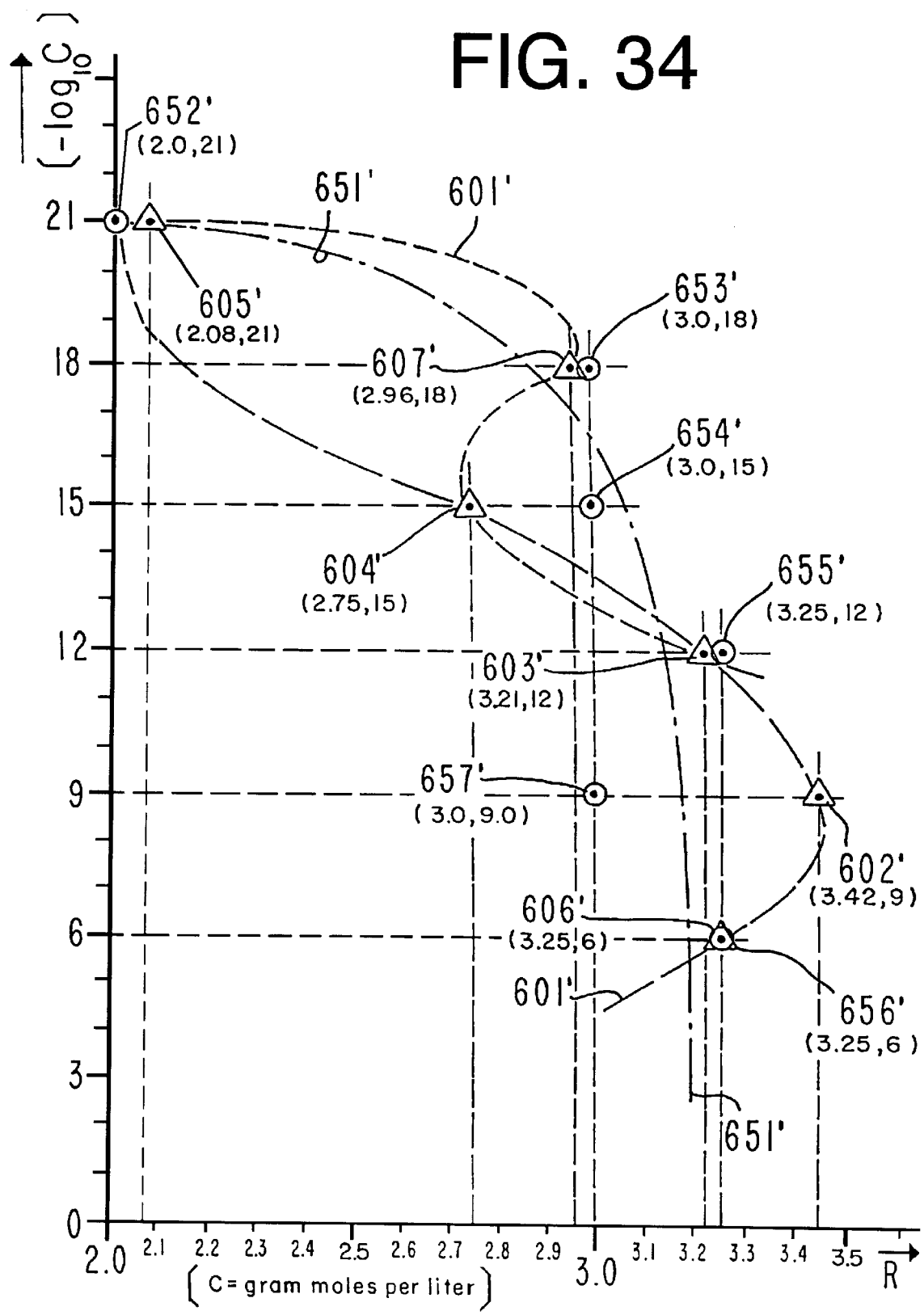

FIG. 34 sets forth two "response as a function of concentration" graphs setting forth data for the response "R" versus:

$[-\log_{10} C]$ with $[-\log_{10} C]$ on the "Y" axis (and "C" being concentration in gram moles per liter) and the response "R" on the "X" axis for the testing of the mixture of compounds having the structures:

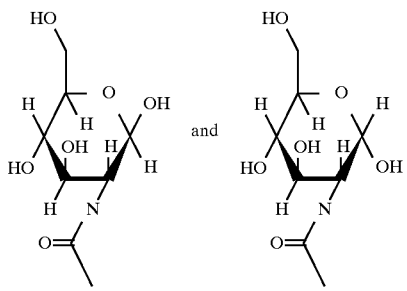

in the static tank testing apparatus (of FIG. 7B) as against the *Procambrus clarkii* (crawfish) species of the Class Crustacea. The graph indicated by reference numeral 601' (a "gamma" function) is for the means of responses "R" versus:

$[-\log_{10} C]$

The graph indicated by reference numeral 651' (a regression curve) is for the medians of responses "R" versus:

$[-\log_{10} C]$

Figure 35:
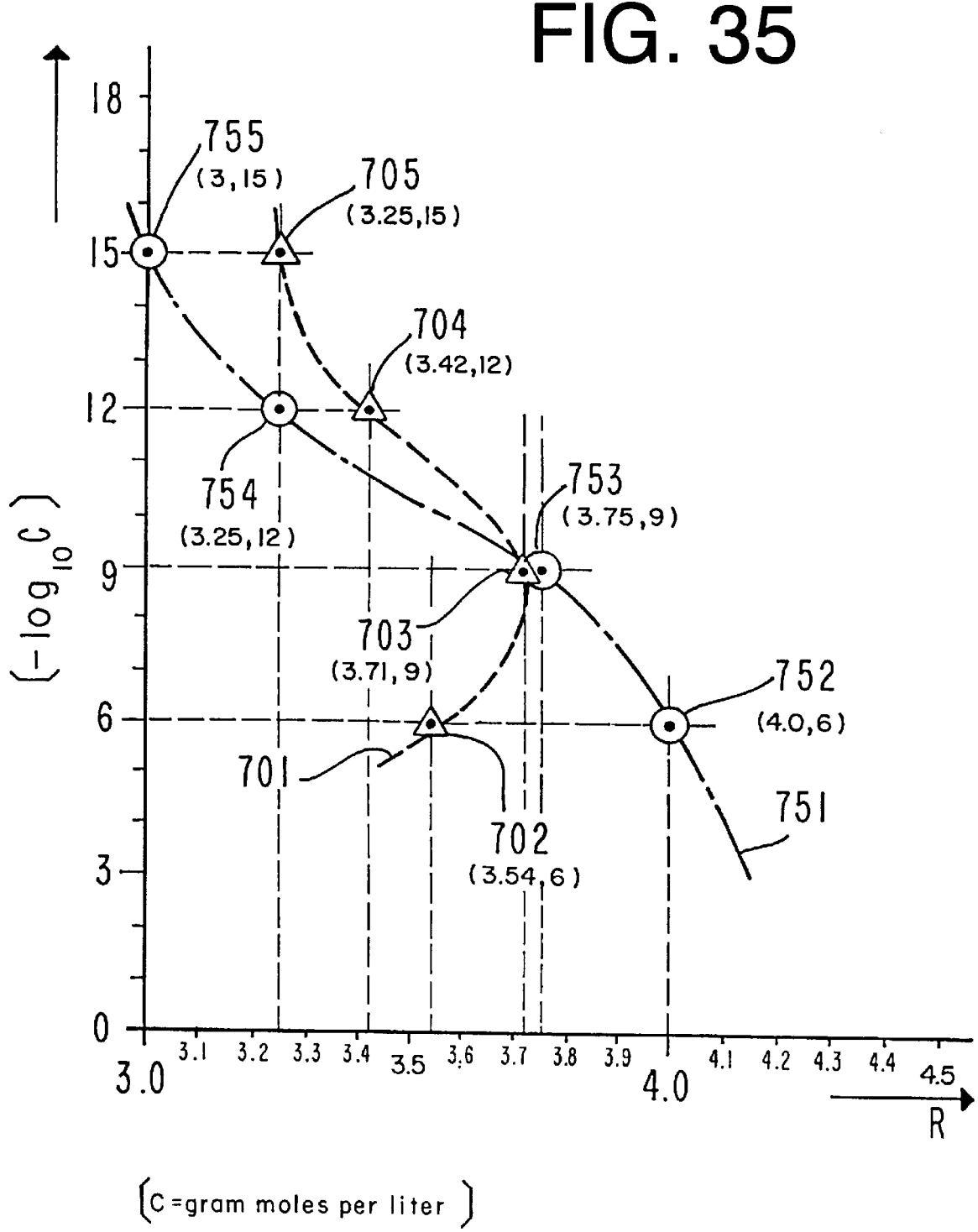

FIG. 35 sets forth two "response as a function of concentration" graphs ("gamma" function and hyperbolic function) of:

$[-\log_{10} C]$ versus response "R", with:

$[-\log_{10} C]$ being on the "Y" axis (and "C" being concentration in gram moles per liter) and "R" being on the "X" axis for the testing of the substance trimethyl amine oxide hydrate having the structure:

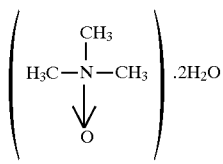

in the static tank testing apparatus of FIG. 7B against *Procambrus clarkii*. The graph indicated by reference numeral 701' (a "gamma" function) is for the means of responses "R" versus:

$[-\log_{10} C]$

The graph indicated by reference numeral 751' (a "hyperbolic" function) is for the medians of responses "R" versus:

$[-\log_{10} C]$.

Figure 36:
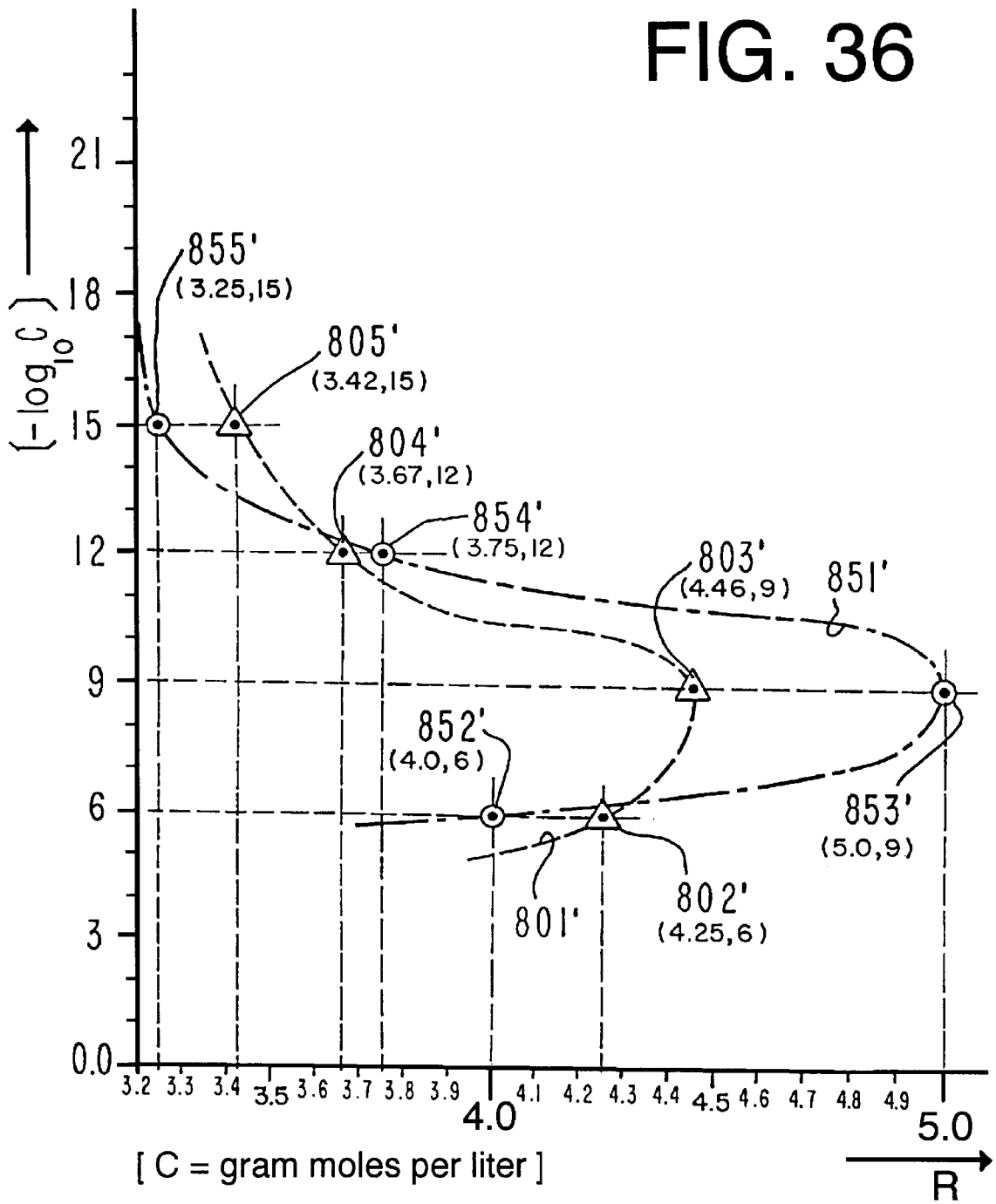

FIG. 36 sets forth "response as a function of concentration" graphs (means of response indicated by reference numeral 801' (a "gamma" function) and medians of response as indicated by reference numeral 851' (also a "gamma" function)) of:

$[-\log_{10} C]$ on the "Y" axis versus response "R" on the "X" axis with "C" being in gram moles per liter for the substance Osceola Brown Sugar, manufactured by Osceola Farms Inc. of Pahokee, Fla. (headspace analysis as trapped on TENAX® as set forth in FIG. 27) in the static tank testing apparatus of FIG. 7B as against the *Procambrus clarkii* species of the Class Crustacea.

FIG. 37 sets forth two "response as a function of concentration" graphs setting forth data for the response "R" versus:

$$[-\log_{10}C] \text{ with } [-\log_{10}C]$$

on the "Y" axis (and "C" being concentration in gram moles per liter) and the response "R" on the "X" axis for the testing of the compound, MOS, having the structure:

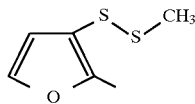

in the static tank testing apparatus of (FIG. 7B) as against the *Procambrus clarkii* (crawfish) species of the Class Crustacea. The graph indicated by reference numeral 3710 (a "gamma" function) is for the means of responses "R" versus:

$$[-\log_{10}C].$$

The graph indicated by reference numeral 3700 (a "gamma" function) is for the median of responses "R" versus:

$$[-\log_{10}C].$$

FIG. 38A is a series of bar graphs summarizing the feeding studies using Diets A, C, J and P for members of the *Penaeus* genus of the Class Crustacea with the given diets being on the "X" axis and the percent weight gain for members of the *Penaeus* genus of the Class Crustacea on the "Y" axis.

FIG. 38B is another series of bar graphs for feeding Diets A, C, J and P for members of the *Penaeus* genus of the Class Crustacea showing average growth over a period of six weeks in grams on the "Y" axis versus the particular diet (A, C, J and P) on the "X" axis.

FIG. 38C is another series of bar graphs showing, for feeding Diets A, C, J and P for members of the *Penaeus* genus of the Class Crustacea, the total number of "hits" over a period of six weeks (on the "Y" axis) versus the particular diet on the "X" axis (that is, Diets A, C, J and P). The number of "hits" is the number of times that the member of the *Penaeus* genus of the Class Crustacea touches the feeding composition during the study period.

Figure 39:
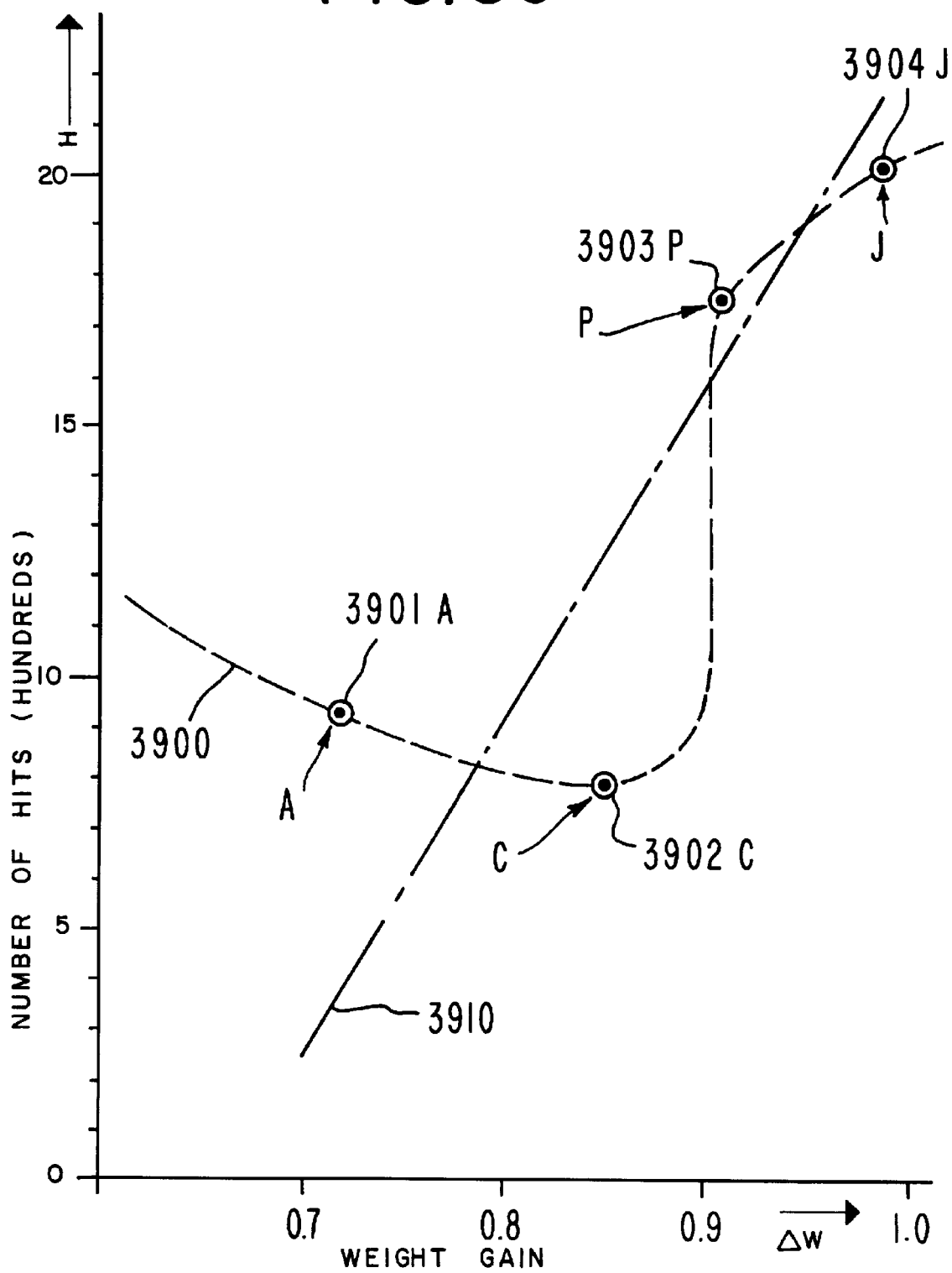

FIG. 39 is a graph showing on the "X" axis the weight gain (ΔW) for members of the *Penaeus* genus of the Class Crustacea versus the number of "hits" (in units of hundreds of hits, H) on the "Y" axis. Two graphs are shown, graph 3900, an "exact fit" curve defined according to the equation:

$$H = \left(\frac{\Delta W - 74}{-7.17}\right)^{1/3} + 2 \sinh 3[\Delta W]$$

and a linear regression line, indicated by reference numeral 3910 defined by equation:

$$H = 66.67(\Delta W) - 44.33.$$

Figure 40:
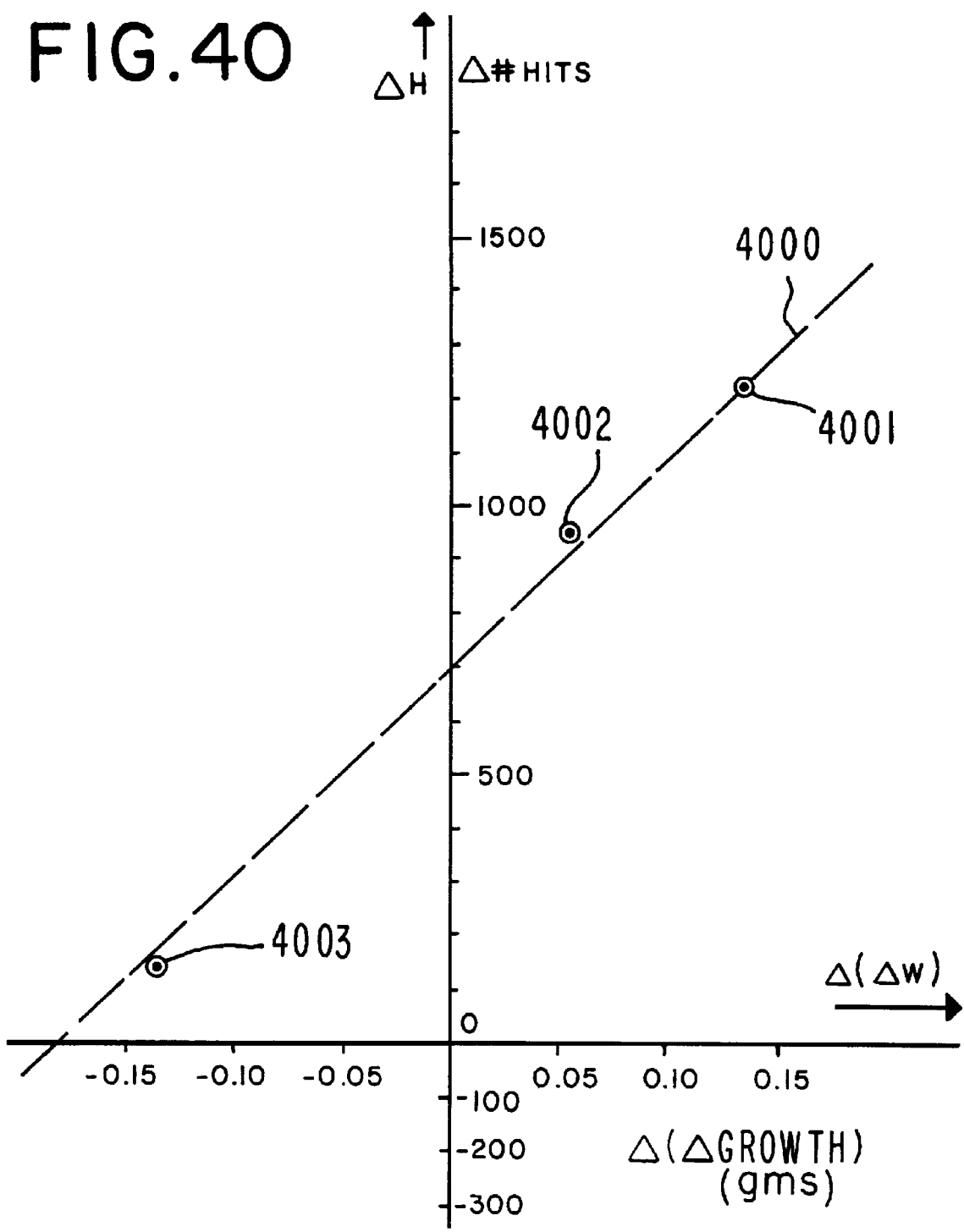

FIG. 40 is a linear regression line for the differences for each of Diets J, P and A with respect to the control Diet C; with differences in growth of the members of the *Penaeus* genus of the Class Crustacea (in grams) on the "X" axis and differences in number of "hits", ΔH, on the "Y" axis, the linear regression line being shown by reference numeral 4000. The symbol for the differences in growth is given by the term: Δ(ΔW). The linear regression line is defined according to the equation:

$$\Delta H = 5333.33(\Delta[\Delta W]) - 180.$$

Figure 41:
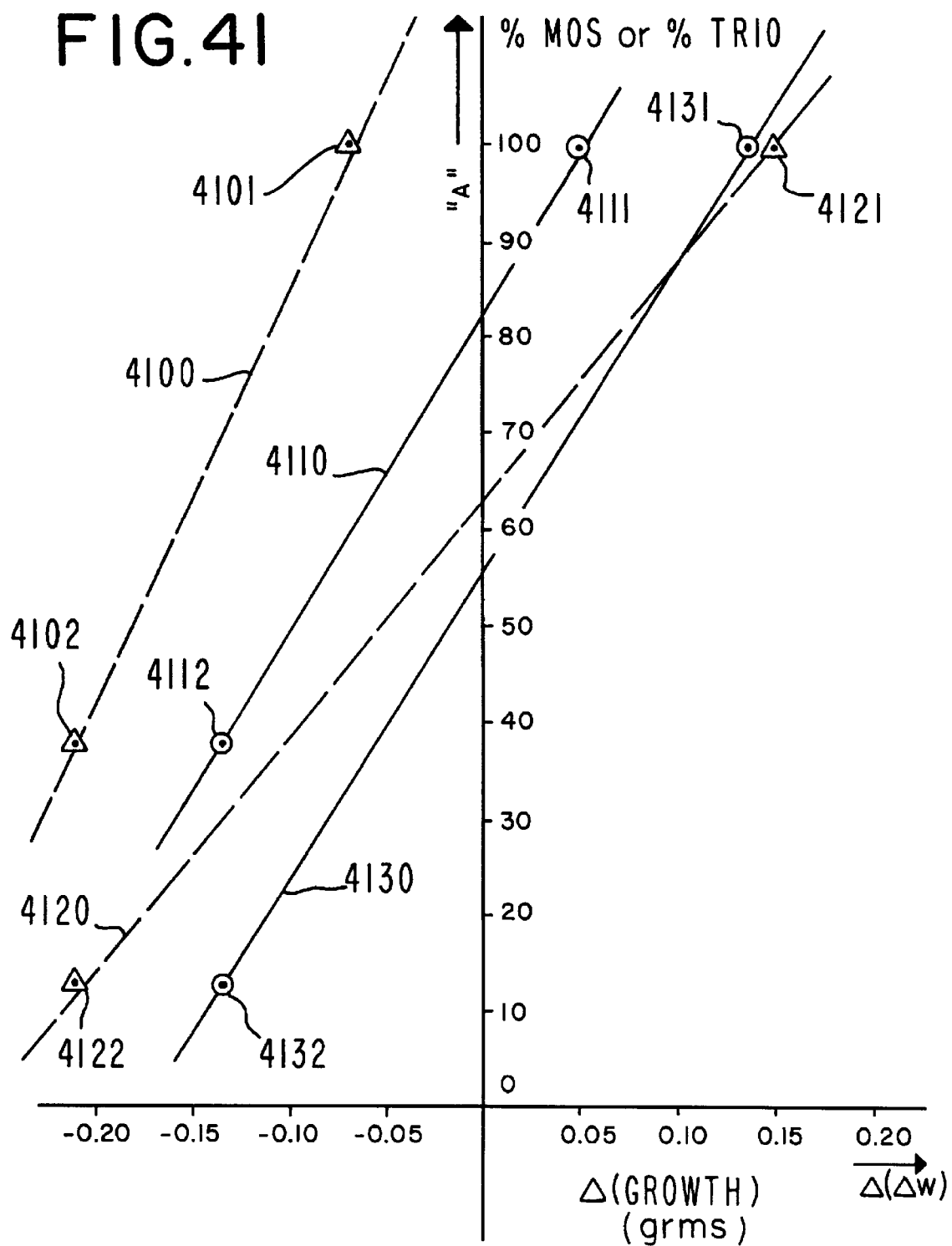

FIG. 41 is a series of graphs showing the difference in the weight growth for Diet J and for Diet P for members of the *Penaeus* genus of the Class Crustacea (*Penaeus aztecus* and *Penaeus vannamei*) (on the "X" axis) versus the percent of "active" on the "Y" axis; "active" being indicated by the letter "A" and the "active" being either Diet J, the compound having the structure:

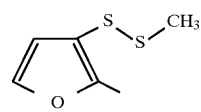

or Diet P, a mixture of the compounds:
(i) N-acetyl-D-Glucosamine;
(ii) dimethyl sulfoxide; and
(iii) methional in equal proportions. The activity of Diet A in the series of graphs is set forth as a result of the fact that Diet A contains lesser quantities of both the compound having the structure:

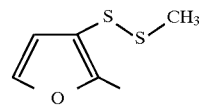

as well as the mixture of compounds:
(i) N-acetyl-D-Glucosamine;
(ii) dimethyl sulfoxide; and
(iii) methional.

The graphs for Diet P are indicated by reference numerals 4100 and 4110. The graphs for Diet J are indicated by reference numeral 4120 and 4130. Graph 4100 (for *Penaeus vannamei*) is defined by the equations:

$$A = (431.03)\Delta(\Delta W) + 132.33$$

and $$\Delta(\Delta W) = \frac{A - 132.33}{431.03}.$$

The graph indicated by reference numeral 4110 (for *Penaeus aztecus*) is defined according to the equation:

$$\Delta(\Delta W) = \frac{A - 83.11}{337.83}.$$

The graph defined according to reference numeral 4120 (for *Penaeus vannamei*; Diet J) is defined according to the equation:

$$\Delta(\Delta W) = \left[\frac{A - 64.53}{236.49}\right].$$

The graph indicated by reference numeral 4130 for *Penaeus aztecus* (using Diet J) is defined according to the equation:

$$\Delta(\Delta W) = \left[ \frac{A - 55.45}{318.18} \right].$$

Figure 42:
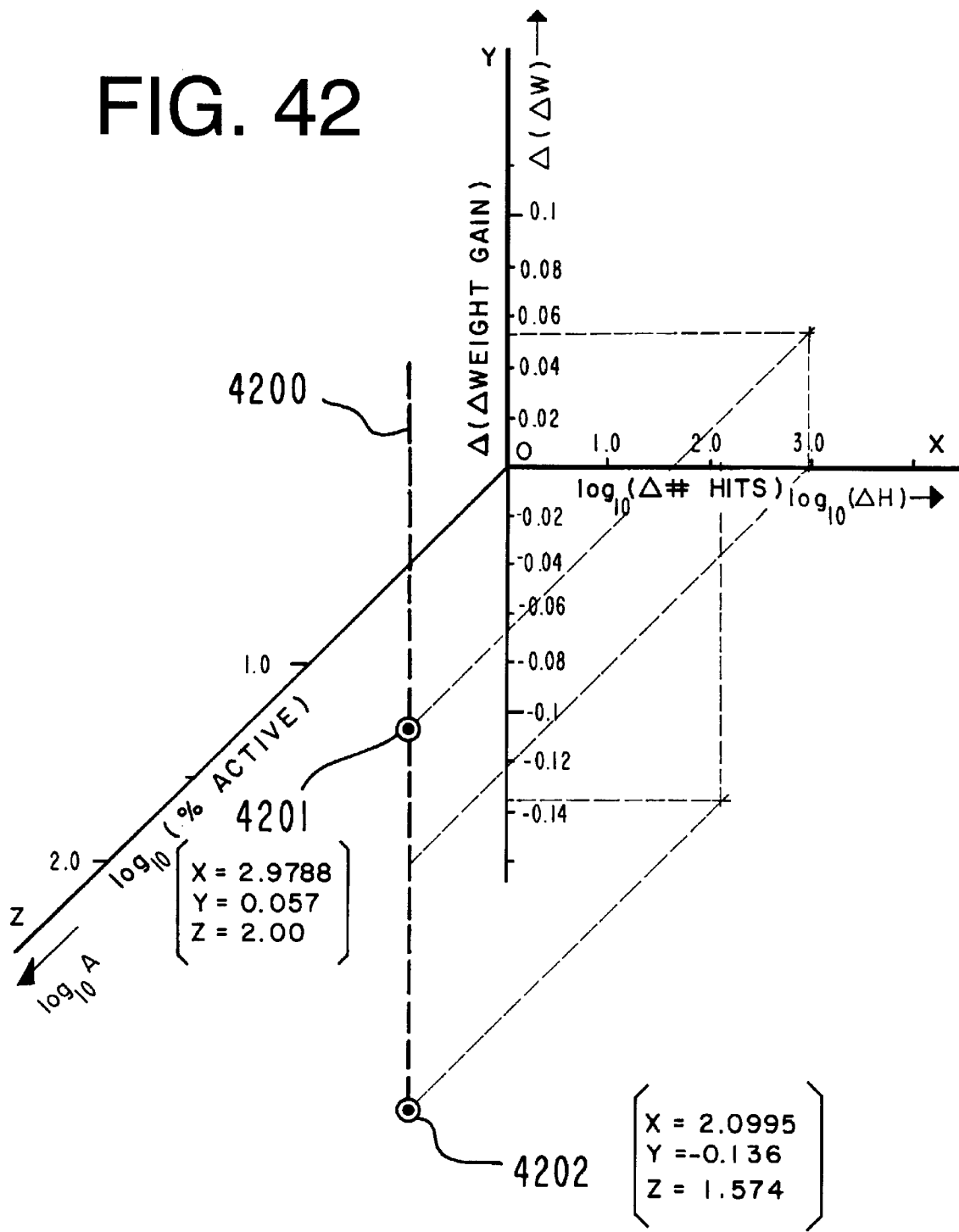
Figure 43:
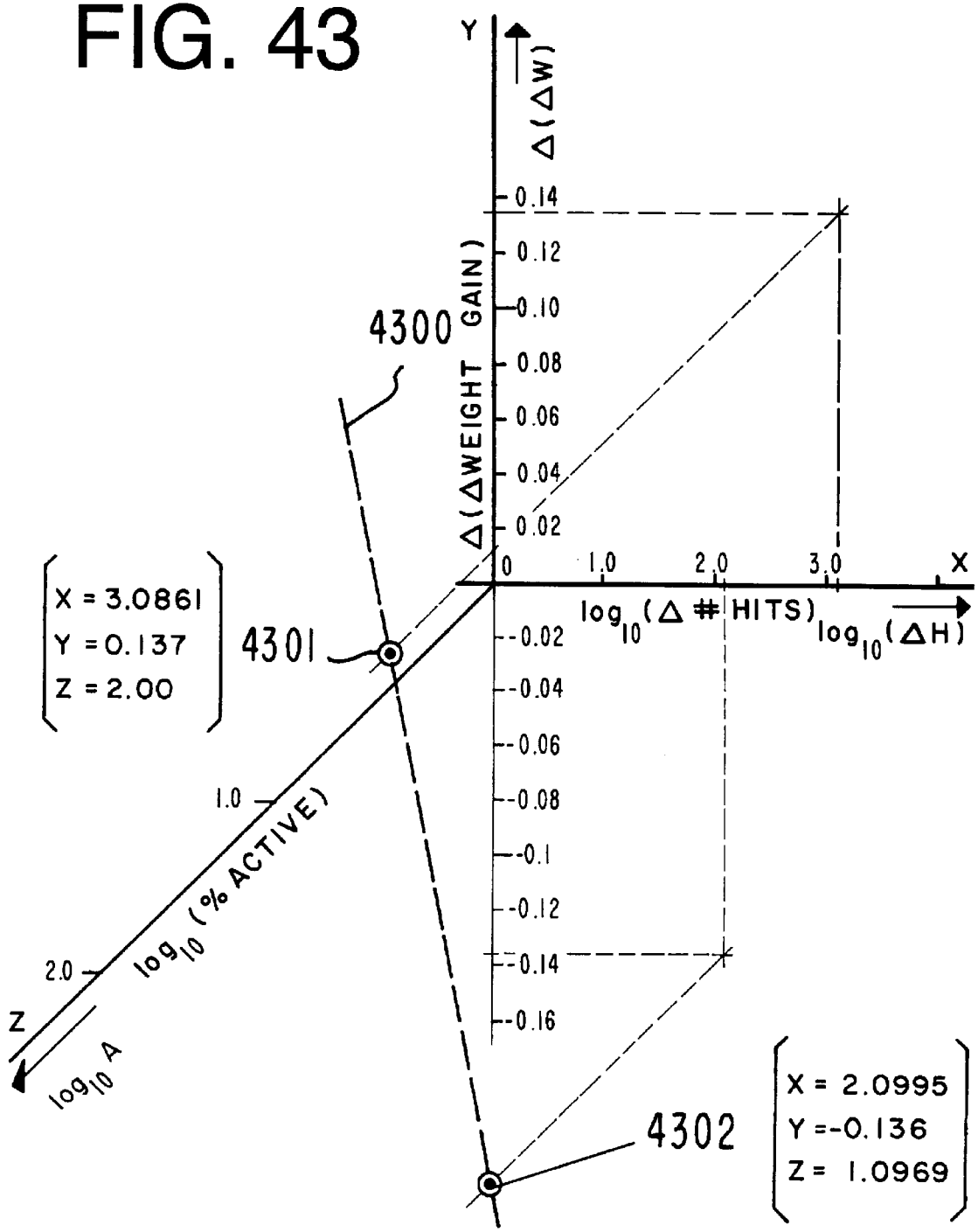

The feeding study results are also summarized in FIGS. 42 and 43.

FIG. 42 is a three-dimensional graph of difference in the weight gain (from control) on the "Y" axis versus $\log_{10}$ (of the change in the number of "hits") (on the "X" axis) versus $\log_{10} A$ ($\log_{10}$[percent active]) on the "Z" axis for Diet P. The graph, indicated by reference numeral 4200, is defined according to the equations:

$$-1.7013[\log_{10}(\Delta H)] + 1.1254[\Delta(\Delta W)] + 3.0019[\log_{10} A] = 1$$

and $$\Delta(\Delta W) = \frac{1 + 1.7013[\log_{10}(\Delta H)] - 3.0019[\log_{10} A]}{1.1254}.$$

FIG. 43 is a graph using the same coordinates as FIG. 42, except that it is for Diet J rather than Diet P. The graph indicated by reference numeral 4300 is defined according to the equation:

$$3.647[\log_{10}(\Delta H)] - 1.636(\Delta[\Delta W]) + 0.345[\log_{10} A] = 10.$$

Figure 44:
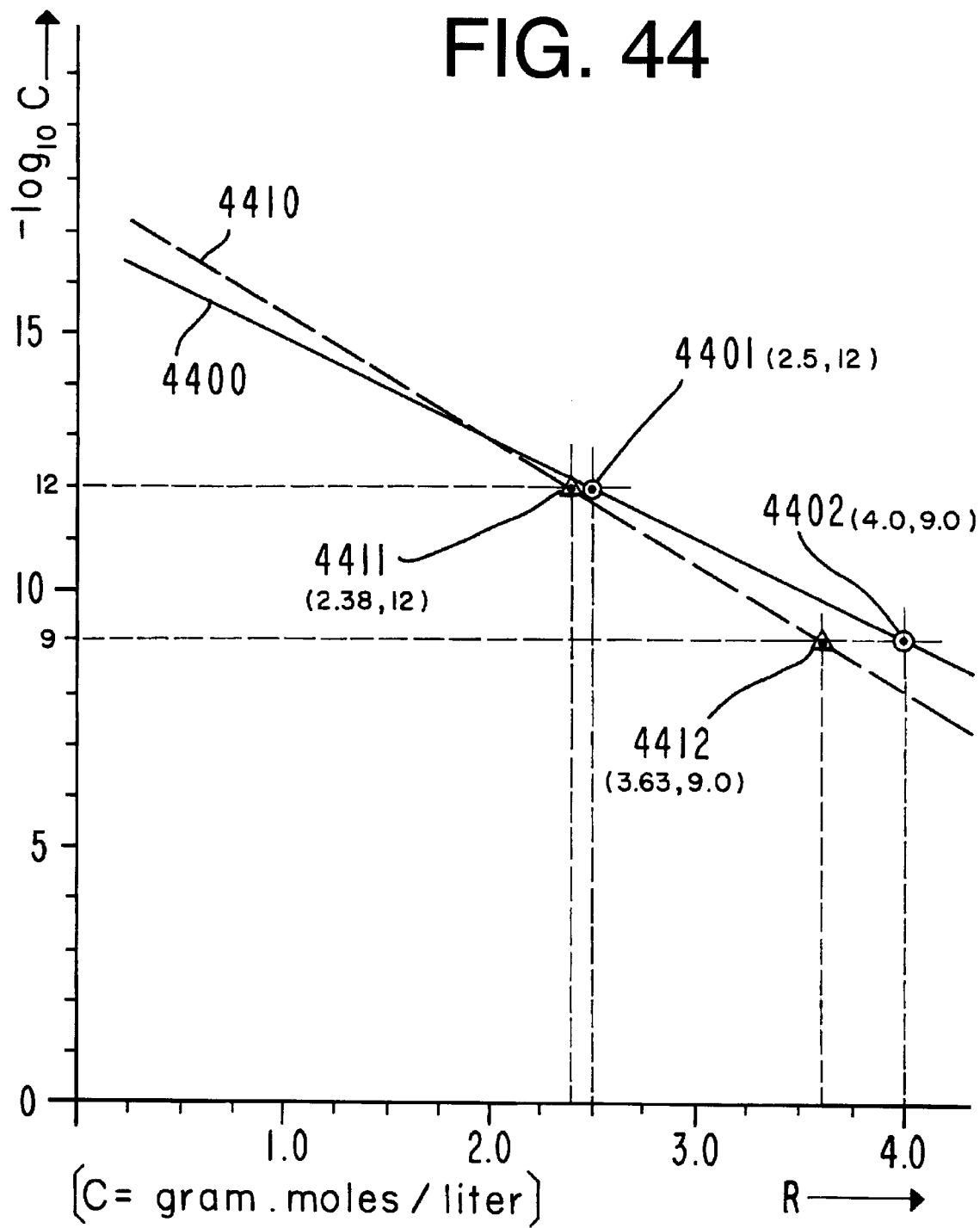

FIG. 44 is a pair of "response as a function of concentration" graphs (straight line) of:

$$[-\log_{10} C]$$

on the "Y" axis versus response "R" on the "X" axis with "C" being in gram moles per liter for the substance "OXYCYCLOTHIONE-030™", having the structure:

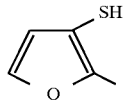

using the static tank apparatus of FIGS. 2, 2A and 7A as against the species *Penaeus vannamei*. The graph indicated by reference numeral 4400 is for the median data points. The graph indicated by reference numeral 4410 is for the mean of the data points. The graph indicated by reference numeral 4400 is defined according to the equation:

$$R = 8.5 + 0.5[\log_{10} C]$$

The graph indicated by reference numeral 4410 is defined according to the equation:

$$R = 7.3792 + 0.4167[\log_{10} C].$$

DETAILED DESCRIPTION OF THE DRAWINGS

FIG. 1A shows a cut-away schematic diagram of *Penaeus vannamei* species. The *Penaeus vannamei* is shown by reference 10. Reference numerals 11a and 11b refer to the antennal flagellum. Reference numeral 12 refers to the antennular medial flagellum. Reference numeral 13 refers to the lateral antennular flagellum. Reference numeral 14 the antennal scale. Reference numeral 15a refers to a dactyl of maxilliped, the maxillipedes being indicated by reference numerals 15c, 15d and 15b. Reference numeral 16 refers to the mandible, maxillule and maxilla. Reference numerals 17e, 17f, 17g, 17h and 17i refer to pereiopods. Reference numerals 17a and 17c refer to dactyls of pereiopods. Reference numerals 17b and 17d refer to the merus of pereiopods. Reference numerals 19a, 19b, 19c, 19d and 19e refer to the pleopods. Reference numerals 20a and 20b refer to uropods. Reference numeral 18 refers to the chamber of the *Penaeus vannamei*.

In the static tank means of FIGS. 2A and 7A, the is the established grade protocol with respect to the *Penaeus vannamei* of FIG. 1A as shown by reference numeral 10:

TABLE II

| Value | Description and Figure Reference Numeral |
|-------|------------------------------------------|
| X (not counted and not made part of calculation) | invalid run |
| 0 | no apparent reaction |
| 1 | sporadic maxilliped beating (reference numerals 15a, 15b and 15c); no antennular activity (reference numeral 13) |
| 2 | regular maxilliped beating (reference numerals 1a, 15b and 15c); no antennular activity (reference numeral 13) |
| 3 | regular maxilliped beating (reference numerals 15a, 15b and 15c); sporadic maxilliped beating (reference numerals 15a, 15b and 15c) |
| 4 | continuous maxilliped beating (reference numerals 15a, 15b and 15c); sporadic maxilliped beating (reference numerals 15a, 15b and 15c) |
| 5 | continuous maxilliped beating (reference numerals 15a, 15b and 15c); extreme antennular activity (reference numeral 13) |

With regard to the order of motion priorities, the following is the liklihood of motion priorities in investigating the *Penaeus vannamei* shown by reference numeral 10 in FIG. 1A:

TABLE III

| Priority | Reference Numerals |
|----------|--------------------|
| 1 | 15 and 16 |
| 2 | 12 and 13 |
| 3 | 17 |

With respect to prioritized order of importance of motion, the following refers to the *Peneaus vannamei* shown by reference numeral 10 on FIG. 1A:

TABLE IV

| Priority | Reference Numerals |
|----------|--------------------|
| 1 | 17 |
| 2 | 15 |
| 3 | 16 |
| 4 | 13 |
| 5 | 12 | referring to the schematic diagrams of the *Procambrus clarkii* species, FIGS. 1B, 1C and 1D, the *Procambrus clarkii* species is shown by reference numeral 100. FIG. 1B shows the scheme of internal organization of the *Procambrus clarkii* species. FIG. 1C shows a ventral view of the *Procambrus clarkii* species. FIG. 1D shows a dorsal view of the *Procambrus clarkii* species. Reference numeral 1' refers to the compound eye; reference numeral 2' refers to the rostrum; reference numeral 3' refers to the carapace of cephalothorax; reference numeral 4' refers to the cervical groove; reference numeral 5' refers to one of several antennules; reference numeral 6' refers to one of two antennae;

reference numeral 7' refers to one of several maxillipeds; reference numeral 7a' refers to the one of several dactyls; reference numeral 8' refers to one of several pereiopods (chelipeds); reference numeral 9' refers to one of several pleopods; reference numeral 10' refers to one of several abdominal somites; reference numeral 11' refers to the telson; and reference numeral 12' refers to one of several uropods.

Reference numerals 13', 14', 15', 16', 17' and 18' refer to the digestive system of the *Procambrus clarkii* species of the Class Crustacea. Reference numeral 13' refers to the mouth of the *Procambrus clarkii* species. Reference numeral 14' refers to the esophagus; reference numeral 15' refers to the cardiac stomach; reference numeral 16' refers to the pyloric stomach; reference numeral 17' refers to the intestine; and reference numeral 18' refers to the digestive gland.

Reference numerals 19', 20' and 21' refer to the excretory system of the *Procambrus clarkii* species of the Class Crustacea. Reference numeral 19' refers to the green gland; reference numeral 20' refers to the bladder; and reference numeral 21' refers to the excretory pore.

Reference numerals 22' and 23' refer to the reproductive system of the *Procambrus clarkii* species of the Class Crustacea Reference numeral 22' refers to the testis; reference numeral 23' refers to the sperm duct.

Reference numerals 24', 25', 26', 27', 28', 29', 30', 31' and 32' refer to the circulatory system of the *Procambrus clarkii* species of the Class Crustacea. Reference numeral 24'refers to the heart; reference numeral 25' refers to the ostium; reference numeral 26' refers to the ophthalmic artery anterior aorta; reference numeral 27' refers to the antennary artery; reference numeral 28' refers to the dorsal abdominal artery; reference numeral 29' refers to the sternal artery; reference numeral 30' refers to the segmental artery; reference numeral 31' refers to the ventral abdominal artery; and reference numeral 32' refers to the ventral thoracic artery.

With respect to the nervous system of the *Procambrus clarkii* species of the Class Crustacea, reference numeral 33' refers to the brain; and reference numeral 34' refers to the ventral nerve cord.

In the static tank means of FIG. 7B, the following is the established grade protocol with respect to the *Procambrus clarkii* species of the Class Crustacea of FIGS. 1B, 1C and 1D as shown by reference numeral 100:

TABLE V

| Value | Description and Figure Reference Numeral |
| --- | --- |
| X (not counted and not made part of calculation) | invalid run |
| 0 | no apparent reaction |
| 1 | sporadic maxillary movement (reference numeral 7'); no antennule activity (reference numeral 5'); and no dactyl movement (reference numeral 7a') |
| 2 | regular maxillary movement (reference numeral 7'); no antennule activity (reference numeral 5'); and no dactyl movement (reference numeral 7a') |
| 3 | regular maxillary movement (reference numeral 7'); sporadic antenule activity (reference numeral 5'); and little or no dactyl movement (reference numeral 7a') |
| 4 | continuous maxillary movement (reference numeral 7'); sporadic antenule activity (reference numeral 5'); and sporadic dactyl movement (reference numeral 7a') |
| 5 | continuous maxillary movement (reference numeral 7'); extreme antennule activity (reference numeral 5'); and regular dactyl movement (reference numeral 7a') |
| 6 | continuous maxillary movement (reference numeral 7'); extreme antennule activity (reference numeral 5'); regular dactyl movement (reference numeral 7a'); and contact between mouthparts and/or chelipeds (reference numeral 8') with chem tube. |

In each of the above descriptions of Table V, the dactyl movement (reference numeral 7a') is defined as the characteristic "picking and feeding" movement described above with the dactyls of the pereiopods (reference numeral 7a') are touched to the bottom and then drawn to the mouth.

The *Procambrus clarkii* species (crawfish) of the Class crustacea possess the characteristic set of crustacean head appendages which include a short pair of antennules (reference numeral 5') and a longer pair of antennae (reference numeral 6' of FIG. 1C). Their third maxilliped (reference numeral 7') is enlarged and in close proximity to the mouth (reference numeral 13'). The *Procambrus clarkii* species of the Class Crustacea has a highly modified, enlarged first pereiopod (reference numeral 8') with a large chelate dactyl called a cheliped.

Thus, for example, in 12 runs of 9 different animals (the *Procambrus clarkii* species of the Class Crustacea) using a comparison of a fresh water blank to Osceola Brown Sugar, the following responses were noted as positive:

(1) flicking of antennules (reference numeral 5' of FIG. 1C). The speed of flicking increased as the chemical was introduced, while the blank runs showed no increase in antennule flicking;

(2) waving of antennules (reference numeral 5') in a dorso-ventral direction;

(3) maxillary movement (reference numeral 7') constant and increased speed during chemical runs;

(4) dacytl movement (reference numeral 7a') in a "grabbing and feeding" manner. Dacytls "pick" at bottom and are then brought to the mouth (reference numeral 13') area. Frequency increased as chemical concentration in the static chamber of FIG. 7B increased and no dactyl movement of this type was seen in the blank runs; and (5) in all chemical runs, animals eventually oriented themselves toward the chemical tube and were seen to move the tube to their mouthparts with the pereiopods (reference numeral 8') and third maxillipeds (reference numeral 7'). When the pump was turned off, stopping the chemical flow, the tube was released after approximately one minute (the tube is indicated in FIG. 7B as tube 204b).

Thus referring to the apparatus of FIG. 7B, the static testing system, the static tank system is shown by reference numeral 200. Reference numeral 201 refers to the video monitor. Reference numeral 203 is the vessel holding testing solution 202. Testing solution 202 is pumped through line 204a using peristaltic multihead pump 206 controlled by device 205, pumping solution 202 into tank 208. Tank 208 contains liquid 212 in which the *Procambrus clarkii* species of the Class Crustacea is at rest on the bottom of the tank, which bottom is indicated by reference numeral 214 which may be entirely composed of a clear plastic or glass so that the video camera or camcorder 210 may be focused on the movement of the member of the *Procambrus clarkii* species of the Class Crustacea 100 utilizing the fluorescent light-generating device 211. Tank 208 is mounted on stand 209 which surrounds the video camera or camcorder 210 directed towards the tank 208. The surface of the liquid 212 is shown by reference numeral 213

An example of the light apparatus 211 is a Flexo Heavy-Duty Adjustable Lamp made by Art Specialty Company holding two 18" fluorescent tubes. The tubes are manufactured by the General Electric Company of Schenectady, N.Y. The following specifications for the tubes used are an example of what can be used in the operation of the apparatus of FIG. 7B:

GE Catalog No. F15T8/CW;

18" Cool White fluorescent tube;

15 Watt;

Rated life of 7,500 hours;

Initial lumens=825;

Mean lumens=725;

Kelvin temperature=4,150; and

CRI rating of 62.

The peristaltic pumps utilizable are those, for example, identified as MASTERFLEX® L/S manufactured by the Cole-Parmer Instrument Company of 7425 North Oak Park Avenue, Chicago, Ill. 60648 (MASTERFLEX® being a trademark owned by Cole-Parmer Instrument Company). The pump head is a standard pump head. An example of the MASTERFLEX® tubing utilized with the MASTERFLEX® tubing pump (peristaltic pump) is C-FLEX®06424 (trademark of Cole-Parmer Instrument Company), a styrene-ethylene-butylene modified block copolymer.

Referring to FIG. 7D, the flow-through vessel testing apparatus which can also be used in testing substances with respect to attraction of the *Procambrus clarkii* species of the Class Crustacea, fluid to be tested 302 is contained in container 303 and pumped through tube 304a using pump 306b and then through tube 304b into location 325 and then into vessel 350. Vessel 350 contains the *Procambrus clarkii* species of the Class Crustacea 10' and 10" located in the flowing liquid 312. Meanwhile, the liquid 312 is circulating by means of pump 306a through line 324a and then through 324b into tube 326a and fitting 331a where it joins with the feeding fluid (test material) at 325. The combined liquids having ever-increasing concentration of material from vessel 303 travels through holding vessel 350 into exit tube 331b past fitting 329 into tube 326b where, again, it is recirculated. The exit portion of the flow-through tank is 351b and the entrance portion is 351a.

The *Procambrus clarkii* animal is placed in section 351b to acclimate with only saline water 312 circulating. The experiment is started by adding liquid (302) to the liquid 312 and removing the barrier 330. The motion of the *Procambrus clarkii* animal 100 from position 10" to 10' is monitored by video camera or camcorder 310 and displayed on display device 301.

Meanwhile, the motions of the member of the Procambrus clarkii species of the Class Crustacea 10' and 10" is recorded using video camera or camcorder 310 shown on monitor 301. Simultaneously, light source 311 directs light into flow-through vessel 350. The side of the flow-through vessel has a clear plate through which camera 310 has a direction of vision. Screen 330 is held in place at 335. Screen 330 divides the flow-through tank between sections 351a, the entrance section and 351b, the exit section.

Additional testing fluid enters through tube 304b and enters the elbow, mixing with fluid from 326a at 331a. Fitting 326a is threaded into elbow 325 at 329. Fluid exits entering elbow 331b. Fitting 326b is threaded into the elbow at 329.

Referring to the apparatus of FIG. 2A, the static tank testing system, the static tank system is shown by reference numeral 200. Reference numeral 201 refers to the video monitor. Reference numeral 203 is the vessel holding testing solution 202. Testing solution 202 is pumped through line 204a using peristaltic multihead pump 206 controlled by device 205 pumping solution 202 into tank 208. Tank 208 contains liquid 212 in which *Peneaus vannamei* or one of the members of the *Penaeus* genus of the Class Crustacea is at rest on the bottom of the tank which bottom is indicated by reference numeral 214 which may be entirely composed of a clear plastic or glass so that video camera or camcorder 210 may be focused on the movement of the member of the *Penaeus* genus of the Class Crustacea 10 utilizing the fluorescent light generating device 211. Tank 208 is mounted on stand 209 which surrounds the video camera or camcorder 210 directed towards the tank 208. The surface of the liquid 212 is shown by reference numeral 213. FIG. 7A is a perspective view of the apparatus of FIG. 2A with each of the reference numerals of FIG. 2A repeated.

An example of the light apparatus 211 is a Flexo Heavy-Duty Adjustable Lamp made by Art Specialty Company holding two 18" fluorescent tubes. The tubes are manufactured by the General Electric Company of Schenectady, N.Y. The following specifications for the tubes used are an example of what can be used in the operation of the apparatus of FIGS. 2A and 7A:

GE Catalog No. F15T8/CW;

18" Cool White fluorescent tube;

15 Watt;

Rated life of 7,500 hours;

Initial lumens=825;

Mean lumens=725;

Kelvin temperature=4,150; and

CRI rating of 62.

The peristaltic pumps utilizable are those, for example, identified as MASTERFLEX® L/S manufactured by the Cole-Parmer Instrument Company of 7425 North Oak Park Avenue, Chicago, Ill. 60648 (MASTERFLEX® being a trademark owned by Cole-Parmer Instrument Company). The pump head is a standard pump head. An example of the MASTERFLEX® tubing utilized with the MASTERFLEX® tubing pump (peristaltic pump) is C-FLEX® 06424 (trademark of Cole-Parmer Instrument Company), a styrene-ethylene-butylene modified block copolymer.

Referring to FIG. 3, the flow-through vessel testing apparatus, fluid to be tested 302 is contained in container 303 and pumped through tube 304a using pump 306b and then through tube 304b into location 325 and then into vessel 350. Vessel 350 contains the member of the *Penaeus* genus of the Class Crustacea 10'and 10" located in the flowing liquid 312. Meanwhile, the liquid 312 is circulating by means of pump 306a through line 324a and then through 324b into tube 326a and fitting 331a where it joins with the feeding fluid (test material) at 325. The combined liquids having ever-increasing concentration of material from vessel 303 travels through holding vessel 350 into exit tube 331b past fitting 329 into tube 326b where again it is recirculated. The exit portion of the flow-through tank is 351b and the entrance portion is 351a.

The *Peneaus vannamei* is placed in section 351*b* to acclimate with only saline water 312 circulating. The experiment is started by adding liquid (302) to the liquid 312 and removing the barrier 330. The motion of *Penaeus vannamei* 10 from position 10″ to 10′ is monitored by 310 and displayed on 301.

Meanwhile, the motions of the member of the Penaeus genus of the Class Crustacea 10′ and 10″ is recorded using video camera or camcorder 310 shown on monitor 301. Simultaneously, light source 311 directs light into flow-through vessel 350. The side of the flow-through vessel has a clear plate through which camera 310 has a direction of vision. Screen 330 is held in place at 335. Screen 330 divides the flow-through tank between sections 351*a*, the entrance section and 351*b*, the exit section. As shown in FIGS. 3A, 3B and 3C, fluid entering the flow-through holding tank 350 enters from tube 352*a* and exits from tube 352*b*. Additional testing fluid enters through tube 304*b* and enters the elbow mixing with fluid from 326*a* at 331*a*. Fitting 326*a* is threaded into elbow 325 at 329. Fluid exits at 352*b* entering elbow 331*b*. Fitting 326*b* is threaded into the elbow at 329.

Referring to FIG. 4, FIG. 4 shows a side elevation view partially cut-away of apparatus showing in detail the variable focus/focal length video camera or camcorder, camera platform and shield used with the light in conjunction with the test chamber. Chamber 408 could be a flow-through chamber containing fluid 412 therein. Light source 411 emits visible wavelength radiation into the tank 408 and into the fluid 412 simultaneously with the action of video camera 410 strapped to platform 414 with bungee cord 421. Video camera 410 is mounted on a height adjuster 452 having a movable height adjustment screw 413 and imbedded ball bearings 430 at a solid surface indicated by 415. The camera is mounted so that the lens, lens shield 470 and the liquid 412 are on a direct visual line as a result of an orifice being in supporting frame 419 and another orifice indicated by reference numeral 418 being in shield 417. Supporting frame 419 and the camera lens are shielded by cloth 420 which prevents the member of the *Penaeus* genus of the Class Crustacea 10 from being distracted by the movement of the video camera. Thus, camera 410 may be adjusted laterally and vertically, the vertical angle adjustment coming through the use of adjustment screw 413 and the lateral travel coming through the travel using bearings 430 on the solid travel surface or lamina 415.

FIG. 4A is a detailed section of the shield 417 having attached thereto a supporting frame guide 422 at an angle preferably of 45° to the shield 417. 418 indicates the orifice mentioned in the detailed description of FIG. 4. FIG. 4B is a front view of the frame of FIG. 4A showing the orifice 418 and the supporting frame guide 422 and the vertical part of the frame 417. FIG. 4C is another side elevation view of the camera platform showing via hidden lines the adjustable camera mount platform 452 and the hinge to which the adjustable mount 452 is connected to the frame, the hinge being indicated by reference numeral 450.

FIG. 4D is the front view of the camera platform looking in the direction of the camera from the flow-through tank. The cloth cover 420 is connected via a frame 419 to a main cover 417. The orifice in the cloth 420 is indicated by reference numeral 418*a*, through which is placed lens shield 470 of video camera or camcorder 410.

FIG. 4E is a top view of the camera platform showing the adjustable platform 452 and the adjustable screw 413 with hinges 450 and showing the location of the inner frame 419.

FIG. 4F is a cut-away side elevation view showing, in detail, the adjustable platform 452 and the adjustable screw 413 with hinges 450 and showing the location of inner frame 419.

FIG. 5A is a top cut-away view of a Y-maze apparatus for testing chemo-attractancy of a substance. The Y-maze apparatus is indicated in general by reference numeral 500. The member of the *Penaeus* genus of the Class Crustacea 10 may or may not be attracted to an attractant or it may or may not be excited by an excitant. In any event, the feed line inflow fittings 560 are located at the end of the Y-maze 509*a* and 509*b*.

Thus, the test section of the Y-maze is indicated by 509*a* and the control section is indicated by 509*b* or vice versa (these two sections can be reversed by changing the chemical feed lines as shown in FIG. 5G and discussed in detail, infra). Both sections join at 540 with a joining wall 543.

The "control section" and the "testing substance input section" (also indicated by the letters "A" and "B" which can be interchanged) are at an angle "alpha" from one another, alpha being 5°–45°, preferably 10°. These sections as stated, supra, are interchangeable. The vertex of the angle is at reference numeral 540. An optional feeding station also exists in the Y-maze test section and is indicated by reference numeral 596 and in the control section at 597. Baffle plates 501*a*, 501*b*, 501*c* and 501*d* (also called "flow screens") are located close to the end 509*a* and 509*b* close to the inflow fitting 560 coming from the feed fluid peristaltic pump. The testing section is indicated overall by reference numeral 520 or 521 and the control section is indicated overall by reference numeral 520 or 521 since the two sections can be reversed by changing the chemical feed lines as shown in the detailed description of FIG. 5G, infra. The feeding section and the control section are separated by a removable screen 503 from the main section of the Y-maze 522 in which the member of the Penaeus genus of the Class Crustacea 10 is located. The sides of the main section 522 are indicated by reference numerals 508*a* and 508*b*. The back end of the Y-maze 522 which is in the shape of a rectangular parallelepiped contains two drain lines 562*a* and 562*b* and a flush port 561, the back section being indicated by reference numeral 526. A baffle between the back section 526 and the main section of the Y-maze 522 is indicated by reference numeral 590. The flow of liquid travels through portal 570 underneath perforated wall 590 and around baffle 524 to the drain. The fluid level is also shown in the side view in FIG. 5B and is indicated by reference numeral 513.

FIGS. 5E and 5F show yet another embodiment of the Y-maze apparatus test tank of our invention. In this case, the baffle 590 is replaced by a curved perforated wall 590*a*. The embodiments of FIGS. 5C and 5D are indicated, overall, by reference numeral 510.

FIGS. 5C and 5D show yet another embodiment of the Y-maze apparatus of our invention, indicated by reference numeral 520. In this case, the perforated walls 590 and 590*a* are replaced by perforated walls 591*a* and 592*a* which contains perforated gate 593 which is removable. Fluid moves past the screen 593 and through weir 524 in exiting from the Y-maze.

FIG. 5G is a schematic diagram of the use of the Y-maze which is indicated by reference numeral 500 and which can be any of the Y-mazes as illustrated in FIGS. 5A, 5B, 5C, 5D, 5E or 5F.

The operation of the Y-maze is in two phases, phase I and phase II. In phase I, the "preparation" and "acclimation" phase, water is recirculated and no chemicals are tested. The test procedure is in phase II. In phase I, fluid passes through 572*a* and 572*b* through line 572 into recirculation bucket 571 and then through valve 574 which is open (valve 577 is closed for phase I). The fluid is then pumped using pump 578 through line 579 (pump 578 being also indicated as pump C). The fluid then travels through lines 579a and 579b into sections "A" and "B" of the Y-maze, through lines 660a and 660b and through openings 509a and 509b and lines 560a and 560b. During this procedure, valves 662 and 673 are closed.

In phase II, solution is pumped from either tank 666 (the liquid being indicated as 667) or liquid 668 is pumped from an alternative tank. The liquids being control or test liquids. Quick connect nipples 672a and 672b are interchangeable; and quick connect nipples 675a and 675b are also interchangeable, physically. Thus, either fluid is pumped through line 671b or is pumped through line 671a and fluid is either pumped through line 663a or line 663b. In phase II, valve 577 is open and valve 574 is closed.

New water 575 is pumped through line 576 past valve 577 using pump C, pump 578 through lines 579a and 579b. Then, pump B, pump 670 pumps liquid 668 through line 669 either into line 671b or 671a depending on which line is connected using the quick connect nipples 672a and 672b. In any event, the fluid is pumped past valve 673 through line 660b. By the same token, liquid A from tank 666, the liquid being also shown by reference numeral 667 is pumped through line 665 and then either through line 663b or line 663a depending on whether the lines are connected using quick connect nipple 675b or 675a. In any event, the fluid is pumped past valve 662 through line 660 past fitting 560a into section "A" of the Y-maze, the operation of which is described, supra. The liquid 667 is pumped using pump A, pump 664. Pumps A, B and C, that is pump 664, pump 670 and pump 578 are driven by pump drives 676.

FIG. 6A sets forth a Y-maze built particularly for starfish of the prior art (Castilla, *Marine Biology*, Volume 12, pages 222–228 (1972) "Responses of *Asterias rubens* to Bivalve Prey in a Y-maze". The apparatus indicated by reference numeral 600 is the prior art Y-maze apparatus of the Castilla article shown on page 222 thereof.

Referring to FIG. 6B, FIG. 6B sets forth a schematic block flow diagram for the production of Osceola Brown Sugar, produced by Osceola Farms, Inc. of Pahokee, Fla. (the headspace analysis for the Osceola Brown Sugar is set forth in FIG. 27). A cane sugar tipper 401 feeds sugarcane onto a cane feed table 402 whereupon the cane is carried on cane carrier 403 into cane knives 404. The resulting product is carried on cane carrier 405 through heavy duty cane knives and through a shredder 408 into magnetic tramp iron separator 407. The resulting product passes through juice screen 410. The unscreened material, unscreened mixed juice, is passed through the unscreened mixed juice tank and pump 411. The screened material passes through screened juice tank and pumps 409 into juice scale 449. The unscreened material is passed through pressure fed mills 412 and through imbibition juice tank and pump 415. Simultaneously, imbibition water flows out of tube 413. Simultaneously, exhaust steam from the mills and from the shredder 414 is passed through make up station 432 and turbonator sets 418. Boilers 422 are used to process bagasse coming from the bagasse conveying system 419 through bagacillo screen 420, using the deaerater feed tank and pumps 421. Vapor bleed to vacuum pans and heaters is shown by reference numeral 423 with overhead evaporated water 424 being condensed using condenser 425. Condensate from the tanks is collected at 426 and syrup is received at syrup receiver and pumps 427. Syrup is pumped through the syrup clarifier 428 and sediment is collected at 429. Clarified syrup is pumped through line 430 into vacuum pan supply tanks 484.

Simultaneously, lime from source 453 is passed through lime slaker 452 and screened at 451. Milk of lime tanks and pumps 450 passes the resulting product into juice liming tanks 447 where the cane sugar juice is placed from juice heater 448. That juice is passed from juice scale 449. The resulting material is placed into S.R.I. clarifier 442 equipped with flash tank 446. The resulting clarified juice is passed through tank and pumps 443 and then into FS clarified juice heater 434 where it is passed into the vacuum pans and heaters 423. Mud mixer and pump 440 collect sediment from the clarifier 442 and the resulting pump passes material into rotary vacuum filter 438 yielding filtrate from pumps 439 into filtrate receivers 437. Overhead condensate is collected at 435. The condensate is passed through vacuum pump 433.

The Osceola Brown Sugar is obtained from the receiver 482 which is hooked up with magma mixer and pump 479 which receives material from continuous centrifugal pumps 478, which in turn receives material from massecuite receiver and pump apparatus 476, which in turn receives material from continuous pan 475 equipped with condenser 473 and overhead water take-off 474. Simultaneously, the seed receiver and pump 485 is pumping material into continuous pan 487 equipped with condenser 488 and water take-off 489. The seed receiver and pump receives material from a seed pan 483 attached to vacuum pan supply tanks 484. The Osceola Brown Sugar received at 482 is received from magma receiver 482 through line 481 hooked up with magma mixer and pump 479. The clarified syrup tank and pumps 430 passes syrup from 430 into the vacuum pan supply tanks 484. Molasses coming from line 454 is stored and that molasses coming from line 454 evolves from the molasses scale and pumps 455 which evolves from molasses run-off tank and pump 457 attached to continuous centrifical pumps 456 working with reheater 459 and meter and pump 458. The reheater 459 is worked continuously with the continuous vertical crystalizers 460 which is hooked up with massecuite receiver and pump 466 associated with continuous pan 463 having attached thereto condenser 461 and water takeoff 462. Continuous pan 463 is attached to "C" seed receiver and pump 467 receiving material from seed pan 465 which is hooked up with condensers 468 and water take-off 469. Vacuum supply tanks 464 are hooked up with both the "C" seed pan 465 and the continuous pan 463. The seed pan 465 is also hooked up with condensers 468 and water take-off 469 as is seed pan 471. Seed pan 471 is hooked up with seed receiver and pump 472. Seed pan 471 is also hooked up with vacuum pan supply tanks 470 which in turn is hooked up to molasses run-off tank and pump 477 hooked up in turn with continuous centrifugal pumps 478 and magma mixer and pump 479.

Multiple effect evaporator 431 causes the creation of syrup received at 427 which is then pumped into syrup clarifier 428.

The material received from the "B" magma receiver 482 is crystalized and the Osceola Brown Sugar is in fact the crystals received from 482.

FIG. 27 (also referred to, infra) is a headspace analysis of substances trapped on TENAX® and is a gas chromatograph for the headspace for the Osceola Brown Sugar produced by Osceola Farms Inc. of Pahokee, Fla. according to the process set forth in the detailed description of FIG. 6B, supra.

FIG. 7A is a perspective diagrammatic view of the apparatus of FIG. 2A. FIG. 7C is a perspective view in diagrammatic form of the apparatus of FIG. 3 incorporating FIGS. 3A, 3B and 3C.

With respect to each of the figures showing the video camera or camcorder described, supra, a useful video camera is a SONY® Video Camera Recorder Hi8, Model CCD-TR101 (Video Hi8 "Handycam").

FIG. 8 sets forth a graph showing the response "R" on the "Y" axis versus:

[$-\log_{10}C$]

(with C being in gram moles per liter) for N-acetyl-D-Glucosamine, an epimeric mixture of compounds having the structures:

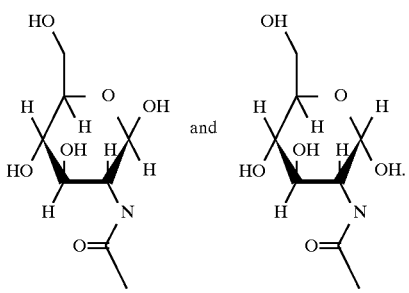

The graph indicated by reference numeral 800 is a linear regression graph drawn through each of the four points which are data points 801, 802, 803 and 804. The graph indicated by reference numeral 800a is a parabola drawn through each of the four points which are data points 801, 802, 803 and 804.

By the same token, in FIG. 9 the graph of:

[$-\log_{10}C$]

versus "R" for the materials TALIN® (shown by linear regression graph 901 using data points 959, 960 and 961 and shown by the parabola 901a); S-methyl methionine sulfonium chloride having the structure:

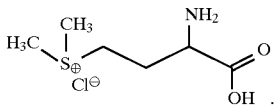

(using linear regression graph 902 and parabola 902a and data points 962, 963 and 966); and D-Glucosamine, an epimeric mixture of the compounds having the structures:

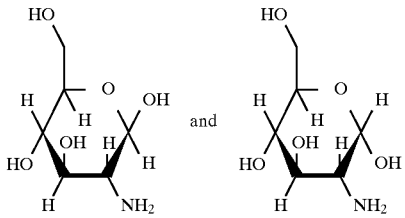

(using linear regression graph 900 and data points 950 and 951) for the mean of the data points and graph 900a and data points 952 and 953 for the median of the data points. The equation defining the line indicated by reference numeral 900a is:

$$R = -\tfrac{1}{3}[\log_{10}C] = \log_{10}C^{-1/3}.$$

The equation defining the line indicated by reference numeral 900 is:

$$R = \frac{-\log_{10}C - 1.2857}{3.4286}.$$

By the same token, in FIG. 10 the graph of:

[$-\log_{10}C$]

versus response "R" is for two materials, propiothetin (bromide) having the structure:

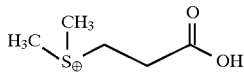

(shown by linear regression graph 1002 and parabola 1002a and data points 1060, 1061 and 1062) and trimethyl amine oxide hydrate having the structure:

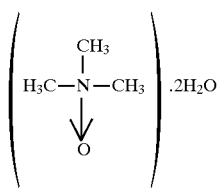

(shown by linear regression graph 1000 and data points 1050 and 1051).

By the same token, FIG. 11 shows a graph of:

[$-\log_{10}C$]

versus response "R" for use in the static test tank of FIG. 2A for the species *Penaeus vannamei* for the racemic mixture of 1-octen-3-ol having the structure:

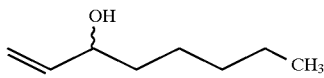

an isomeric mixture of the compounds having the structures:

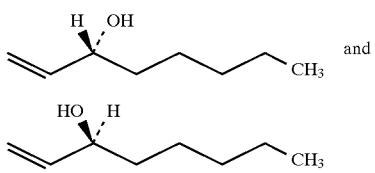

(shown by linear regression graph 1100 and parabola 1100a and data points 1150, 1152 and 1151) and for guanidine having the structure:

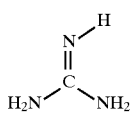

(shown by linear regression graph 1101 and data points 1160 and 1161).

By the same token, FIG. 12 is a graph of:

[$-\log_{10}C$]

(with C in grams per liter) versus "R" for TALIN®. The graph indicated by reference numeral 1200 is a graph for a straight line of:

$[-\log_{10}C]$ versus "R" directly through data points 1250 and 1251.

By the same token, FIG. 13, the graph of:

$[-\log_{10}C]$ versus "R" is for two materials:dimethyl sulfoxide having the structure:

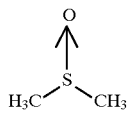

(indicated by the linear regression graph 1304 and the parabola 1304a and the data points 1305, 1306 and 1307) and for methional having the structure:

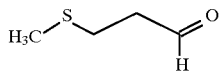

(indicated by the linear regression graph 1300 and the parabola 1300a and data points 1301, 1302 and 1303). A mathematical model for the parabola 1300a is:

$R = -0.0533(\log_{10}C)^2 - 1.23\log_{10}C - 2.25$ which is of the form:

$R = \alpha(\log_{10}C)^2 + \beta\log_{10}C + \gamma$

A mathematical model for the parabola 1304a is:

$R = 0.074(\log_{10}C)^2 + 1.83(\log_{10}C) + 14.47$ which is of the form:

$R = \alpha(\log_{10}C)^2 + \beta\log_{10}C + \gamma$

By the same token, the graph of FIG. 14 of:

$[-\log_{10}C]$ versus "R" is for the material, a 50:50 mole:mole mixture of skatole having the structure:

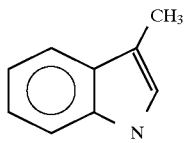

and indole having the structure:

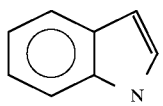

(with linear regression graph 1400 and parabola 1400a through data points 1401, 1402 and 1403).

The graph of FIG. 15 is also for:

$[-\log_{10}C]$ versus "R" (response) for three materials for the species *Penaeus setiferus* tested in a static holding tank. The graph indicated by reference numeral 1500 is a regression parabolic curve involving data points 1501, 1502, 1503 and 1504 and is for aqueous ammonia. The graph indicated by reference numeral 1510 is a linear regression graph for acetic acid and its data points are indicated by reference numerals 1511, 1512 and 1513. The graph indicated by reference numeral 1500a is a parabolic curve for acetic acid directly through the data points 1511, 1512 and 1513.

The graph indicated by reference numeral 1520 is a linear regression graph for aqueous ammonium chloride and its data points are indicated by reference numerals 1521, 1522 and 1523. The graph indicated by reference numeral 1520a is a parabola directly through the data points indicated by reference numerals 1521, 1522 and 1523.

By the same token, FIG. 16 is a graph of:

$[-\log_{10}C]$ versus response "R" using a static holding tank testing apparatus and involving the species *Penaeus setiferus* for the substances betaine having the structure:

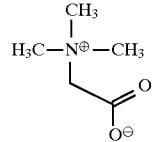

(indicated by the linear regression graph 1610 and the data points 1611, 1612 and 1613); glycine (indicated by the linear regression graph 1600 and the data points 1601, 1602 and 1603); and for aspartate ion (sodium aspartate in solution; indicated by linear regression graph 1620 and the data points 1621, 1622 and 1623).

By the same token, FIG. 17 is a graph of:

$[-\log_{10}C]$ versus response "R" using the static holding tank apparatus of FIG. 2 involving the species *Penaeus setiferus*. The graph indicated by reference numeral 1710 is for aqueous glucose and is a straight line through data points 1711 and 1712. Graph 1700 is a linear regression graph for taurine having the structure:

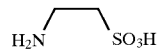

using data points 1701, 1702 and 1703.

A chemoreception static test tank embodiment is set forth in the illustration in FIG. 18, in perspective. Various locations at the bottom of test tank 1800 (with the bottom indicated by reference numeral 1801) are set forth in the test tank for reference purposes. Point "a" is indicated by reference numeral 1803. Point "b" is indicated by reference numeral 1804. Point "c" is indicated by reference numeral 1805. Point "d" is indicated by reference numeral 1806. Point "E" is indicated by reference numeral 1807. Point "F" is indicated by reference numeral 1808. Point "G" is indicated by reference numeral 1809. Point "H" is indicated by reference numeral 1810. The chemical injection point in the tank is indicated by reference numeral 1802. The member of the *Penaeus* genus of the Class Crustacea will move from location "b" towards any of the other locations over a given period of time with a given feed inserted at 1802. That movement is recorded and is a function of the grade "G" or "response", "R", for the particular stimulant at the particular concentration involved at injection point 1802.

Using the flow-through equipment of FIGS. 3 and 3B, a graph of flow rate (in ml per minute) versus response for the material: "glucose+natural extract+salt water" (described, supra) is indicated by linear regression graph 1900 using data points 1901, 1902 and 1903.

FIG. 20 sets forth three graphs for aqueous ammonium acetate of:

$$[-\log_{10}C]$$

versus response "R" for three different flow rates using the flow-through apparatus of FIGS. 3 and 3B. The graph indicated by reference numeral 2000 is for a flow rate of 125 ml/minute and is a straight line through data points 2001 and 2002. The graph for a flow rate of 100 ml/minute is indicated by reference numeral 2020 and is a straight line through data points 2021 and 2022. The graph indicated by reference numeral 2010 is for a flow rate of 75 ml/minute and is a straight line through data points 2011 and 2012.

When using as test materials the ammonium chloride, ammonium acetate, aqueous ammonia and acetic acid as set forth, supra, a number of equilibria exist:

$$NH_4^+ + H_2O \rightleftharpoons H^+ + NH_4OH;$$

$$NH_4OH \rightleftharpoons NH_4^+ + OH^-;$$

$$H_2O \rightleftharpoons H^+ + OH^-;$$

$$H_3C-\overset{O}{\underset{OH}{C}} \rightleftharpoons H_3C-\overset{O}{\underset{O^\ominus}{C}} + H^+; \text{ and}$$

$$H_3C-\overset{O}{\underset{O}{C}} \leftarrow :\overset{H}{\underset{H}{N}}\overset{H}{\underset{}{}} + H_2O \rightleftharpoons H_3C-\overset{O}{\underset{OH}{C}} + NH_4OH.$$

For the equation:

$$NH_4^+ + H_2O \rightleftharpoons H^+ + NH_4OH$$

the relationship:

$$K_h = \frac{K_w}{K_i} = \frac{10^{-14}}{1.8 \times 10^{-5}} = 5.5 \times 10^{-10}$$

exists. For the equilibrium:

$$NH_4OH \rightleftharpoons NH_4^+ + OH^-$$

the relationship:

$$K_i = 1.8 \times 10^{-5}$$

exists.
For the equilibrium:

$$H_2O \rightleftharpoons H^+ + OH^-$$

the relationship:

$$K_w = 10^{-14}$$

exists.

For the equilibrium:

$$H_3C-\overset{O}{\underset{OH}{C}} \rightleftharpoons H_3C-\overset{O}{\underset{O^\ominus}{C}} + H^+,$$

the relationship:

$$K_5 = 1.8 \times 10^{-5}$$

exists.
When ammonium acetate having the structure:

$$H_3C-\overset{O}{\underset{O}{C}} \leftarrow :\overset{H}{\underset{H}{N}}\overset{H}{\underset{}{}}$$

hydrolyzes, according to the equilibrium:

$$H_3C-\overset{O}{\underset{O}{C}} \leftarrow :\overset{H}{\underset{H}{N}}\overset{H}{\underset{}{}} + H_2O \rightleftharpoons H_3C-\overset{O}{\underset{OH}{C}} + NH_4OH,$$

the acetic acid and aqueous ammonia further hydrolyze to form acetate ions and ammonium ions and the relationship for the hydrolysis constant:

$$K_{hAA}$$

for ammonium acetate is:

$$K_{hAA} = (3.09 \times 10^{-5}) \left\{ \frac{[NH_4^+][OA_c^-]}{[NH_4OA_c]} \right\}.$$

For example, at a concentration of $10^{-9}$ for the ion:

$$[NH_4^+]$$

the amount of hydrolysis to aqueous ammonia is negligible since the hydrolysis constant is $5.5 \times 10^{-10}$.

At an initial concentration, $[NH_4OH]$ of $10^{-12}$, the amount of ionization to ammonium ion is negligible since $K_i$ is $1.8 \times 10^{-5}$.

Since all of the above equilibria are in saline solution containing chloride cations and metal anions such as sodium ion, many ion pairs exist and the standard equilibria and mathematical relationships are accordingly altered.

Referring to the graph of FIG. 21, for:

$$[-\log_{10}C]$$

versus response for N-acetyl-D-Glucosamine, an epimeric mixture of compounds having the structures:

and

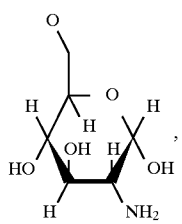

the linear regression graph, a straight line, is indicated by reference numeral 2110 and the data points for said regression graph are indicated by reference numerals 2112, 2114 and 2116. The flow-through tank used is that set forth in FIGS. 3 and 3B described, supra, and the species tested is *Peneaus vannamei*.

FIG. 22, showing the relationship of:

$$[-\log_{10}C]$$

versus response "R", shows two different graphs using three data points 2212, 2214 and 2216 for methional having the structure:

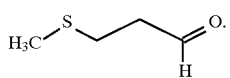

The regression graph indicated by reference numeral 2210 is in the shape of a parabola and the mathematical model therefor is as follows:

$$R = 0.167(\log_{10}C)^2 + 3.07(\log_{10}C) + 26.092.$$

The linear regression graph indicated by reference numeral 2211 is for a straight line. The apparatus used is the flow-through apparatus of FIGS. 3 and 3B and the species involved is *Peneaus vannamei*.

Table VI below sets forth mean response versus number of species of *Peneaus vannamei* in the group versus the particular chemical involved and its concentration. Table VI is as follows:

TABLE VI

| Chemical and Concentration | Number of Species in Group | Average Response Using the Mathematical Model: $G_2 = 100 - 10\theta$ |
|---|---|---|
| " " (Solution of FRITZ ® salt in water, 35 ppt) | 16 | 5.82 |
| Natural extract: Glucose at $10^{-3}$M | 8 | 17.33 |
| N-acetyl-D-Glucosamine at a concentration of $10^{-12}$M in 35 ppt aqueous FRITZ ® salt solution | 8 | 17.85 |
| N-acetyl-D-Glucosamine at a concentration of $10^{-15}$M in 35 ppt aqueous FRITZ ® salt solution | 8 | 22.44 |
| N-acetyl-D-Glucosamine at a concentration of $10^{-18}$M in 35 ppt aqueous FRITZ ® salt solution | 8 | 25.41 |
| Propiothetin (bromide) at $10^{-9}$M in aqueous FRITZ ® salt solution at 35 ppt | 7 | 2.89 |

TABLE VI-continued

| Chemical and Concentration | Number of Species in Group | Average Response Using the Mathematical Model: $G_2 = 100 - 10\theta$ |
|---|---|---|
| S-Methyl methionine sulfonium chloride at $10^{-9}$M (in aqueous FRITZ ® salt solution at 35 ppt) | 8 | 7.69 |
| TALIN ® at $10^{-5}$ mg/L (of aqueous FRITZ ® salt solution at 35 ppt) | 8 | 27.28 |
| Trimethyl amine oxide hydrate at $10^{-9}$M (in aqueous FRITZ ® salt solution at 35 ppt) | 7 | 19.72 |
| TASTONE ® 900 (Bakers Yeast Extract, spray-dried manufactured by the Red Star Specialty Products Inc. of 433 East Michigan Street, Milwaukee, Wisconsin 53202) (10 mg/L of FRITZ ® salt solution at 35 ppt) | 8 | 20.20 |
| Methional at $10^{-9}$M (in aqueous FRITZ ® salt solution at 5 ppt) | 8 | 18.43 |
| Methional at $10^{-12}$M (in aqueous FRITZ ® salt solution at 5 ppt) | 8 | 13.29 |
| Methional at $10^{-15}$M (in aqueous FRITZ ® salt solution at 5 ppt) | 7 | 24.94 |
| Dimethyl sulfoxide at $10^{-12}$M (in aqueous FRITZ ® salt solution at 5 ppt) | 8 | 43.40 |

Note:
The aqueous FRITZ ® salt, described in detail, supra, is at a level in water of 35 parts per thousand in each of the compositions set forth in Table VI.

FIG. 23 is a liquid chromatogram profile for TALIN® (trademark of Tate and Lyle Limited of the United Kingdom), a mixture of Thaumatin I, Thaumatin II and Thaumatin B. (Conditions: S-Sepharose column operating at 7 ml per minute; gradient: 0–25 mM NaCl (2×750 ml) fraction size: 45 ml.) The peak indicated by reference numeral 2316 is for that part of TALIN® which is known as "Thaumatin I" as described in U.S. Pat. No. 5,221,624 issued on Jun. 22, 1993, the specification for which is incorporated by reference herein. The Thaumatin I can also be shown using the symbolism:

$$[\text{Lys}^{46}, \text{Asp}^{113}, \text{Asp}^{137}]$$

where "Lys" stands for "lysine" moiety; and "Asp" stands for an "Aspartic acid" moiety. The peaks indicated by reference numerals 2312 and 2314 are for "Thaumatin B" and "Thaumatin II" as described in U.S. Pat. No. 4,771,000, the specification for which is incorporated by reference herein.

FIG. 24 is the high pressure liquid chromatography profile for the same TALIN® as set forth concerning the description of FIG. 23.

FIG. 25 is a graph of:

$$[-\log c_{10}]$$

versus response "R" (using the static tank test apparatus of FIGS. 2A and 7A) for 2-methyl-3-(methyldithio)furan having the structure:

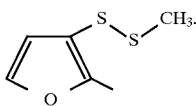

The graph indicated by reference numeral 2300 and by reference numeral 2300a are "regression" graphs for a "cubic" equation. The cubic equation is of the form:

$$R=\alpha(-\log_{10}C)^3+\beta(-\log_{10}C)^2+\gamma(-\log_{10}C)+\delta$$

and is in fact:

$$R=0.0096(\log_{10}C)^3-0.74(\log_{10}C)^2-172.6\log_{10}C-2604.63$$

wherein $\alpha$, $\beta$, $\gamma$ and $\delta$ are constants.

FIG. 26 is a graph of:

$$[-\log_{10}C]$$

versus response "R" using the static tank test apparatus of FIGS. 2A and 7A for "Osceola Brown Sugar", a product which is raw sugar containing impurities produced by Osceola Farms Inc. of Pahokee, Fla. The graph indicated by reference numeral 2400 is a linear regression graph, a straight line. The graph indicated by reference numeral 2400' is for a hyperbola and has the mathematical model:

$$R = 1.98 - \frac{0.73}{3.89 + \log_{10}C}$$

which is of the form:

$$R = \alpha - \frac{\gamma}{\beta + \log_{10}C}$$

wherein $\alpha$, $\beta$ and $\gamma$ are constants. The graph indicated by reference numeral 2400' is directly through the data points indicated by reference numerals 2401', 2402' and 2403'.

A duplicate set of points, 2401", 2402" and 2403" for the Osceola Brown Sugar yields an exponential equation for the exponential graph indicated by reference numeral 2400", having the mathematical model:

$$R=3.4+5.33e^{+2.4\log_{10}C}$$

FIG. 27 is a headspace analysis trapped on TENAX® and is a gas chromatograph for the headspace for the Osceola Brown Sugar produced by Osceola Farms Inc. of Pahokee, Fla.

The peak indicated by reference numeral 2705 is for carbon dioxide. The peak indicated by reference numeral 2706 is for dimethyl sulfide having the structure:

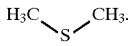

The peak indicated by reference numeral 2707 is for acetic acid having the structure:

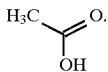

The peak indicated by reference numeral 2702 is for dimethyl sulfoxide having the structure:

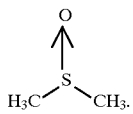

The peak indicated by reference numeral 2701 is for a mixture of 2,3-dimethyl pyrazine and 2,5-dimethyl pyrazine having the structures, respectively:

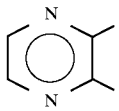

and

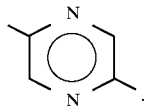

The peak indicated by reference numeral 2703 is for 2,3,5-trimethyl pyrazine having the structure:

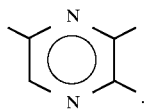

The peak indicated by reference numeral 2704 is for para-vinyl guiacol.

FIG. 28 is a "VENN" diagram showing the sets of incitants, stimulants, attractants and excitants for members of the *Penaeus* genus of the Class Crustacea. The overlapping area 2801 is that where particular substances are simultaneously incitants, stimulants, attractants and excitants for members of the *Penaeus* genus of the Class Crustacea. The symbol "I" is for incitants. The symbol "S" is for stimulants. The symbol "A" is for attractants. The symbol "E" is for excitants.

FIG. 29 is a graph of:

$$[-\log_{10}C]$$

versus "response" using flow-through apparatus of FIGS. 3 and 3B for N-acetyl-D-Glucosamine, an epimeric mixture of compounds having the structures:

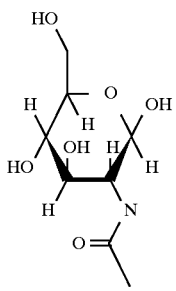

and

-continued

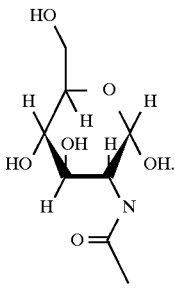

The graph indicated by reference numeral 2900 is for the mean of data points and these mean data points are indicated by reference numerals 2901, 2902 and 2903. The mathematical model for the graph indicated by reference numeral 2900 is as a "hyperbola", to wit:

$$R = 51.06 + \frac{16.14}{\log_{10}C + 11.04}$$

or an exponential equation, to wit:

$$R = 100 \log_e \left[ \frac{30 - \log_{10}C}{30} \right].$$

The graph indicated by reference numeral 2910 is for a straight line for the median data points and these median data points are represented by points 2911, 2912 and 2913. The mathematical model for the graph indicated by reference numeral 2910 is:

$$R = -41.98 - 5.68\log_{10}C.$$

FIG. 30 sets forth two graphs for the relationship of:

$$[-\log_{10}C]$$

versus "R" for methional having the structure:

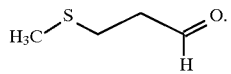

using the flow-through apparatus of FIGS. 3 and 3B. The graph indicated by reference numeral 3000 is a straight line graph for "mean" data points 3001, 3002 and 3003 and has the mathematical model:

$$R=[-6.71-2.44\log_{10}C]$$

The graph indicated by reference numeral 3010 is for the "median" data points 3011, 3012 and 3013 and is an exponential equation, to wit:

$$(11.1)\log_e \left[ \frac{379 - \log_{10}C}{7.94} \right] = R$$

FIG. 31 is a pair of graphs, a "median" graph and a "mean" graph for the relationship of:

$$[-\log_{10}C]$$

versus "R" using the flow-through tank apparatus of FIGS. 3 and 3B for a 50:50 mole:mole mixture of skatole having the structure:

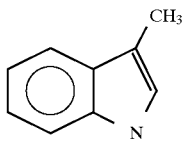

and indole having the structure:

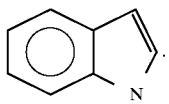

The "median" graph is indicated by reference numeral 3110 for the "median" data points 3111, 3112 and 3113 and is a parabola having the equation:

$$R=-2.34[\log_{10}C]^2-58.77\log_{10}C-338.$$

The "mean" data points are indicated by the parabola 3100 through "mean" data points 3101, 3102 and 3103. The "mean" data point parabola has the equation:

$$R=-0.56[\log_{10}C]^2-14.33\log_{10}C-62.$$

FIG. 32 sets forth a pair of graphs, a "mean" data point graph and a "median" data point graph of:

$$[-\log_{10}C]$$

versus "R" in the flow-through tank apparatus of FIGS. 3 and 3B for methionine having the structure:

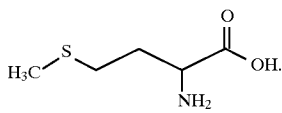

The graph indicated by reference numeral 3210 is for the median data points through points 3211 and 3212. The graph indicated by reference numeral 3200 is for the "mean" data points through data points 3201 and 3202.

FIG. 33 sets forth a pair of graphs, a "mean" data point graph and a "median" data point graph for the relationship of:

$$[-\log_{10}C]$$

versus response "R" using static tank apparatus of FIGS. 2A and 7A for yeast extract. The graph indicated by reference numeral 3310 is for the "median" data points and goes directly through points 3311 and 3312. The graph indicated by reference numeral 3300 is for the "mean" data points and goes directly through points 3301 and 3302.

FIG. 34 sets forth two "response as a function of concentration" graphs setting forth data for the response "R" on the "X" axis versus:

$$[-\log_{10}C]$$

on the "Y" axis (and "C" being concentration in gram moles per liter) for N-acetyl-D-Glucosamine, an epimeric mixture of compounds having the structures:

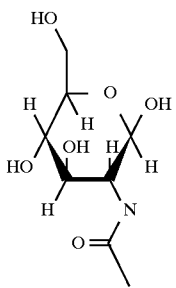

and

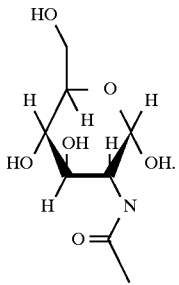

in the static tank testing apparatus of FIG. 7B as against the *Procambrus clarkii* (crawfish) species of the Class Crustacea. The graph indicated by reference numeral 601' (a "gamma" function) is for the means of the responses "R" versus:

$[-\log_{10}C]$

The graph indicated by reference numeral 651' (a regression curve) is for the medians of responses "R" versus:

$[-\log_{10}C]$

The graph indicated by reference numeral 601' is a graph described by the mathematical model:

$R=5.0014-[\log_{10}C]^2(0.0084+0.5169e^{+0.45[\log_{10}C]})$, drawn through each of the points which are data points 606', 602', 603', 604' and 605'. The graph indicated by reference numeral 651' is a regression curve described by the mathematical model:

$R=0.7874[-\log_{10}C]^{-1/2}-0.0001[\log_{10}C]^2+3.041$ and is for the median points, 656', 657', 655', 654', 653' and 652'.

With respect to the "mean" line, if point 607' were taken into consideration then a second mean line ("mean line" II) could be drawn described according to the mathematical model:

$R=4.6574+0.0018[\log_{10}C]^3+0.0322[\log_{10}C]^2+0.0907[\log_{10}C]$, a cubic equation. The mean line II is indicated by reference numeral 601".

FIG. 35 sets forth two "response as a function of concentration" graphs ("gamma" function and hyperbolic function) of:

$[-\log_{10}C]$ versus response "R" with:

$[-\log_{10}C]$ being on the "Y" (and "C" being concentration in gram moles per liter) and "R" being on the "X" axis for the testing of the substance trimethyl amine oxide hydrate having the structure:

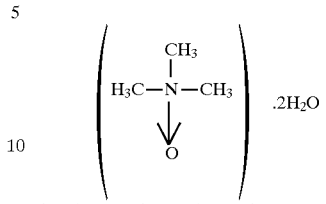

in the static tank testing apparatus of FIG. 7B against the *Procambrus clarkii* species of the Class Crustacea. The graph indicated by reference numeral 701' (a "gamma" function) is for the means of responses "R" versus:

$[-\log_{10}C]$ and is defined by the mathematical model:

$R=(-6\times10^{-4})[\log_{10}C]e^{-0.2569\,[\log_{10}C]}+0.0207\,[\log_{10}C]+3.5607$.

The graph indicated by reference numeral 751' (a hyperbolic function) is for the medians of responses "R" versus:

$[-\log_{10}C]$ and is defined by the mathematical equation:

$R=-2.6824\sinh[-0.1\{\log_{10}C\}]-0.3680[\log_{10}C]+3.1913$.

The data points for the graph of the means 701' are indicated by reference numerals 702', 703', 704' and 705'. The data points for the graph of the medians which graph is indicated by reference numeral 751', are indicated by reference numerals 752', 753', 754' and 755'.

FIG. 36 sets forth two "response as a function of concentration" graphs (the means of response graph being indicated by reference numeral 801', a "gamma" function and the medians of response graph being indicated by reference numeral 851' (also a "gamma" function)) of:

$[-\log_{10}C]$ on the "Y" axis versus response "R" on the "X" axis with "C" being in gram moles per liter, for the substance, Osceola Brown Sugar manufactured by Osceola Farms Inc. of Pahokee, Fla. (analysis of headspace as trapped on TENAX® is set forth in FIG. 27) in the static tank testing apparatus of FIG. 7B as against the *Procambrus clarkii* species of the Class Crustacea.

The means of response graph indicated by reference numeral 801' is defined according to equation:

$R=(-0.0082)[\log_{10}C]^2e^{-0.0573[\log_{10}C]}-0.0066[\log_{10}C]^2+6.3210$ and is for the data points indicated by reference numerals 802', 803', 804' and 805'.

The medians of response graph 851 is defined according to the mathematical model:

$R=(-1.5542\times10^4)\{\log_{10}C\}^2e^{+2.1941[\log_{10}C]}-0.1613[\log_{10}C]^2+11.2387$ and is for the data points indicated by reference numerals 852, 853, 854 and 855.

FIG. 37 sets forth two "response as a function of concentration" graphs setting forth data for the response "R" on the "X" axis versus:

$[-\log_{10}C]$ on the "Y" axis (and "C" being concentration in gram moles per liter) for "METHYLOXYCYCLOSULFIDE™" (a trademark of International Flavors & Fragrances Inc.) also called "MOS", the compound having the structure:

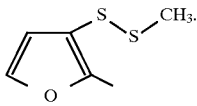

in the static tank testing apparatus of FIG. 7B as against the *Procambrus clarkii* (crawfish) species of the Class Crustacea. The graph indicated by reference numeral 3700 (a "gamma" function) is for the median of the response "R" versus:

[$-\log_{10}C$].

The graph indicated by reference numeral 3710 (a "gamma" function) is for the means of the response "R" versus:

[$-\log_{10}C$].

The graph indicated by reference numeral 3700 is a graph described by the mathematical model:

$$R=152.9674-0.732[\log_{10}C]^2 e^{0.0485 \ log_{10} C}+12.433[\log_{10}C]$$

drawn through each of the points which are data points 3701, 3702, 3703 and 3704. The graph indicated by reference numeral 3710 is a graph described by the mathematical model:

$$R=0.1302[\log_{10}C]^2 e^{0.092[log_{10}C]}-0.3697[\log_{10}C]-5.0549$$

drawn through each of the points which are data points 3711, 3712, 3713 and 3714.

FIG. 38A is a series of bar graphs showing percent weight gain during a six-week feed trial for members of the *Penaeus* genus of the Class Crustacea using Diets A, P, J and C (described, supra). The bar graph indicated by reference numeral 3801A is for the use of Diet A. The bar graph indicated by reference numeral 3802C is for Diet C. The bar graph indicated by reference numeral 3803J is for Diet J. The bar graph indicated by reference numeral 3804P is for Diet P. Percent weight gain for the members of the Penaeus genus of the Class Crustacea is set forth on the "Y" axis. The particular diet is set forth on the "X" axis.

FIG. 38B is a series of bar graphs showing average growth in six weeks (in grams) for members of the Penaeus genus of the Class Crustacea using each of Diets A, C, J and P, each of which is described, supra; Diet C being the "control". The average growth for the six-week period is set forth in grams on the "Y" axis. The bar graph indicated by reference numeral 3810A is for Diet A. The bar graph indicated by reference numeral 3811C is for Diet C. The bar graph indicated by reference numeral 3812J is for Diet J. The bar graph indicated by reference numeral 3813P is for Diet P.

FIG. 38C is a series of bar graphs setting forth the total number of "hits" over a six-week period by members of the *Penaeus* genus of the Class Crustacea. The total number of "hits" is set forth on the "Y" axis. The specific diet used is set forth on the "X" axis. The bar graph indicated by reference numeral 3820A is for Diet A. The bar graph indicated by reference numeral 3821C is for Diet C. The bar graph indicated by reference numeral 3822J is for Diet J. The bar graph indicated by reference numeral 3823P is for Diet P.

FIG. 39 relates to the data summarized in FIGS. 38A, 38B and 38C. FIG. 39 sets forth in a "exact fit" curve and a linear regression line plotting the number of "hits" (in units of hundreds of "hits") versus the weight gain for members of the *Penaeus* genus of the Class Crustacea. The point indicated by reference numeral 3904J is for Diet J. The point indicated by reference numeral 3903P is for Diet P. The point indicated by reference numeral 3902C is for Diet C. The point indicated by reference numeral 3901A is for Diet A. The "exact fit" curve is indicated by reference numeral 3900. The linear regression line is indicated by reference numeral 3910.

The "exact fit" curve indicated by reference numeral 3900 is defined according to the mathematical model:

$$H = \left( \frac{\Delta W - 74}{-7 \cdot 17} \right)^{1/3} + 2\sinh 3[\Delta W].$$

The linear regression line 3910 is defined according to the mathematical model:

$$H=66.67(\Delta W)-44.33.$$

wherein weight gain is shown by the symbol: $\Delta W$ and wherein the number of "hits" is indicated by: H.

FIG. 40 is a graph showing the differences between the control (Diet C) and the other diets (Diets J, A and P) the growth data for which is summarized in FIGS. 38A, 38B and 38C and set forth, numerically, supra.

FIG. 40 is a graph showing on the "Y" axis the difference in the number of "hits" between the control diet and Diets J, A and P versus the change in the amount of growth between the control, Diet C, and Diets A, J and P indicated by the symbol: $\Delta(\Delta W)$. The graph indicated by reference numeral 4000 is a linear regression line through points 4001, 4002 and 4003. The data point indicated by reference numeral 4003 sets forth the differences between the control ("zero") and Diet A. The point indicated by reference numeral 4002 is for the difference between the control and Diet P. The point indicated by reference numeral 4001 is for the difference between the control and Diet J. Linear regression line 4000 is defined according to the mathematical model:

$$\Delta H=5333.33(\Delta[\Delta W])-180.$$

FIG. 41 is a series of graphs showing the differences between Diets A, J and P (described, supra) and Diet C, the control, plotting change in weight gain on the "X" axis versus percent "active" on the "Y" axis with the "active" being either the mixture, to wit:

N-acetyl-D-Glucosamine;

dimethyl sulfoxide; and methional hereinafter referred to as "TRIO" or Diet J which is the compound having the structure:

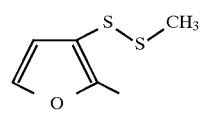

(hereinafter referred to as "MOs").

The graph indicated by the reference numeral 4100 is for *Peneaus vannamei*. The data point indicated by reference numeral 4101 is for Diet J and the data point indicated by reference numeral 4102 is for Diet A containing 37.5% "TRIO".

The line indicated by reference numeral 4110 is for Penaeus aztecus using "TRIO". The data point indicated by reference numeral 4111 is for Diet P containing all "TRIO". The data point indicated by reference numeral 4112 is for Diet A which contains 37.5% "TRIO".

The line indicated by reference numeral 4120 is for *Penaeus vannamei* using Diet J, "METHYLOXYCYCLO-SULFIDE™" The point indicated by reference numeral 4121 is for Diet J containing 100% "MOS". The point indicated by reference numeral 4122 is for the amount of "MOS" contained in Diet A which is 12.5% (there being seven other components).

The line indicated by reference numeral 4130 is for *Penaeus aztecus* using the Diet J "MOS". The point indicated by reference numeral 4131 is for Diet J, which is all "MOS". The point indicated by reference numeral 4132 is for the "MOS" in Diet A, the "MOS" being 12.5% of Diet A. Diet A contains seven other components in equal amounts.

The graph indicated by reference numeral 4100 is defined according to the mathematical model:

$$A = (431.03) \Delta(\Delta W) + 132.33.$$

or the mathemathical model:

$$\Delta(\Delta W) = \frac{A - 132.33}{431.03}.$$

The graph indicated by reference numeral 4110 is defined according to the mathematical model:

$$\Delta(\Delta W) = \frac{A - 83.11}{337.83}$$

The graph indicated by reference numeral 4120 is defined according to the mathematical model:

$$\Delta(\Delta W) = \left[ \frac{A - 64.53}{236.49} \right].$$

The graph indicated by reference numeral 4130 is defined according to the mathematical model:

$$\Delta(\Delta W) = \left[ \frac{A - 55.45}{318.8} \right].$$

The data set forth in FIGS. 38A, 38B and 38C is also described in FIGS. 42 and 43.

Accordingly, FIG. 42 is a three-dimensional graph showing on the "Y" axis the change in the change of weight gain indicated by the symbol: $\Delta(\Delta W)$; on the "X" axis $\log_{10}$ (of the change in the number of "hits") indicated by the symbol: $\log_{10}(\Delta H)$; and on the "Z" axis by $\log_{10}A$ indicated by the symbol: $\log_{10}A$; wherein "A" is the percent "active". The same coordinates are used for FIG. 43. FIG. 42 has as the "active" material, "TRIO". The graph indicated by reference numeral 4200 is drawn through data points 4201 and 4202. Data point 4201 indicates Diet P containing 100% "TRIO". The data point indicated by reference numeral 4202 indicates "TRIO" in Diet A; that is, 37.5% "TRIO" which Diet A contains.

In FIG. 43, the line indicated by reference numeral 4300 is drawn through data points 4301 and 4302 and is for Diet J. Reference numeral 4301 is for 100% Diet J containing the compound having the structure:

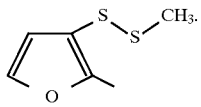

Reference numeral 4302 is for "MOS" contained in Diet A, in an amount of 12.5%.

The graph indicated by reference numeral 4200 in FIG. 42 is defined according to the mathematical model:

$$-1.7013[\log_{10}(\Delta H)] + 1.1254[\Delta(\Delta W)] + 3.0019[\log_{10}A] = 1$$

or the mathematical model:

$$\Delta(\Delta W) = \frac{1 + 1.7013[\log_{10}(\Delta H)] - 3.0019[\log_{10}A]}{1.1254}.$$

The graph indicated by reference numeral 4300 in FIG. 43 is defined according to the mathematical model:

$$3.647[\log_{10}(\Delta H)] - 1.636([\Delta(\Delta W)]) + 0.345[\log_{10}A] = 10.$$

FIG. 44 sets forth two "response as a function of concentration" graphs setting forth data for the response "R" on the "X" axis versus:

$$[-\log_{10}C]$$

on the "Y" axis (and "C" being concentration in gram moles per liter) for "OXYCYCLOTHIONE-030™", (trademark of International Flavors & Fragrances Inc.) having the structure:

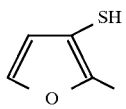

in the static tank testing apparatus of FIG. 2A as against the *Peneaus vannamei* species of the *Penaeus* genus of the Class Crustacea. The graph indicated by reference numeral 4400 is for the medians of the responses "R" versus:

$$[-\log_{10}C]$$

The graph indicated by reference numeral 4410 is for the means of responses "R" versus:

$$[-\log_{10}C]$$

The mean line 4410 is drawn through data points 4411 and 4412. The median line 4400 is drawn through data points 4401 and 4402.

The mean line 4410 is defined according to the mathematical model:

$$R = 7.3792 + 0.4167[\log_{10}C]$$

The median line indicated by reference numeral 4400 is defined according to the mathematical model:

$$R = 8.5 + 0.5[\log_{10}C]$$

What is claimed is:

1. A process for attracting a member of the Class Crustacea from a volume of water inhabited by said member of the Class Crustacea to a desired surface or volume within a body of water comprising the step of applying an aqueous solution containing a Crustacea-attracting concentration of a material selected from the group consisting of:

(i) S-methyl methionine sulfonium halides defined according to the structure:

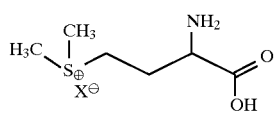

wherein X is a chloride or a bromide anion;
(ii) 1-octen-3-ol having the structure:

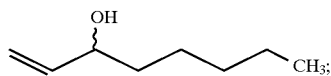

(a mixture of isomers having the structures:

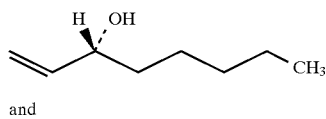

and

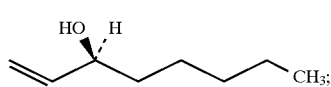

(iii) methional having the structure:

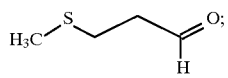

(iv) dimethyl sulfoxide having the structure:

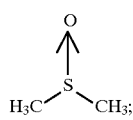

(v) a 50:50 mole:mole mixture of skatole/indole, skatole having the structure:

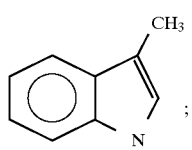

indole having the structure:

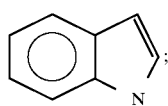

(vi) propionthetin halides having the structure:

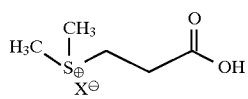

wherein X is a chloride or a bromide anion;
(vii) ammonium chloride;
(viii) ammonium acetate;
(ix) acetic acid;
(x) glucose;
(xi) "raw sugar", a mixture of sucrose and impurities;
(xii) Thaumatin;
(xiii) 2-methyl-3-(methyldithio) furan having the structure:

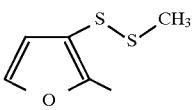

(xiv) aqueous ammonia;
(xv) yeast extract; and
(xvi) 2-methyl-3-furanthiol having the structure:

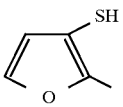

to the vicinity of said desired surface or volume.

2. The process of claim 1 wherein the Crustacean-attracting material is 2-methyl-3-(methyldithio)furan having the structure:

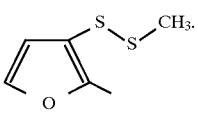

3. The process of claim wherein the Crustacean-attracting material is racemic 1-octen-3-ol having the structure:

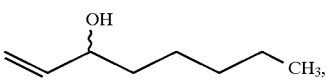

a mixture of isomers having the structures:

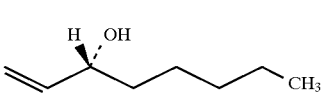

and

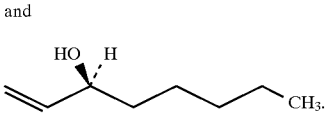

4. The process of claim wherein the Crustacean-attracting material is methional having the structure:

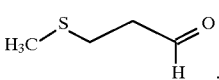

5. The process of claim wherein the Crustacean-attracting material is raw sugar and the raw sugar is Osceola Brown Sugar.

6. The process of claim 1 wherein the concentration of attracting material in water is in the range of from about $10^{-6}$ down to about $10^{-12}$ gram moles per liter.

7. The process of claim wherein the Crustacean-attracting material is 2-methyl-3-furanthiol having the structure:

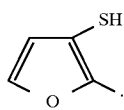

8. A process for exciting, inciting and/or stimulating a member of the Class Crustacea within a volume of water inhabited by said member of the Class Crustacea comprising the step of applying an aqueous solution containing a Crustacea-exciting, inciting, and/or stimulating concentration of a material selected from the group consisting of:

(i) S-methyl methionine sulfonium halides defined according to the structure:

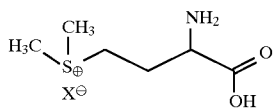

wherein X is chloride or bromide anion;

(ii) 1-octen-3-ol having the structure:

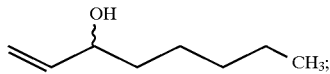

(a mixture of isomers having the structures:

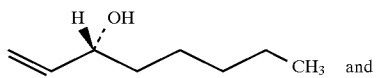 and

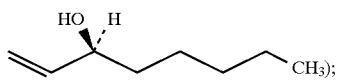);

(iii) methional having the structure:

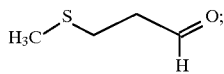

(iv) dimethyl sulfoxide having the structure:

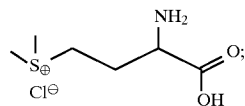

(v) a 50:50 mole:mole mixture of skatole/indole, skatole having the structure:

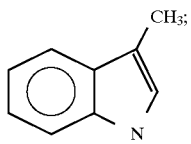

and indole having the structure:

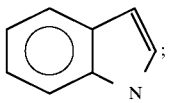;

(vi) propionthetin halides having the structure:

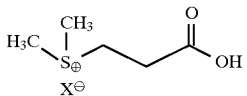

wherein X is a chloride or a bromide anion;
(vii) ammonium chloride;
(viii) ammonium acetate;
(ix) acetic acid;
(x) glucose;
(xi) "raw sugar", a mixture of sucrose and impurities;
(xii) Thaumatin;
(xiii) 2-methyl-3-(methyldithio) furan having the structure:

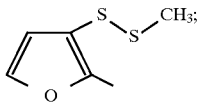

(xiv) aqueous ammonia;
(xv) yeast extract; and
(xvi) 2-methyl-3-furanthiol having the structure:

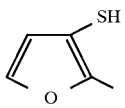

to the vicinity of said volume of water inhabited by said member of the Class Crustacea.

9. The process of claim 8 wherein the Crustacean-exciting material is 2-methyl-3-(methyldithio)furan having the structure:

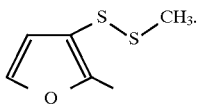

10. The process of claim 8 wherein the Crustacean-exciting, inciting and/or stimulating material is racemic 1-octen-3-ol having the structure:

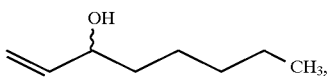

a mixture of isomers having the structures:

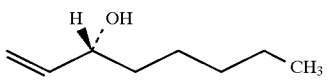

and

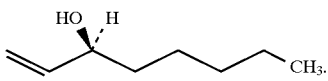

11. The process of claim 8 wherein the Crustacean-exciting, inciting and/or stimulating material is methional having the structure:

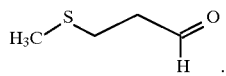

12. The process of claim 8 wherein the Crustacean-exciting, inciting or stimulating material is raw sugar and the raw sugar is Osceola Brown Sugar.

13. The process of claim 8 wherein the concentration of Crustacean-exciting, inciting or stimulating material is in the range of from about $10^{-6}$ down to about $10^{-12}$ gram moles per liter.

14. The process of claim 8 wherein the Crustacean-exciting, inciting and/or stimulating material is 2-methyl-3-furanthiol having the structure:

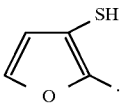

* * * * *